United States Patent
Jones et al.

(10) Patent No.: US 6,553,013 B1
(45) Date of Patent: Apr. 22, 2003

(54) DETECTION SYSTEM FOR DETERMINING POSITIONAL INFORMATION ABOUT OBJECTS

(75) Inventors: Alan Henry Jones, Cambridge (GB); Andrew Martin Robert Ward, Cambridge (GB)

(73) Assignee: AT&T Laboratories, Cambridge Limited, Cambridge (GB)

(*) Notice: Subject to any disclaimer, the term of this patent is extended or adjusted under 35 U.S.C. 154(b) by 0 days.

(21) Appl. No.: 09/355,684

(22) PCT Filed: Nov. 25, 1998

(86) PCT No.: PCT/GB98/03505

§ 371 (c)(1),
(2), (4) Date: Aug. 2, 1999

(87) PCT Pub. No.: WO99/28763

PCT Pub. Date: Jun. 10, 1999

(30) Foreign Application Priority Data

Apr. 12, 1997 (GB) ............................................. 9725718
Apr. 12, 1997 (GB) ............................................. 9725759
Apr. 23, 1998 (GB) ............................................. 9808529

(51) Int. Cl.[7] ................................................ H04Q 7/00
(52) U.S. Cl. ................. 370/328; 370/345; 370/349; 455/41; 340/3.51; 340/10.1
(58) Field of Search ................. 370/328, 315, 370/345, 349, 503, 316, 336, 338, 350; 455/41, 456, 457; 340/3.51, 10.1, 505, 539, 825.69, 572.3, 572.4; 367/127, 128, 129; 342/118, 126, 458, 450

(56) References Cited

U.S. PATENT DOCUMENTS

| | | | | |
|---|---|---|---|---|
| 3,696,384 A | * | 10/1972 | Lester | 367/199 |
| 4,067,015 A | * | 1/1978 | Mogavero et al. | 340/825.7 |
| 5,495,427 A | * | 2/1996 | Puma et al. | 367/117 |
| 5,504,477 A | * | 4/1996 | Whitright et al. | 340/10.4 |
| 5,608,412 A | * | 3/1997 | Welles et al. | 342/457 |
| 6,141,293 A | * | 10/2000 | Amorai-Moriya et al. | 367/127 |
| 6,317,386 B1 | * | 11/2001 | Ward | 367/127 |
| 6,348,856 B1 | * | 2/2002 | Jones et al. | 340/10.1 |
| 6,470,002 B1 | * | 10/2002 | Jones et al. | 370/345 |

* cited by examiner

*Primary Examiner*—Nay Maung
*Assistant Examiner*—Sonny Trinh
(74) *Attorney, Agent, or Firm*—Barnes & Thornburg

(57) ABSTRACT

A system which enables the position of each plurality of mobile labelled objects in a specified environment to be determined from the transit times to fixed receivers of ultrasound energy transmitted by object mounted transponders which are triggered by radio energy, wherein the specified environment is divided into cells each have a radio transmitter transmitting the radio triggered signals, these radio transmissions being multiplexed in accordance with identifying characteristics of the respective cells, no two cells with the same identifying characteristics overlapping one another.

15 Claims, 69 Drawing Sheets

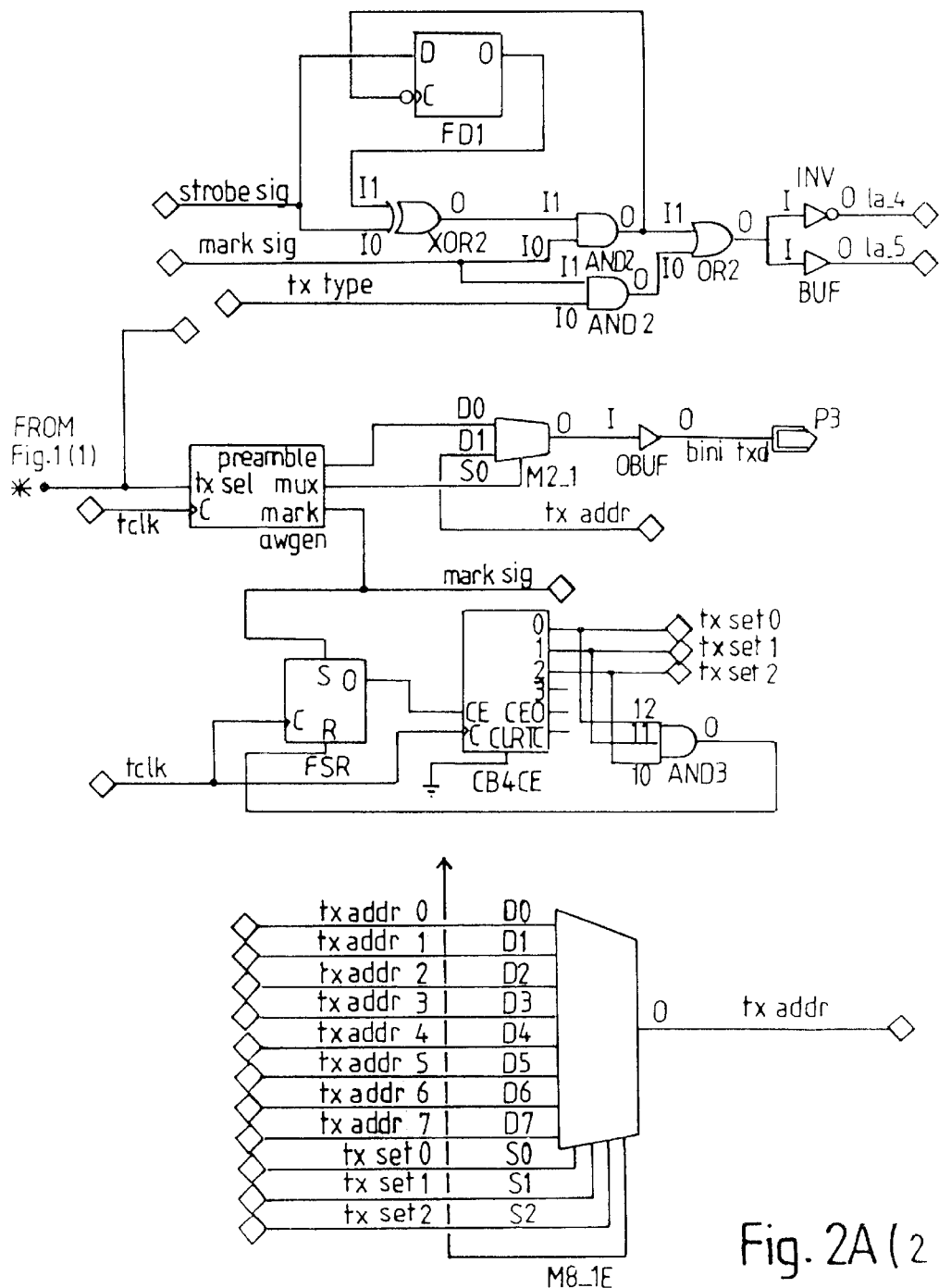
Fig. 2A(2)

① Central Controller triggers all receivers on network

② Receiver monitors 40kHz channel for 20mS

③ Central Controller polls receiver across network

④ Receiver returns a value either:
   a) time after trigger at which incoming signal peaked for the first time
   or
   b) zero indicating that no useful signal was detected ① Central Controller triggers all receivers on network ② Receiver Logic passes trigger signal to both channels ③ Both receiver channels monitor incoming signal for 20mS ④ After 20mS window closes, each channel passes a data value ( a & b , above) to the comparison logic:
either
1) time after trigger at which incoming signal peaked for the first time
or
2) zero, indicating that no useful signal was detected.

⑤ Central controller polls receiver across network.

⑥ Receiver returns a data value, c, where:
c = a  IF  b = 0
c = 0  IF  b ≠ 0

OVERVIEW

MOBILE TRANSMITTER

MULTI-CELL SYSTEM

Multiplexing which does not allow simultaneous transmissions in overlapping cells

COVERING AN AREA USING EIGHT CELLS AND THREE TDM COLOURS

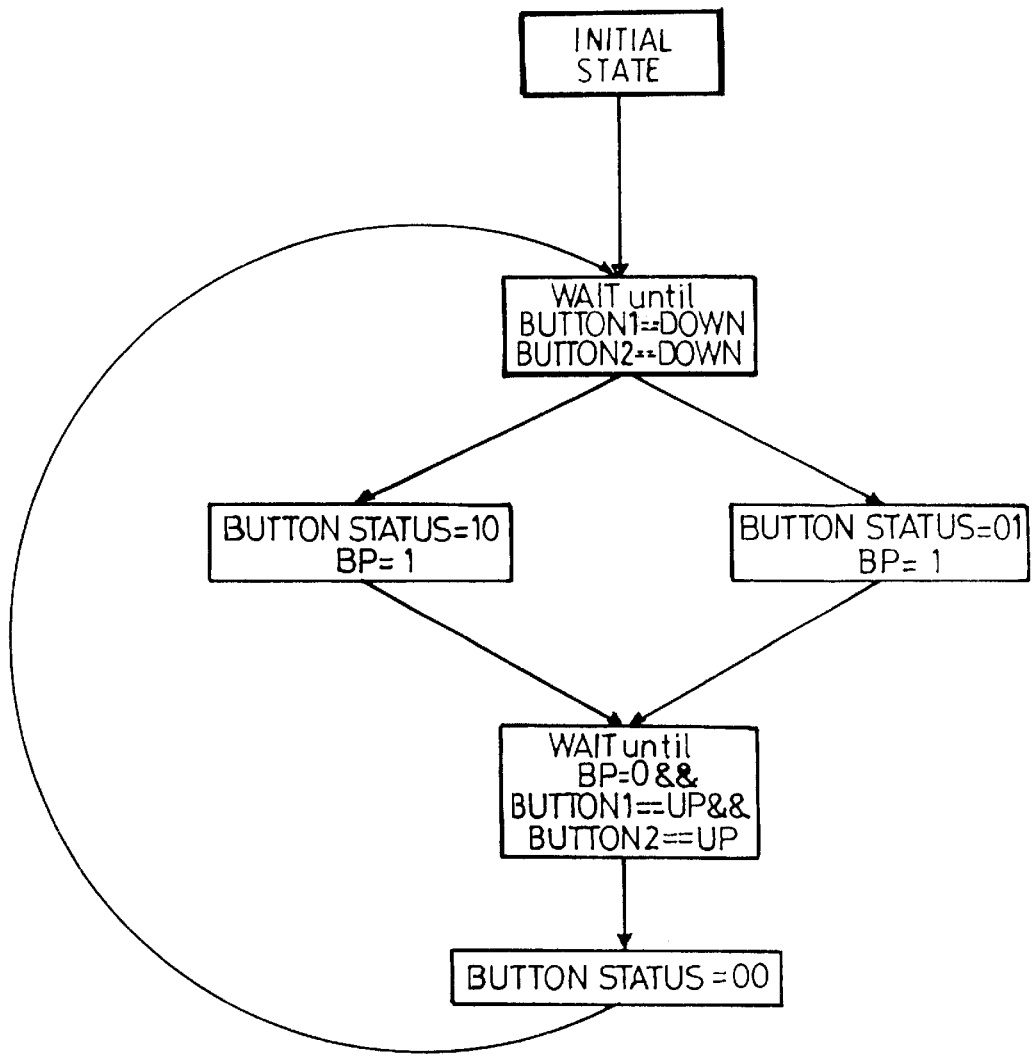
Fig. 30D(1)

HAND OVER
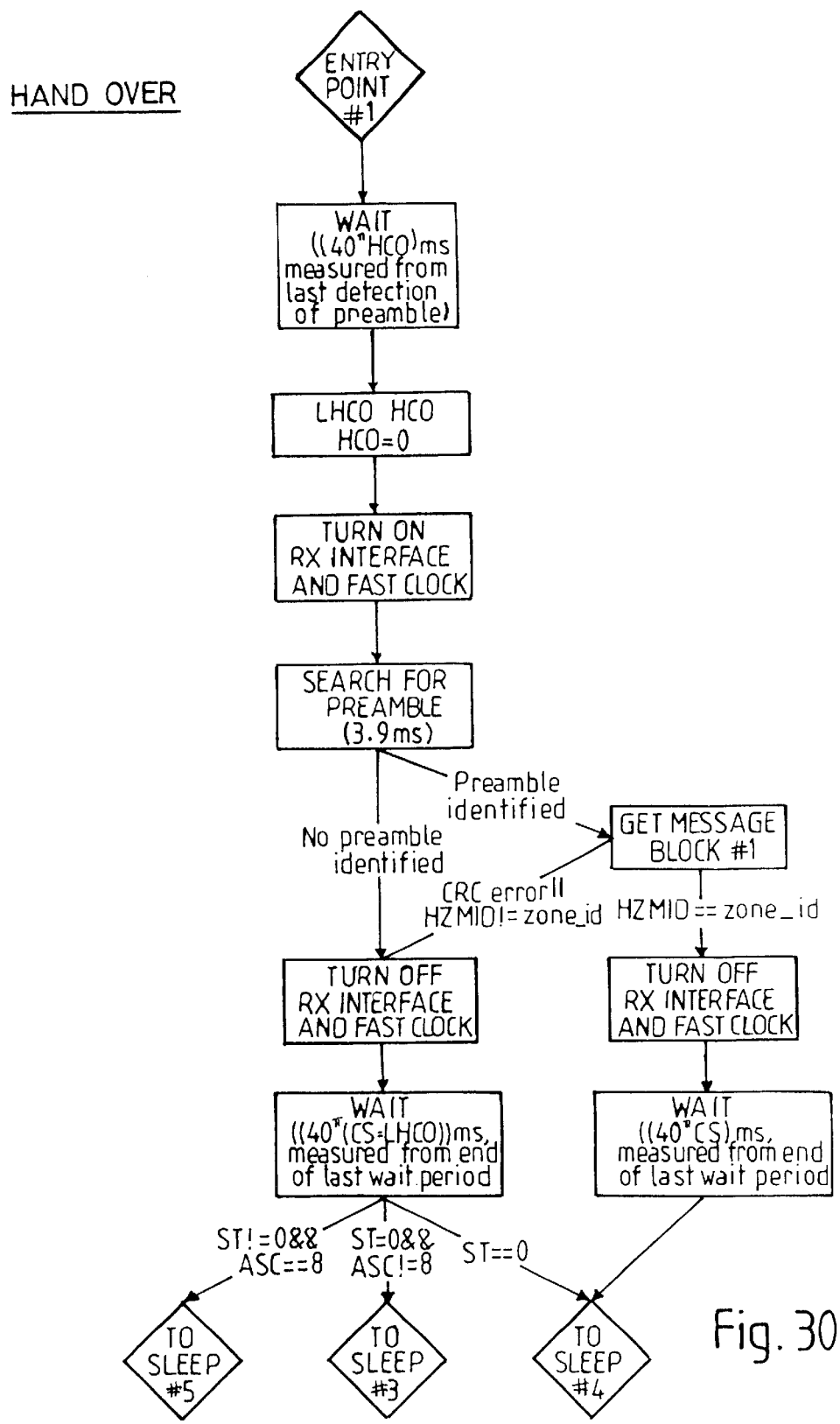
Fig. 30D(2)

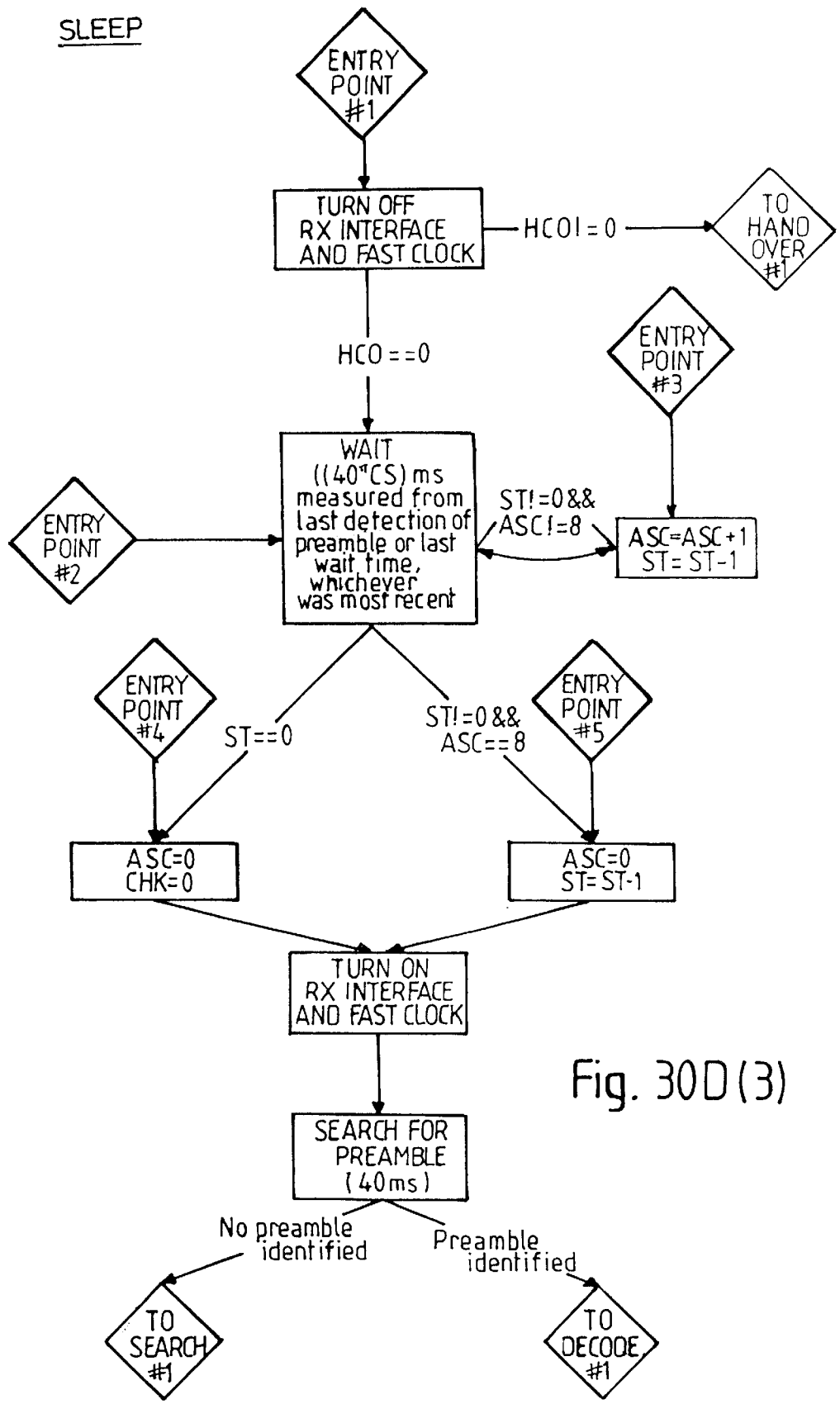
Fig. 30D(3)

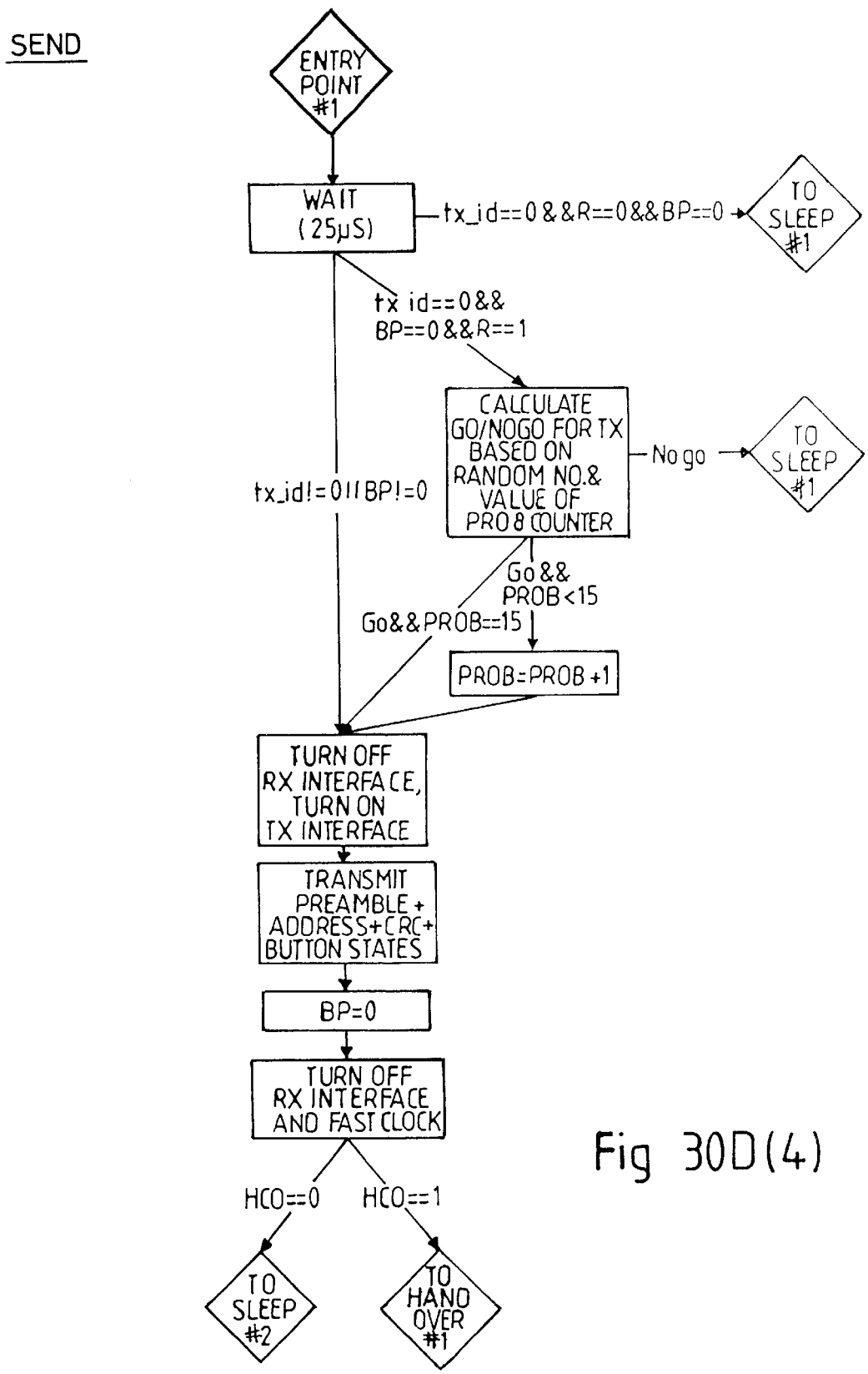
Fig 30D(4)

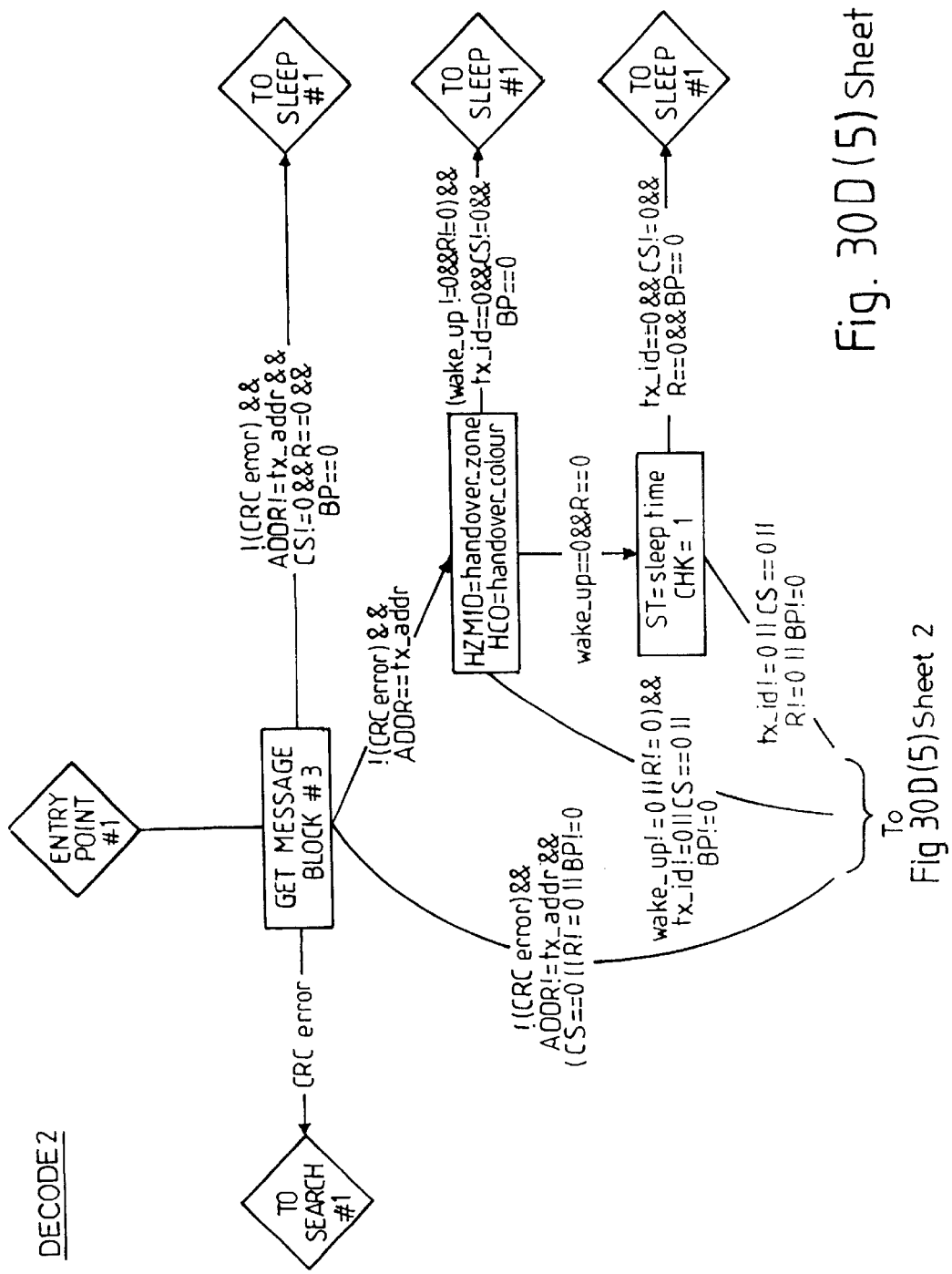

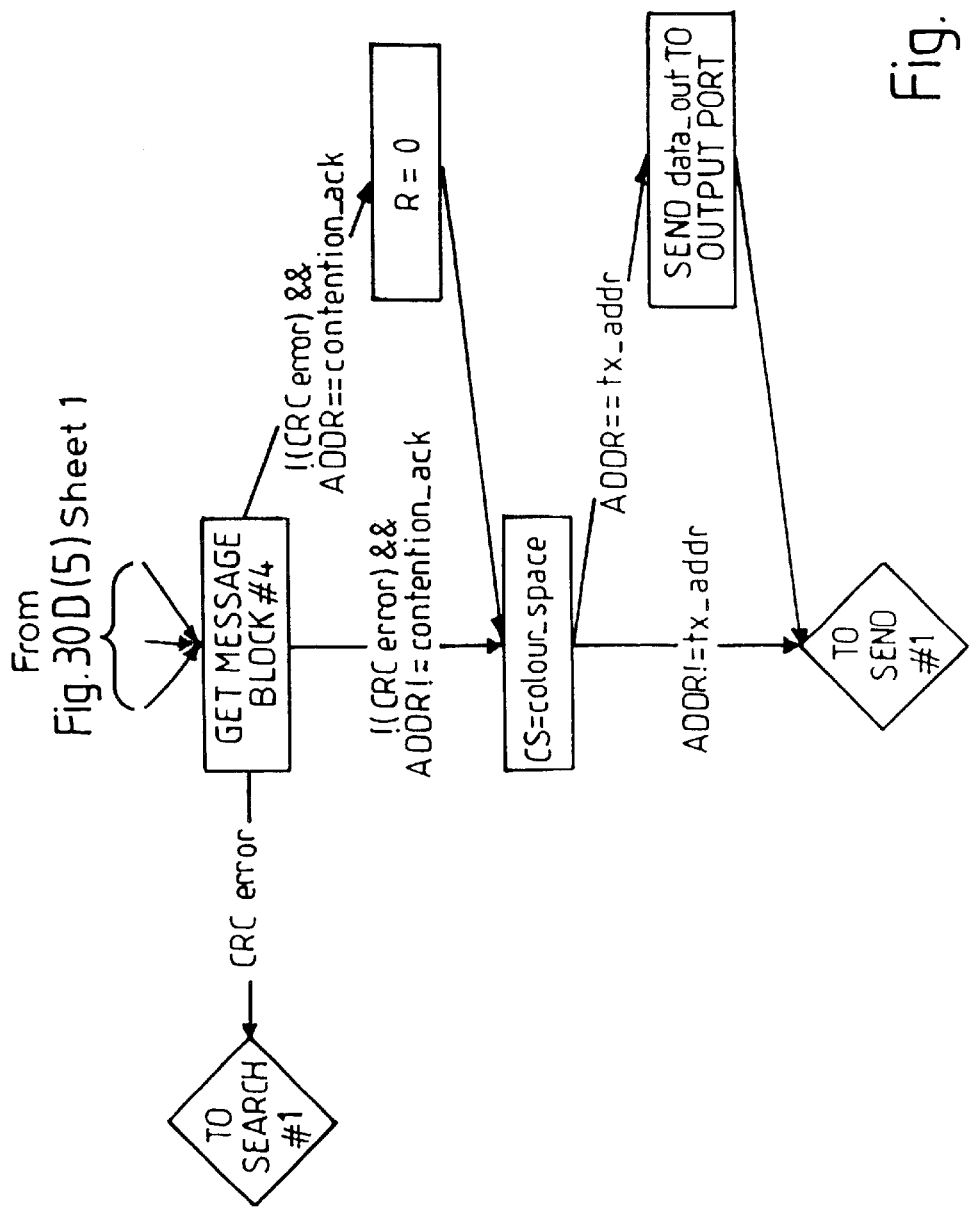

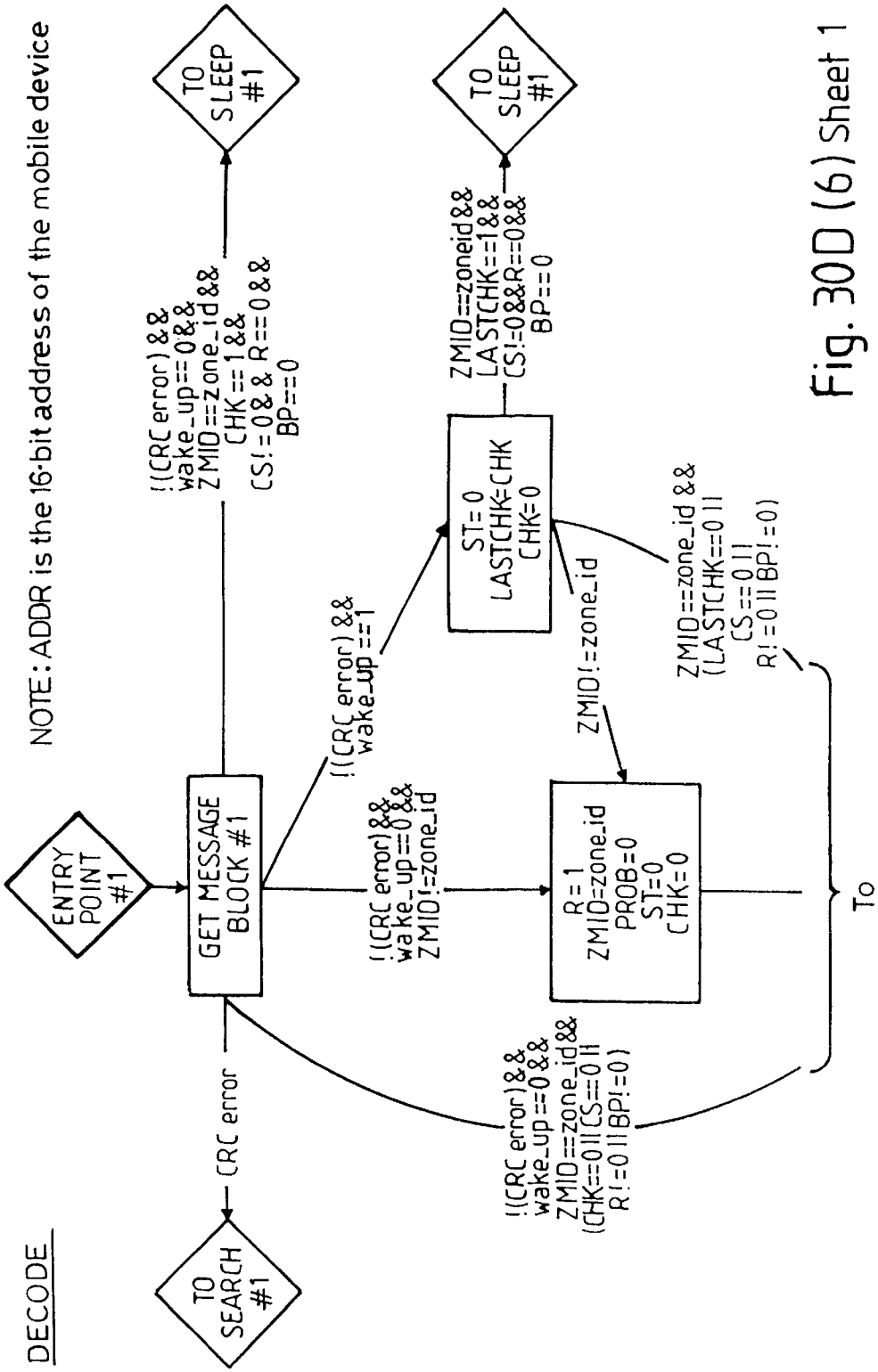
Fig. 30D(6) Sheet 1

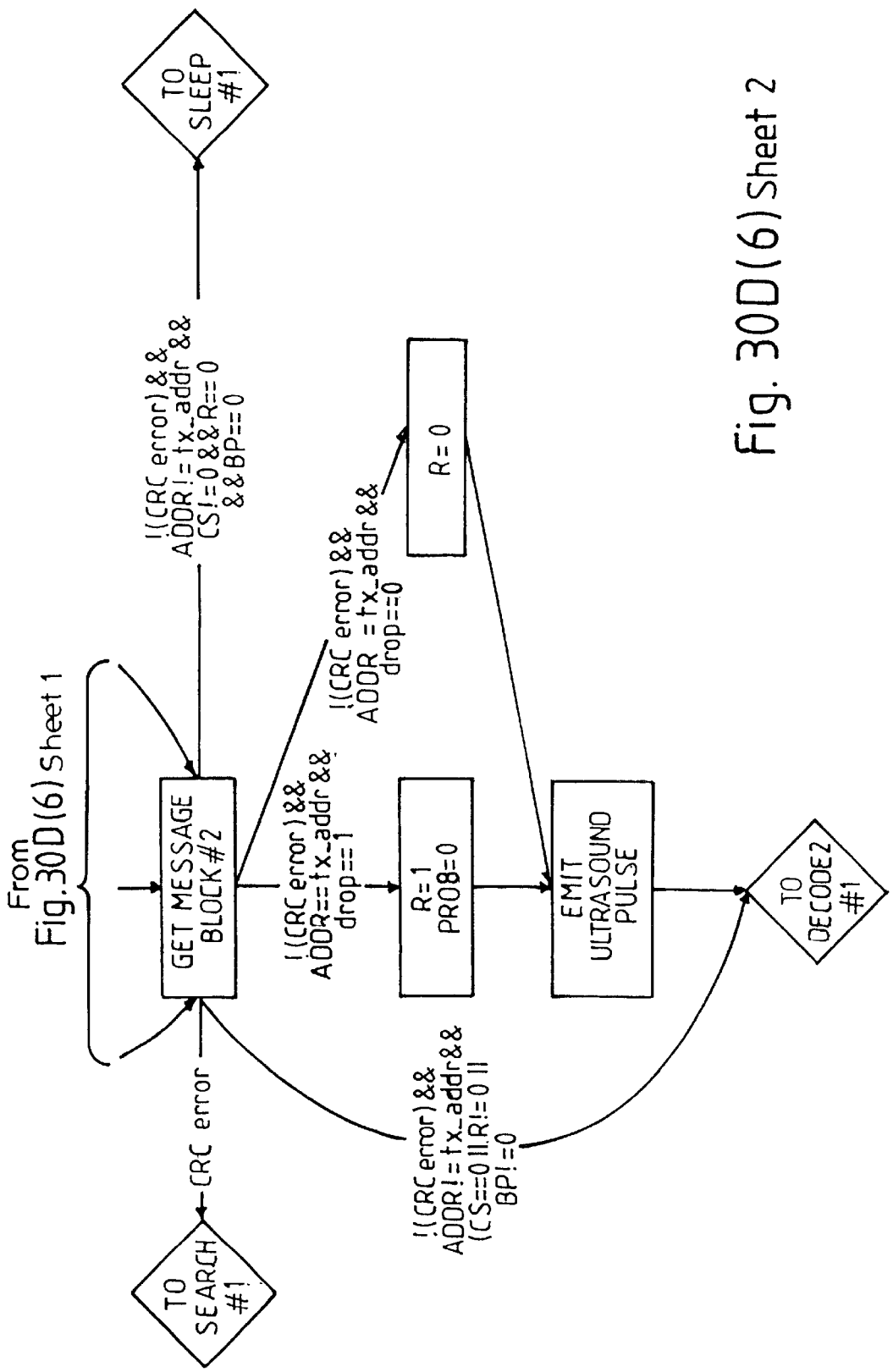
Fig. 30D(6) Sheet 2

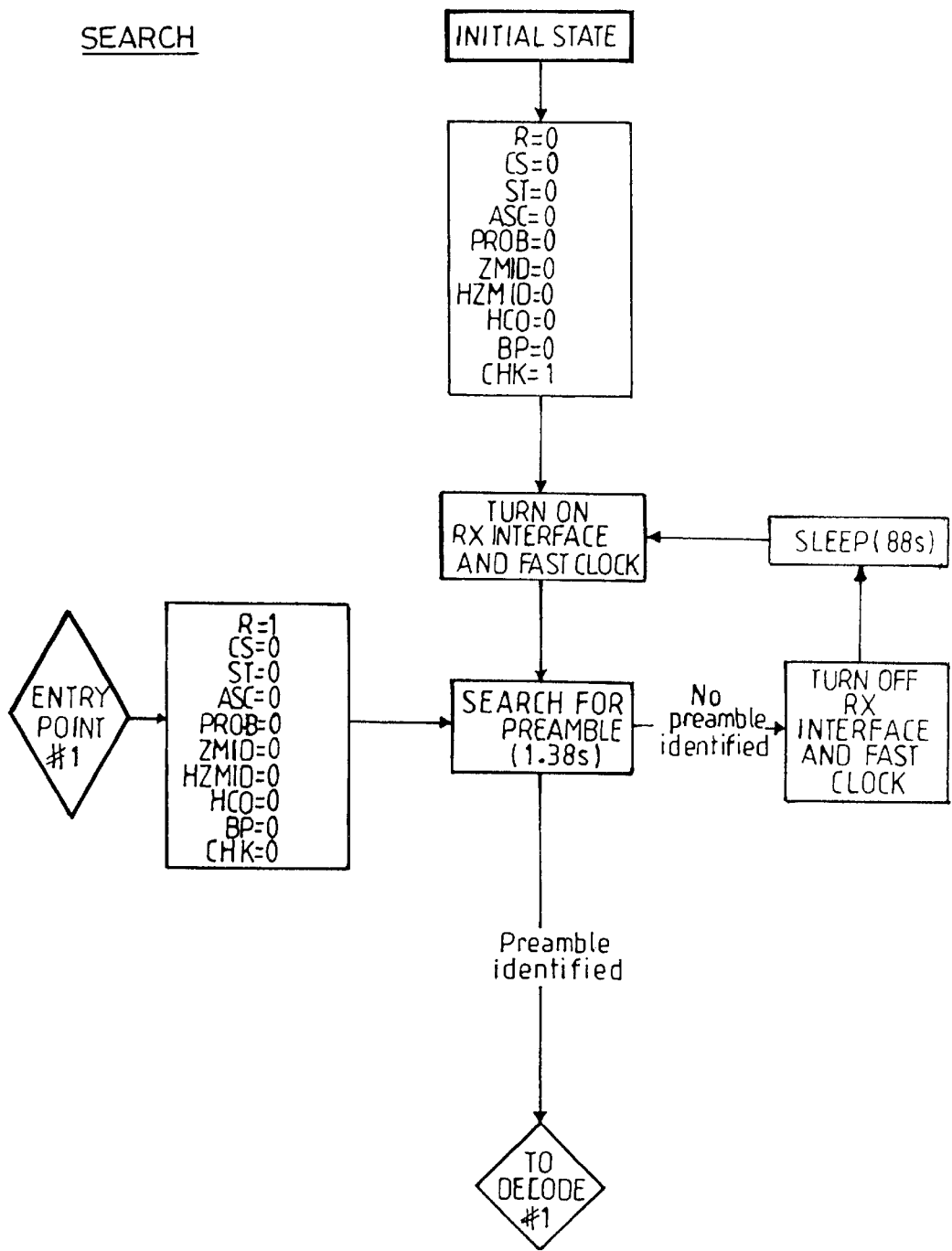
Fig. 30D (7)

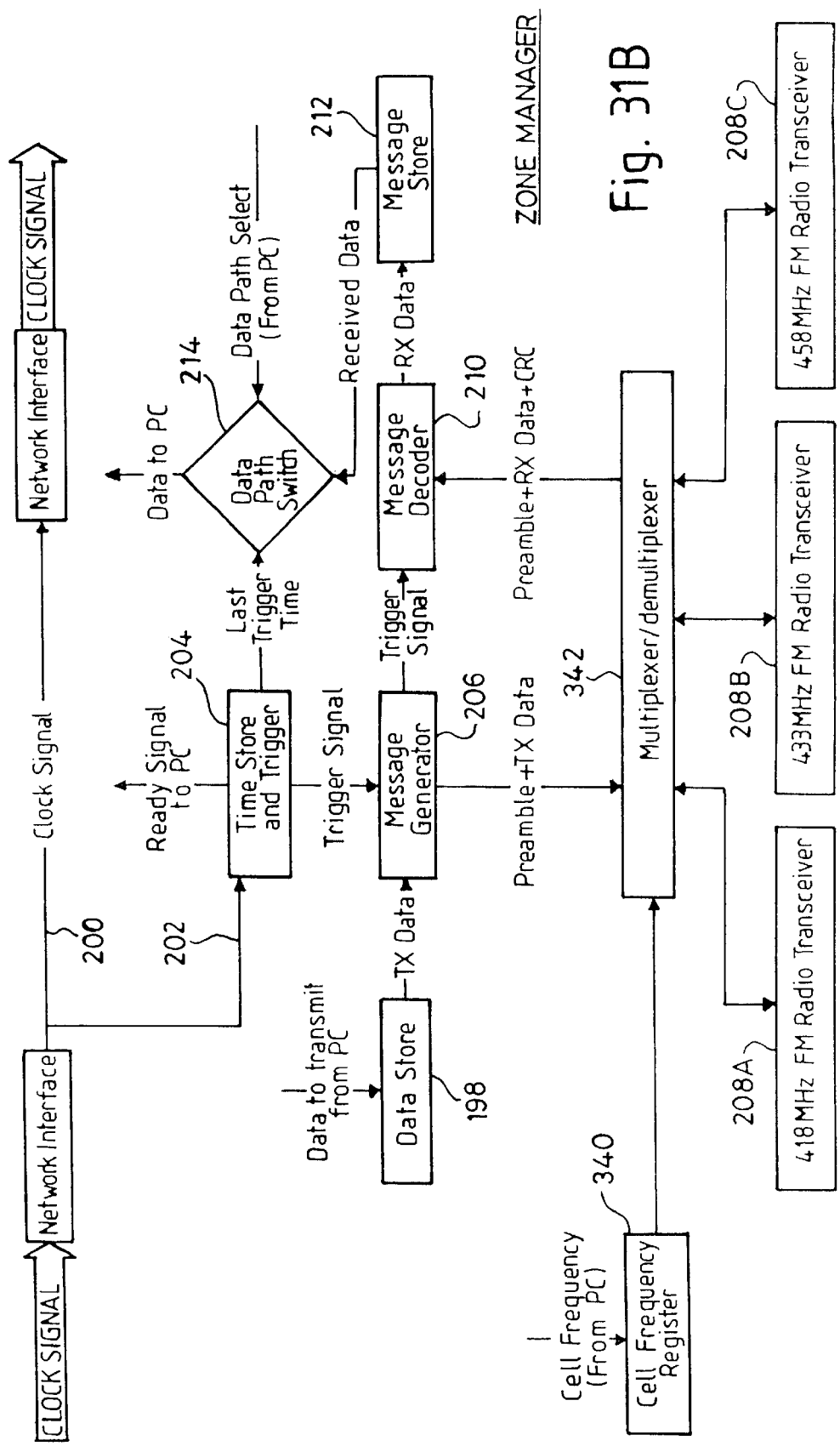

THREE RADIO CELLS COVERING FOUR ROOMS

COVERING AN AREA USING FOUR CELLS AND THREE FDM COLOURS

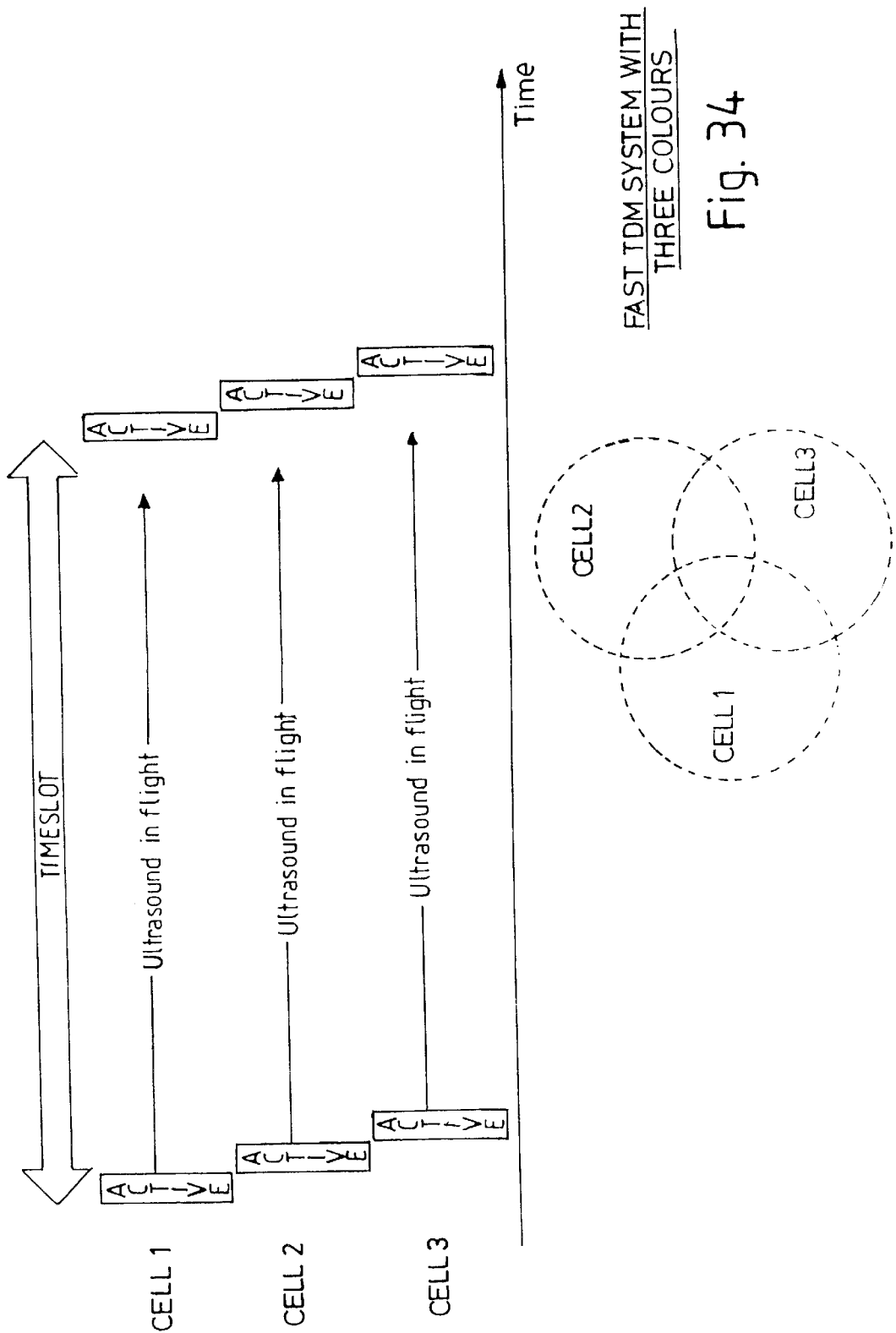
Fig. 34 FAST TDM SYSTEM WITH THREE COLOURS

GENERATION OF 12 FTDM COLOURS USING THREE FREQUENCIES AND FOUR TDM CHANNELS $$t = \sum_{i=1, a_i \neq 0}^{m} \frac{1}{l_i} \qquad (1) \quad \text{Fig. 37a}$$

$$e'_i = \begin{cases} l_i & \text{if } a_i \neq 0 \\ \frac{1}{(1-t)} & \text{if } a_i = 0 \end{cases} \qquad (2) \quad \text{Fig. 37b}$$

$$e'_i = \begin{cases} l_i \times t & \text{if } a_i \neq 0 \\ 0 & \text{if } a_i = 0 \end{cases} \qquad (3) \quad \text{Fig. 37c}$$

$$s'_x = s_x - \frac{(s_x - s_r)}{n} \qquad (4) \quad \text{Fig. 37d}$$

$$\hat{u} = \frac{\sum_{i=1}^{n} u_i}{n} \qquad (5) \quad \text{Fig. 37e}$$

$$\hat{v} = \frac{\sum_{i=1}^{n} v_i}{n} \qquad (6) \quad \text{Fig. 37f}$$

$$\hat{w} = \frac{\sum_{i=1}^{n} w_i}{n} \qquad (7) \quad \text{Fig. 37g}$$

$$a = \hat{u} - x \qquad (8) \quad \text{Fig. 37h}$$

$$b = \hat{v} - y \qquad (9) \quad \text{Fig. 37i}$$

$$c = \hat{w} - z \qquad (10) \quad \text{Fig. 37j}$$

$$sin(\theta) = \frac{\left|\begin{pmatrix} m \\ n \\ 0 \end{pmatrix} \times \begin{pmatrix} a \\ b \\ 0 \end{pmatrix}\right|}{\left|\begin{pmatrix} m \\ n \\ 0 \end{pmatrix}\right|\left|\begin{pmatrix} a \\ b \\ 0 \end{pmatrix}\right|} \quad (11) \quad \text{Fig. 37k}$$

$$cos(\theta) = \frac{\begin{pmatrix} m \\ n \\ 0 \end{pmatrix} \cdot \begin{pmatrix} a \\ b \\ 0 \end{pmatrix}}{\left|\begin{pmatrix} m \\ n \\ 0 \end{pmatrix}\right|\left|\begin{pmatrix} a \\ b \\ 0 \end{pmatrix}\right|} \quad (12) \quad \text{Fig. 37l}$$

$$st = \begin{cases} \lfloor -s \times e \rfloor & \text{if } s < 0 \\ 0 & \text{otherwise} \end{cases} \quad (13) \quad \text{Fig. 37m}$$

TABLE 1

| Description | Size (bits) |
|---|---|
| *wake* bit | 1 |
| Padding (zeroes) | 8 |
| CRC 1 | 8 |
| *drop* bit | 1 |
| Transmitter Address | 16 |
| CRC 2 | 8 |
| *transmit* bit | 1 |
| Padding (zeroes) | 13 |
| Sleep Time *st* | 24 |
| CRC 3 | 8 |
| Padding (zeroes) | 5 |
| Output Data Value | 8 |
| Registration Acknowledgement | 16 |
| CRC 4 | 8 |

Fig. 38

TABLE 2

| Description | Size (bits) |
|---|---|
| Transmitter Address | 16 |
| CRC | 8 |
| Button 1 Status | 1 |
| Button 2 Status | 1 |

Fig. 39

TABLE A

| Description | Size (bits) |
| --- | --- |
| *wake* bit | 1 |
| Padding (zeroes) | 8 |
| CRC 1 | 8 |
| *drop* bit #1 | 1 |
| *drop* bit #2 | 1 |
| Transmitter Address #1 | 16 |
| Transmitter Address #2 | 16 |
| CRC 2 | 8 |
| *transmit* bit #1 | 1 |
| *transmit* bit #2 | 1 |
| Padding (zeroes) | 13 |
| Sleep Time #1 | 24 |
| Sleep Time #2 | 24 |
| CRC 3 | 8 |
| Padding (zeroes) | 5 |
| Output Data Value #1 | 8 |
| Output Data Value #2 | 8 |
| Registration Acknowledgement #1 | 16 |
| Registration Acknowledgement #2 | 16 |
| CRC 4 | 8 |

Fig. 40

TABLE B

| Description | Size (bits) |
| --- | --- |
| Transmitter Address | 16 |
| CRC | 8 |
| Button 1 Status | 1 |
| Button 2 Status | 1 |

Fig. 41

TABLE C

| Description | Size (bits) |
|---|---|
| *wake* bit | 1 |
| Cell ID | 8 |
| CRC 1 | 8 |
| *drop* bit | 1 |
| Transmitter Address | 16 |
| CRC 2 | 8 |
| *transmit* bit | 1 |
| Handover Offset | 5 |
| Handover Cell ID | 8 |
| Sleep Time *st* | 24 |
| CRC 3 | 8 |
| Colour Space | 5 |
| Output Data Value | 8 |
| Registration Acknowledgement | 16 |
| CRC 4 | 8 |

Fig. 42

TABLE D

| Description | Size (bits) |
|---|---|
| *wake* bit | 1 |
| Cell ID | 8 |
| CRC 1 | 8 |
| *drop* bit #1 | 1 |
| *drop* bit #2 | 1 |
| Transmitter Address #1 | 16 |
| Transmitter Address #2 | 16 |
| CRC 2 | 8 |
| *transmit* bit #1 | 1 |
| *transmit* bit #2 | 1 |
| Handover Offset #1 | 5 |
| Handover Offset #2 | 5 |
| Handover Cell ID #1 | 8 |
| Handover Cell ID #2 | 8 |
| Sleep Time #1 | 24 |
| Sleep Time #2 | 24 |
| CRC 3 | 8 |
| Colour Space | 5 |
| Output Data Value #1 | 8 |
| Output Data Value #2 | 8 |
| Registration Acknowledgement #1 | 16 |
| Registration Acknowledgement #2 | 16 |
| CRC 4 | 8 |

Fig. 43

TABLE E

| Value | Frequency/MHz |
|---|---|
| 0 | (No handover) |
| 1 | 418 |
| 2 | 433 |
| 3 | 458 |

Fig. 44

TABLE F

| Description | Size (bits) |
|---|---|
| *wake* bit | 1 |
| Cell ID | 8 |
| CRC 1 | 8 |
| *drop* bit | 1 |
| Transmitter Address | 16 |
| CRC 2 | 8 |
| *transmit* bit | 1 |
| Handover Frequency | 2 |
| Handover Cell ID | 8 |
| Sleep Time *st* | 24 |
| CRC 3 | 8 |
| Output Data Value | 8 |
| Registration Acknowledgement | 16 |
| CRC 4 | 8 |

Fig. 45

TABLE G

| Value | Frequency/MHz |
|---|---|
| 0 | No chosen frequency |
| 1 | 418 |
| 2 | 433 |
| 3 | 458 |

Fig. 46

TABLE H

| Description | Size (bits) |
|---|---|
| *wake* bit | 1 |
| Cell ID | 8 |
| CRC 1 | 8 |
| *drop* bit #1 | 1 |
| *drop* bit #2 | 1 |
| Transmitter Address #1 | 16 |
| Transmitter Address #2 | 16 |
| CRC 2 | 8 |
| *transmit* bit #1 | 1 |
| *transmit* bit #2 | 1 |
| Handover Frequency #1 | 2 |
| Handover Frequency #2 | 2 |
| Handover Offset #1 | 2 |
| Handover Offset #2 | 2 |
| Handover Cell ID #1 | 8 |
| Handover Cell ID #2 | 8 |
| Sleep Time #1 | 24 |
| Sleep Time #2 | 24 |
| CRC 3 | 8 |
| Output Data Value #1 | 8 |
| Output Data Value #2 | 8 |
| Registration Acknowledgement #1 | 16 |
| Registration Acknowledgement #2 | 16 |
| CRC 4 | 8 |

Fig. 47

TABLE J

| Value | Frequency/MHz |
|---|---|
| 0 | No chosen frequency |
| 1 | 418 |
| 2 | 433 |
| 3 | 458 |

Fig. 48

TABLE K

| Handover Offset Value | Activation Delay/ms |
|---|---|
| 0 | 120 |
| 1 | 30 |
| 2 | 60 |
| 3 | 90 |

Fig. 49

DETECTION SYSTEM FOR DETERMINING POSITIONAL INFORMATION ABOUT OBJECTS

FIELD OF INVENTION

This invention relates to a detection system for determining information concerning the location of objects. The invention can be applied to people and animals as well as inanimate objects such a furniture, machines, vehicles, equipment and the like, and in this connection object is intended to include any movable entity.

BACKGROUND OF THE INVENTION

Location systems are known which allow the presence or absence of an object in a specified environment (such as a room) to be confirmed or denied, and relative to one or more reference points to identify where in the environment the object is located.

EP 0485879 describes a system for locating vehicles in automatic guidance transport systems. Ultrasound is employed as a distance measuring medium whilst an infrared link allows communication between vehicles.

WO95/14241 describes a tracking system which enables a spotlight to follow a person on a stage carrying a transponder. Again infra-red signals are used to instigate ultrasonic transmissions to determine the position of the transponder and therefore the person. The spotlight is moved accordingly.

EP 0591899 describes another spotlight controlling system for tracking a moving target (actor on a stage) carrying a transponder. Here radio transmissions establish the communication link and ultrasound transmissions are employed to determine distance and position.

In our UK Patent Applications Nos. 9725760.4, 9725718.2 and 9725759.6, there is described an indoor positioning system wherein a single radio transmitter (part of a zone manager) transmits 25 radio signals each second, at the start of a 40 ms interval called a timeslot.

The radio signals, which are picked up by mobile transmitter/receivers (transponders) in rooms to which those signals propagate, contain an address, chosen for each message by a scheduling PC.

Each mobile transponder has a unique address, and compares this with the address contained in each incoming radio message. If the addresses match, the mobile transponder emits a short pulse of ultrasound, which is detected by a set of receivers (each room has its own receiver set). These receivers include a counter, synchronized with the radio messages by means of a wired network, and it is therefore possible to determine the time-of-flight of the ultrasonic pulse from the mobile transponder to each receiver that detects it.

An estimate of the speed of sound in each room (derived from the ambient temperature) is used to calculate the corresponding transponder-receiver distance.

A non-linear model is then fitted to these distances and the known receiver positions by a regression algorithm which runs on a positioning PC (connected to the receiver set by means of a matrix manager).

A global time signal is sent by a clock generator to the zone manager and matrix manager(s). This signal ensures that the Scheduling PC knows which mobile transponder was triggered in a particular timeslot. It also ensures that, if sufficient ultrasonic signals from that mobile transponder are detected, the positioning PC dealing with the room in which the ultrasonic signals were generated knows where a mobile transponder was at the start of the timeslot.

By correlating these two items of information in a software entity called an area manager, it is possible to determine the 3D position of a mobile transponder at a particular time.

The aforesaid system subject of the above-numbered Patent Applications is later described in more detail.

The system implementation described in the aforesaid Patent Applications has 40 ms timeslots, but these could be shortened to around 20 ms without affecting the basic operation of the system. However, reverberations of an ultrasonic pulse in a typical office may last up to 20 ms, therefore the timeslots cannot be made shorter than this interval. Thus considering the case of a system in which all mobile transponders are in a single room, then with say, a 15 ms timeslot, the period in which reverberations from a mobile transponder triggered in one timeslot might reach a receiver which would overlap the period in which signals from a mobile transponder triggered in the next timeslot might reach the receivers. It would then not be possible to determine which mobile transponder had generated a particular signal, and errors may be introduced into the calculation of a mobile transponder's location by using a signal generated by another mobile transponder.

When mobile transponders are distributed between a set of rooms, however, the timeslot duration limitation can be unnecessarily restrictive. The periods in which signals from two or more mobile transponders are in flight may overlap safely if it is certain that the signals do not overlap physically. For example, if two mobile transponders are in separate rooms, which are ultrasonically isolated from each other, then the intervals over which their signals are in flight may be overlapped without the possibility of signal cross-contamination. Similarly, in large open-plan offices, the regions in which signals are detected by receivers can be examined, and if those regions are distinct and separated by a significant distance, it can be assumed that the ultrasonic signals will not cross in space.

This consideration appears to suggest that a zone manager could address two or more mobile transponders simultaneously (or as nearly simultaneously as the radio trigger link would allow), as long as those mobile transponders are in separate rooms (or separate ultrasonic spaces).

However, bearing in mind the mobility of the transponders, as the ultrasonic signals contain no addressing information, so a set of signals detected by receivers in an ultrasonic space could have been generated by any of the two or more simultaneously addressed transponders. It would then be impossible to determine which particular mobile transponder was at which location.

Past location information for the mobile transponders might provide some guidance in this matter, but would not rule out the possibility that a number of the mobile transponders had been transposed.

It is therefore necessary to provide some other means by which the area manager can identify which set of detected signals was generated by which mobile transponder.

In our UK Patent Application No 9808526.9 there is provided a system which enables the position of each of a plurality of labelled objects in a specified environment to be determined by determining the transit time of slowly propagating energy transmitted from a transmitter on each labelled object to a plurality of receivers positioned at fixed points in or around the specified environment, and computing therefrom the actual distance of the transmitter from the receivers, wherein the transmission of the slowly propagating energy is initiated by a burst of high speed propagating energy from a master transmitter located so as to cause transmitted bursts of such high speed energy to enter the said environment, the transmitter on the object being controlled by a receiver adapted to respond to an appropriately encoded burst of such high speed energy, each said burst being encoded so that only one of the object mounted receivers is triggered by each burst (each transmitter/receiver combination being referred to as a transponder), to thereby initiate a burst of slowly propagating energy therefrom, wherein the specified environment has at least two zones substantially isolated from one another in respect of the slowly propagating energy, the times at which the transponders are triggered on objects hitherto understood to be in one zone (one set of transponders) are staggered within common timeslots with respect to the times at which the transponders are triggered on objects hitherto understood to be in another zone (another set of transponders), each timeslot being of a sufficient length to enable the receivers to respond to the slowly propagating energy transmitted by the triggered transponders in both the first zone and the or each other zone, and an algorithm is applied to verify the consistency of the transit times of the slowly propagating energy when ascribed to the different sets of transponders.

The slowly propagating energy is typically ultrasound and the high speed energy is radio waves, and in order to be able to distinguish between sets of signals from different mobile transponders, it is first assumed that two different transponders are in different ultrasound zones, the triggering times of those two different mobile transponders (one from each of the two sets) are staggered, and the system is adapted so that receivers are triggered when the first of the said two different mobile transponders is triggered, and the normal 20 ms timeslot is extended by $$(m-1) \times i,$$

(where m is the number of mobile transponders triggered in the staggered sequence, and i is the stagger time).

A nonlinear regression calculation used to determine the 3D positions of the mobile transponders should only converge to a solution if it is given a set of consistent transponder-receiver distances and receiver positions. Thus if receiver detected signals are ascribed to the wrong mobile transponder (because it has moved from one zone into another), the pulse times-of-flight calculated for the receiver detected signals will be incorrect, because an inappropriate trigger time will have been used for the signals. The corresponding transponder-receiver distances will then be incorrect, and the nonlinear regression computation will not converge to a solution.

Therefore, given a set of n possible trigger times for mobile transponders, $t_1, \ldots t_n$, in this method embodying a first check is made to see that the number of sets of signals that were detected in independent ultrasound zones is the same as the number of mobile transponders that were triggered. If this is not so, no further use can be made of these readings, because two or more mobile transponders apparently occupy the same ultrasound zones, in which case signal cross-contamination could have occurred.

Then, for each set of signals $s_1, \ldots, s_n$, a set of possible corresponding transmitter-receiver distances is calculated for each trigger time, $d_{11}, d_{12}, \ldots, d_{nn}$. By running a nonlinear regression calculation on each set of transmitter-receiver distances (using an algorithm which uses the positions of receivers that detect the corresponding signals), a set of results $r_{11}, r_{12}, \ldots, r_{nn}$ is obtained. Each value of $r_{xy}$, (where $1 \leq x \leq n$) and $1 \leq y \leq n$ is either a 3D position (indicating that the set of signals $s_x$ could have been generated by a mobile transponder at time $t_y$) or an error value (indicating that the set of signals $s_x$ could not have been generated by a mobile transponder triggered at time $t_y$).

Ideally, one and only one set of signals will be consistent with each trigger time, making it possible to identify which mobile transponder gave rise to those signals (and hence enabling a 3D position to be ascribed to each mobile transponder).

If this is not the case, other heuristics are applied to the results to determine 3D positions for the mobile transmitters. One such heuristic might be that if one set of signals is consistent with two trigger times $t_a$ and $t_b$, but another set of signals is consistent with trigger time $t_a$ and no other set of signals is consistent with trigger time $t_b$, then the first set of signals was probably generated by a mobile transponder triggered at time $t_b$.

Preferably simulations are performed to validate the heuristics used.

The system enhancement provided by our UK Patent Application No. 9808526.9 is also later described in more detail.

THE INVENTION

According to the present invention, there is provided a system which enables the position of each of a plurality of labelled objects in a specified environment to be determined by determining the transit time of slowly propagating energy from a transmitter on each labelled object to a plurality of receivers positioned at fixed points within or around the specified environment, and computing therefrom the distances of the transmitter from the receiver, wherein the specified environment is spatially divided into overlapping cells each having a master transmitter for transmitting a burst of high speed propagating energy for detection by object mounted receivers associated with the object mounted transmitters within the compass of the cell, and wherein each cell is allotted an identifying characteristic, the high speed energy transmission by the different master transmitters are multiplexed in accordance with the identifying characteristics of the respective cells, and no two cells having the same identifying characteristic spatially overlap one another.

Typically the slowly propagating energy will be ultrasound energy and the high speed propagating energy will be radio waves.

In general, the transmitter/receiver combinations on each object will hereafter be referred to as transponders, and the master transmitters will be referred to as radio transmitters.

EXPLANATION AND FURTHER FEATURES

It is clear that the system described in our aforementioned patent application, and which has a single zone manager and associated radio transmitter, cannot be extended to cover an arbitrarily large space, because this would require the radio transmitter to have an arbitrarily large range. In practice, statutory regulations limits the transmitted power output as well as the available frequencies, and hence limit the useful range.

Instead, we must consider a system which has a number of zone managers, each with its own radio transmitter, and each of which is connected to its own scheduling PC.

An overview of this system is given in FIG. 24 of the accompanying drawings. The area around any one of the radio transmitters 300, in which its transmissions can be reliably detected is called a cell. In FIG. 24, five cells are labelled cell 1 to cell 5, respectively. The five cells together cover a larger area.

Zone managers 302 and radio transmitters 300 are placed around the environment such that any point in the large area is covered by at least one cell. Using more transmitters and cells allows even larger areas to be covered, and advantage can be taken of the fact that a combination of smaller cells can have a much higher aggregate location rate than a single large cell.

The cells much be invisible to each other so that transmissions in one cell to not disrupt transmissions in neighbouring cells. This characteristic will be referred to as "orthogonal"—ie neighbouring cells can be described as being orthogonal. This can be achieved in a number of ways, including time-division multiplexing (TDM), frequency-division multiplexing (FDM) and code-division multiplexing (CDM). Each cell is allocated a colour, which is an identifying characteristic used to distinguish between orthogonal channels in a multiplexing scheme. For example, an FDM system may use four frequencies and each cell is allocated one of the four frequencies and one of four colours indicating which of the four frequencies it uses. When colours are assigned to cells, orthogonality of the cells is ensured by ensuring that no two cells with the same colour overlap at any point in space. Each scheduling PC has a globally unique ID, transmitted as part of messages sent out in its associated cell, which allows mobile transponders to distinguish between cells with the same colour.

All scheduling PCs and positioning PCs are interconnected either by a wired or a wireless network. It is also arranged for each scheduling PC to have its own area manager, with which it can communicate across the network via a CORBA interface. There is therefore a one-to-one mapping from Scheduling PCs (and hence zone managers) to area managers. When the system is configured, measurement of the extents of each cell can be used to determine which zone managers could trigger a mobile transponder in each room (or other ultrasonic space). Each position and orientation determined by a positioning PC is sent to the area manager associated with every zone manager which could trigger a mobile transmitter in that room. Therefore, there is a many-to-many mapping from positioning PCs to area managers.

Where the multiplexing scheme used allows simultaneous transmission of addressing signals in overlapping cells (eg FDM, CDM), some or all colours may use the same timeslots, as shown in FIG. 25 of the accompanying drawings. The global clock signal linking zone managers and matrix managers ensures that each system component knows when a timeslot should begin.

Possible position ambiguities could arise if a number of transmitters are triggered simultaneously in cells which overlap, because the ultrasonic signals emitted by mobile transponders contain no addressing information. By a process of elimination, involving coordination between the scheduling and positioning PCs concerned, it may be possible to use knowledge of which zone managers could trigger a mobile transponder in a particular room to determine which mobile transponder were in which spaces. If insufficient data exists to fully determine which mobile transponders were in which spaces, the ambiguous results must be discarded. We can also use the method of staggered triggering of mobile transponders within extended timeslots, as described in our Patent Application No. 9808526.9 to aid identification of the originators of particular signals and/or to increase the aggregate location rate of such a system.

If the multiplexing scheme does not allow simultaneous transmission of the addressing signals in overlapping cells (eg TDM), timeslots are distributed between colours as shown in FIG. 26 of the accompanying drawings. Again, the global clock signal is used to ensure synchronisation between system components. It is still possible to use the method of staggered triggering of mobile transponders within extended timeslots to increase the aggregate location rate of such a system.

Situations must be considered in which a mobile transponder moves from one cell into another. When this happens, the mobile transponder must perform a "handover", so that the control of that mobile transponder passes from one scheduling PC to another, and the mobile transponder will begin to receive messages via another cell.

This transfer of control may be passive or active. In an active handover, the mobile transponder, scheduling PC or other monitoring service decides that a transfer of control is appropriate. This may occur because of poor radio link quality, physical position of the mobile transponder, or a desire to share load between cells. If a requirement to transfer control is established, the current scheduling PC sends a message to the mobile transponder indicating that a handover should take place, along with instructions on how to find the new cell. At the same time, a message is sent to the new (provisional) scheduling PC telling it to start addressing the incoming mobile transponder. Both scheduling PCs address the mobile transponder until the provisional scheduling PC detects that the mobile transponder has picked up its addressing signals (see below). At this point the handover is complete and a message is sent to the old scheduling PC telling it to stop addressing the mobile transponder. If the handover requirement changes during this time, the provisional scheduling PC is informed (it then stops addressing the mobile transponder), and (if a handover is still desirable) a new provisional scheduling PC is assigned.

A passive handover occurs when a mobile transponder determines that it has started to receive messages from a new scheduling PC. Examples of situations in which this might occur are:

1. A mobile transponder moves out of a cell quickly. There is no time to perform an active handover, instead, the mobile transponder fails to receive a message over its radio interface, starts to search for another cell, and finds one.
2. A mobile transponder moves quickly from one cell to another which uses the same multiplexing channel. In this case, the mobile transponder does not miss an addressing message, but detects that it has moved to a new cell, because the cell ID in the incoming messages has changed.
3. A sleeping mobile transponder wakes up, searches to find a cell, and finds one.

In all these situations, there is a requirement to indicate to the new scheduling PC that it must start to address the mobile transponder. This can be thought of as a process of registration, by which a mobile transponder registers its existence to a scheduling PC so that it will be included within the list of transponders to be addressed by the PC, as will become clear later.

As mentioned previously, after an active handover it is necessary for the new scheduling PC to be satisfied that the mobile transponder is receiving its messages. It is also necessary that the mobile transponder is satisfied that location resources will be allowed to it. It is therefore proposed that mobile transponders perform the registration process when they lock onto a new cell, and also that the special transmit bit is set in addressing messages (from the new scheduling PC) that are destined for the mobile transponder that is performing the handover. This bit, when set, causes the mobile transponder to immediately transmit its address over the bidirectional radio channel (and prevents other contending mobile transponders from doing so). This is called triggered registration.

There are therefore three ways in which the mobile transponder can tell the scheduling PC that it is receiving its messages; standard registration, triggered registration, and transmission (and subsequent detection) of an ultrasonic pulse generated in response to an addressing message for that mobile transponder.

The registration processes are particularly useful in the case where ultrasonic signals are not being detected because of obstructions, etc.

There are also two ways that the scheduling PC can assure the mobile transponder that location resources have been reserved for it. First, by an addressing message intended to make that mobile transponder send an ultrasonic pulse, and second, by an addressing message containing a separate acknowledgement field, in which the mobile transponder's unique ID is encoded.

DESCRIPTION OF EMBODIMENTS

First, the basic system described in the aforementioned Patent Applications will be described in detail, in order to facilitate understanding of the present invention. This basic system is shown in the accompanying drawings FIGS. 1 to 23, in which.

Figure 19:
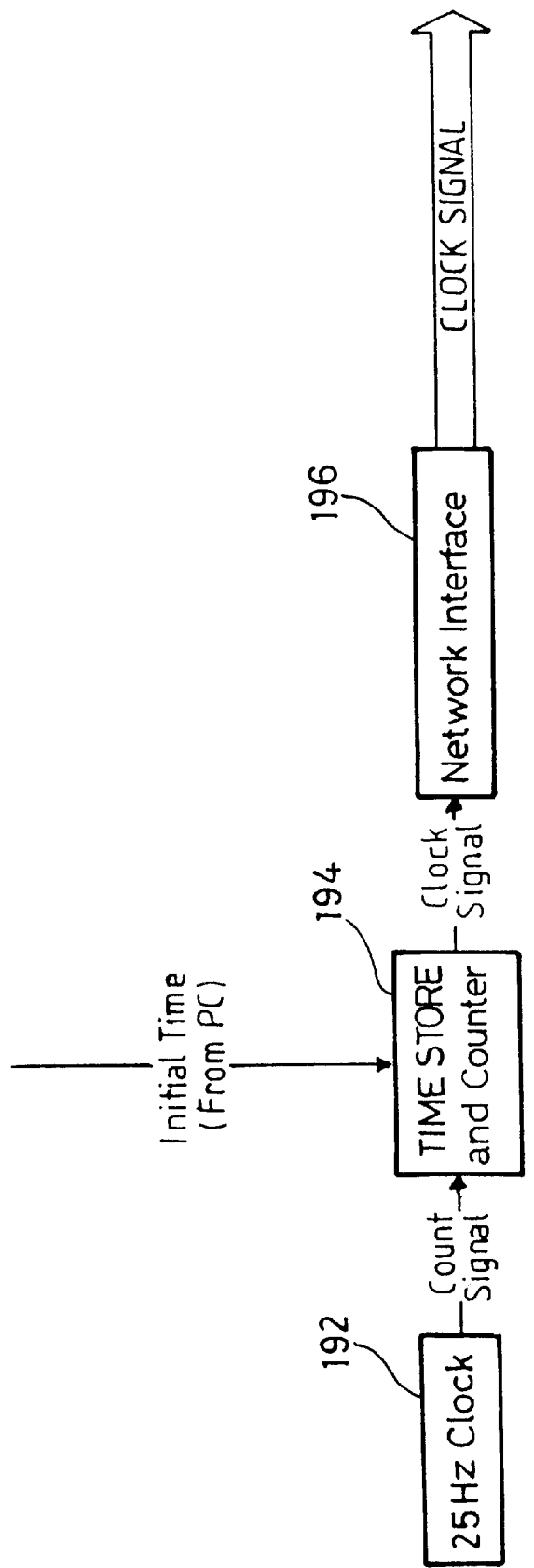
FIG. 19 is a detailed block schematic of the clock generator in FIG. 18.
Figure 20:
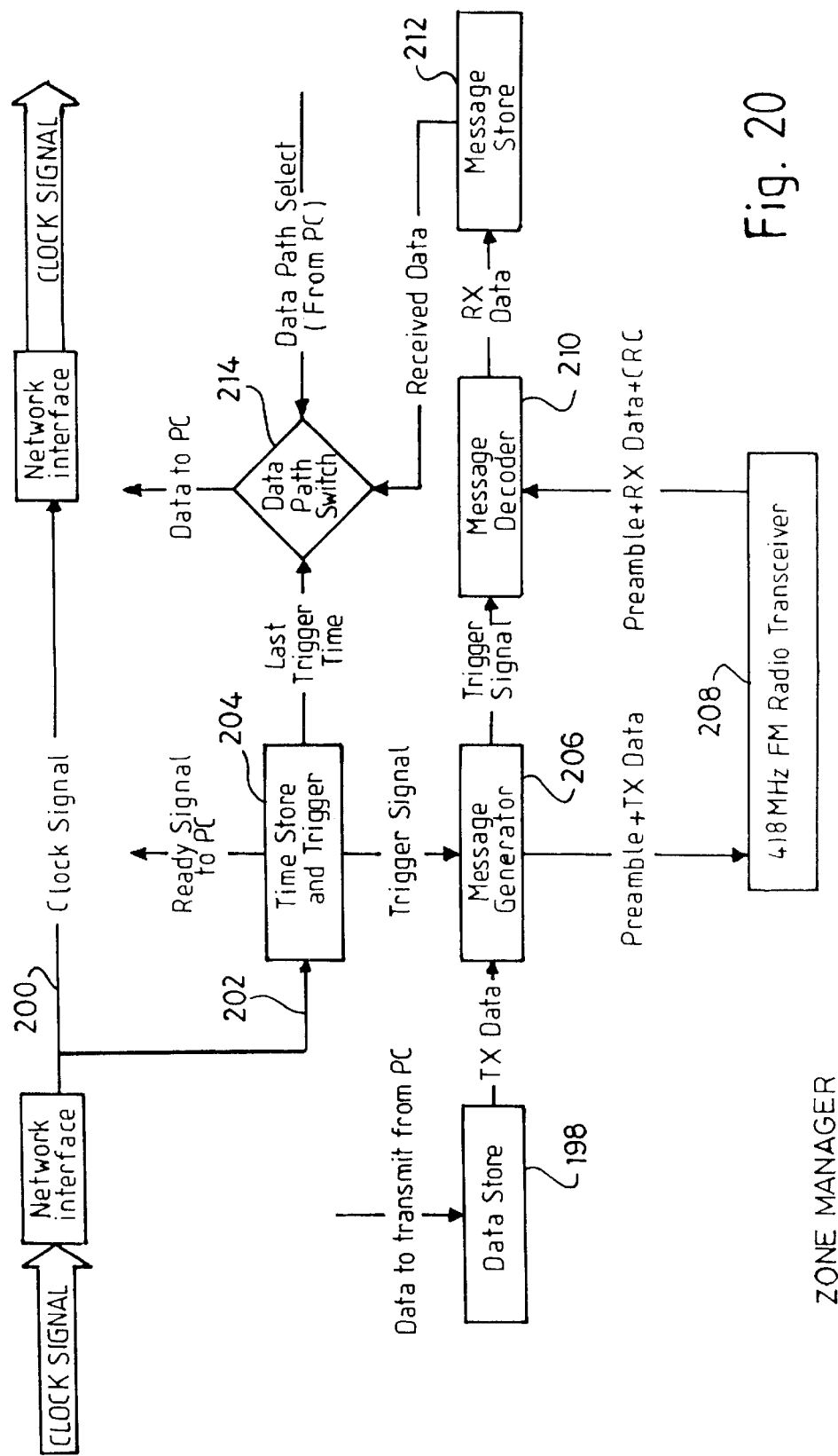
FIG. 20 is a detailed block schematic of a zone manager of FIG. 18.
Figure 23:
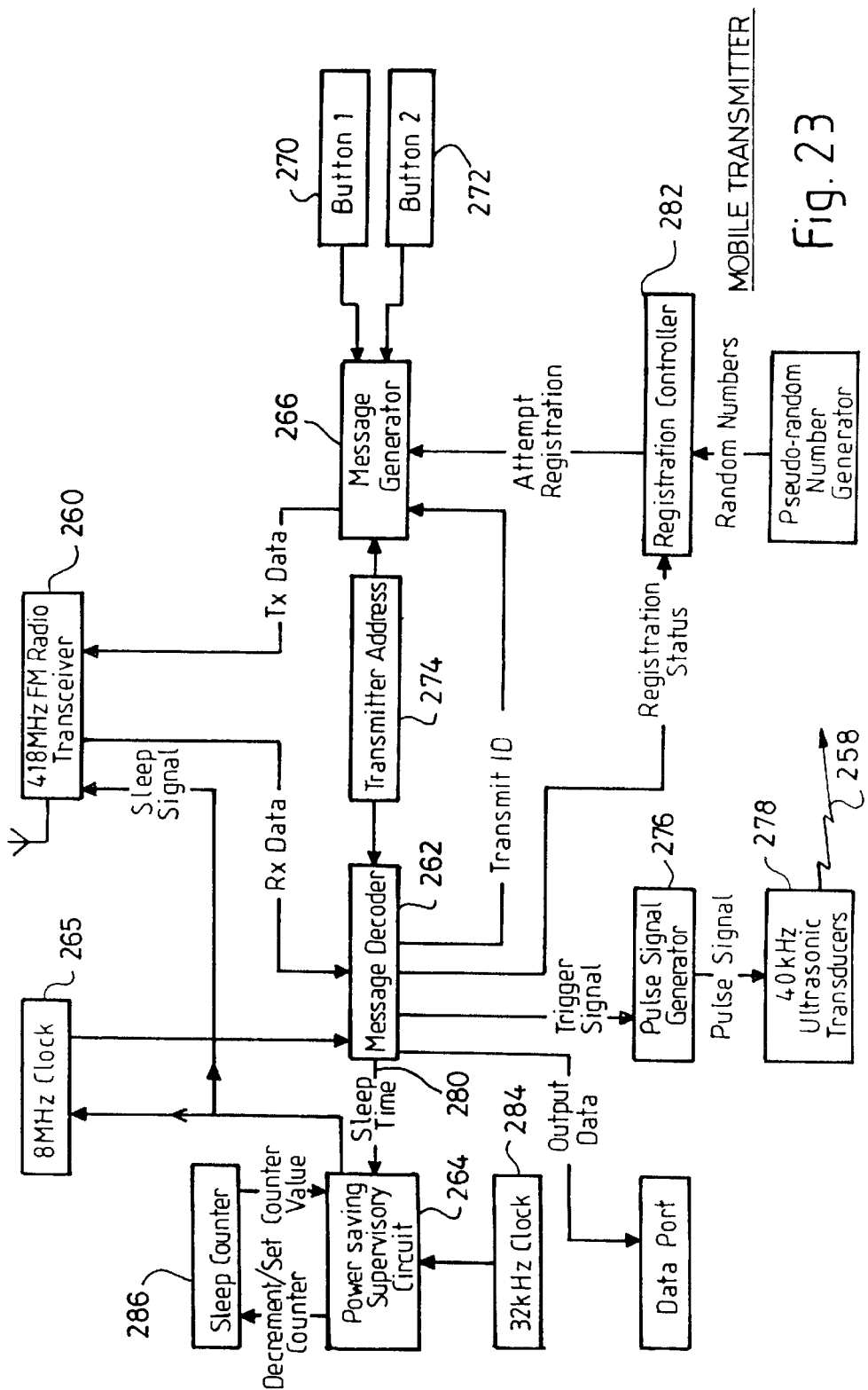
FIG. 23 is a detailed block schematic of a mobile transponder unit such as is mounted on objects in the rooms in the system of FIG. 18.
Figure 24:
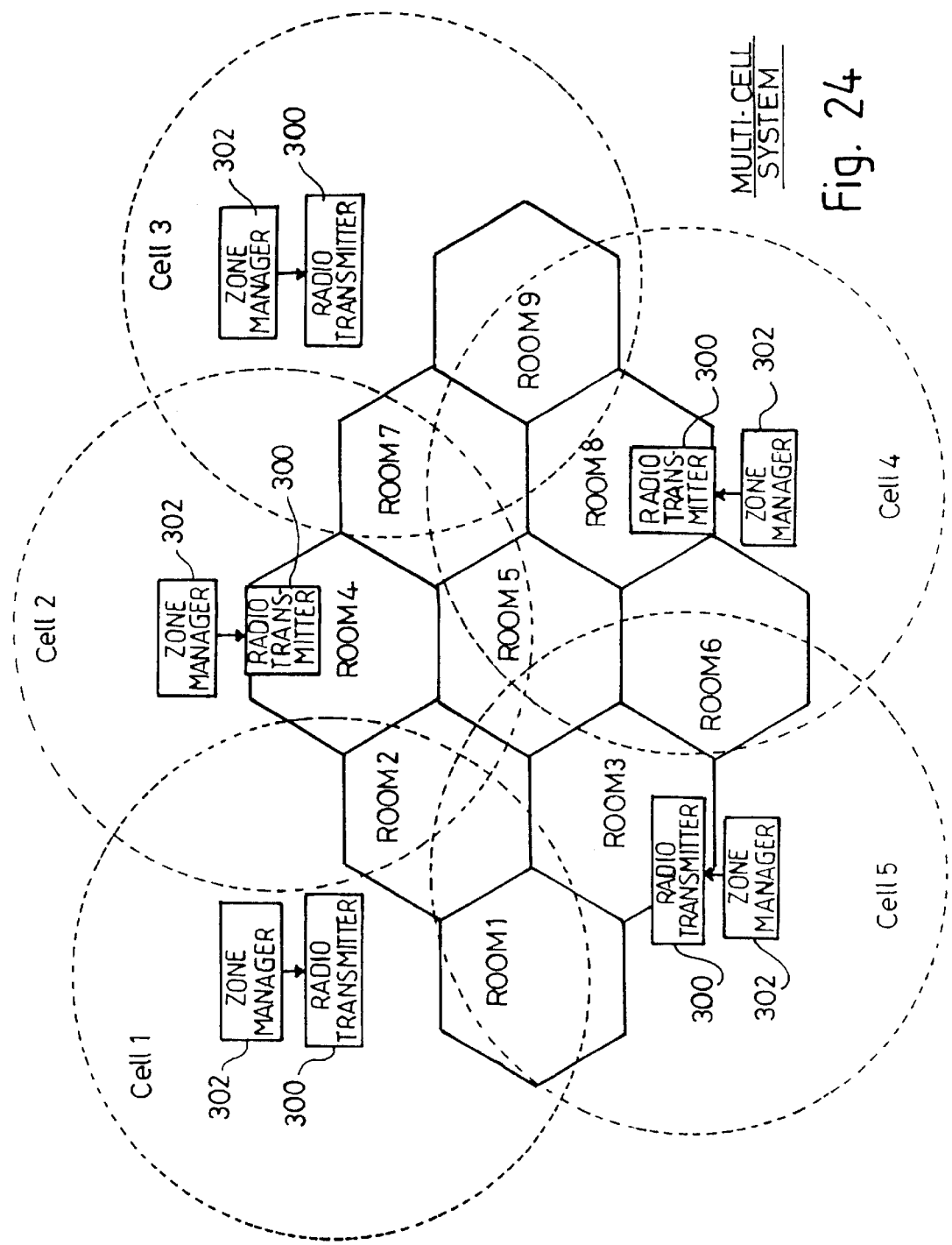
Figure 25:
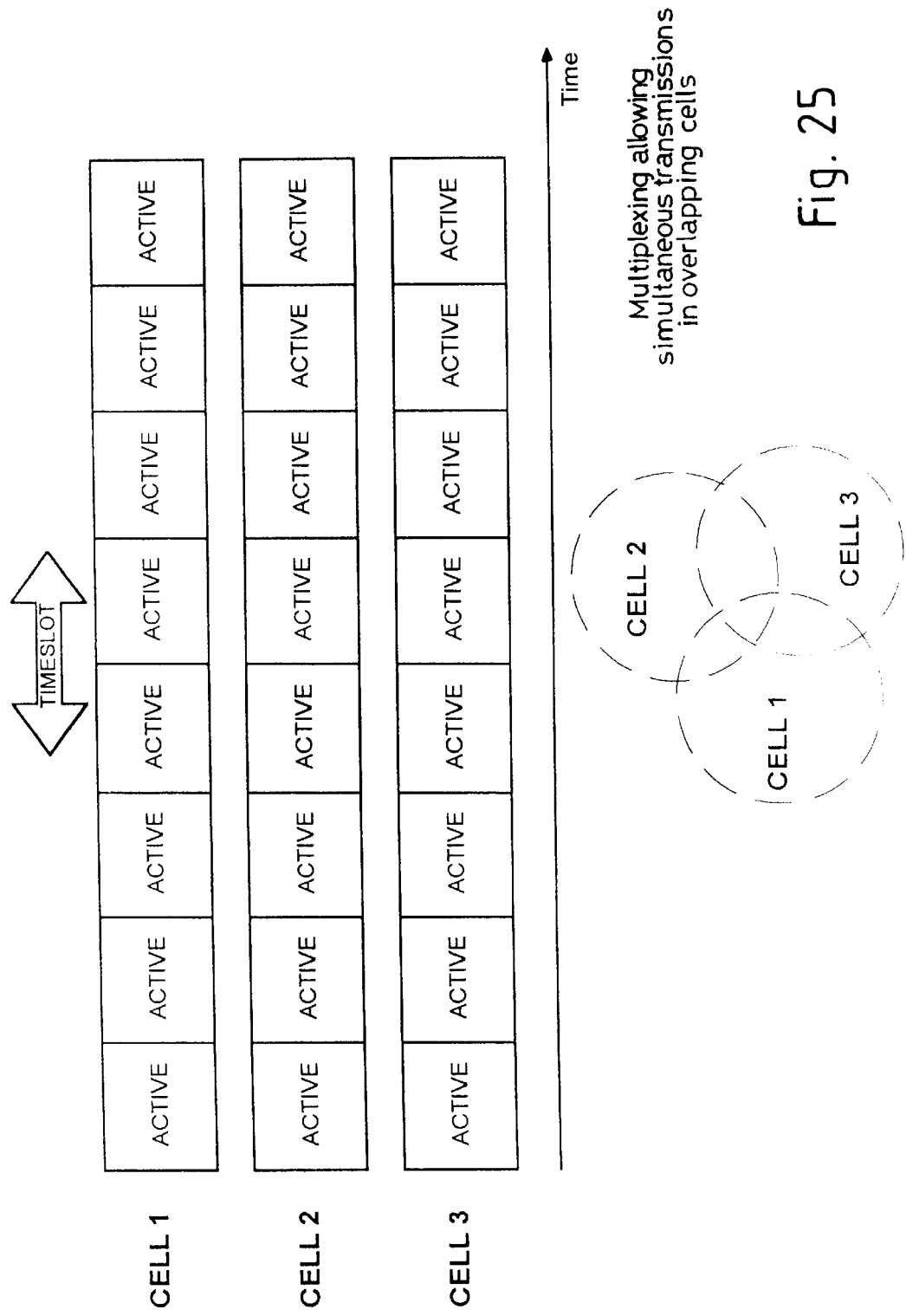
Figure 26:
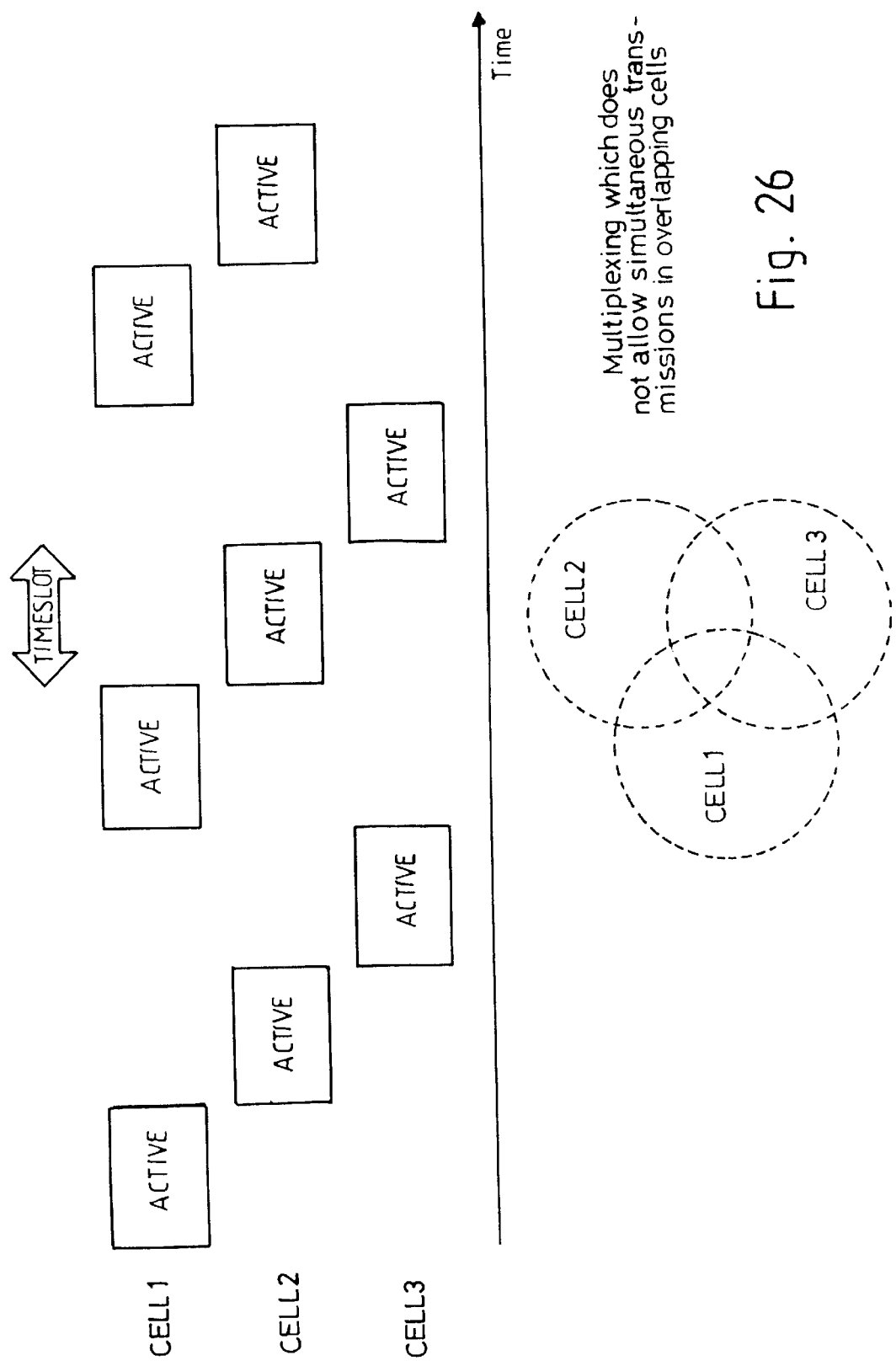
Figure 27:
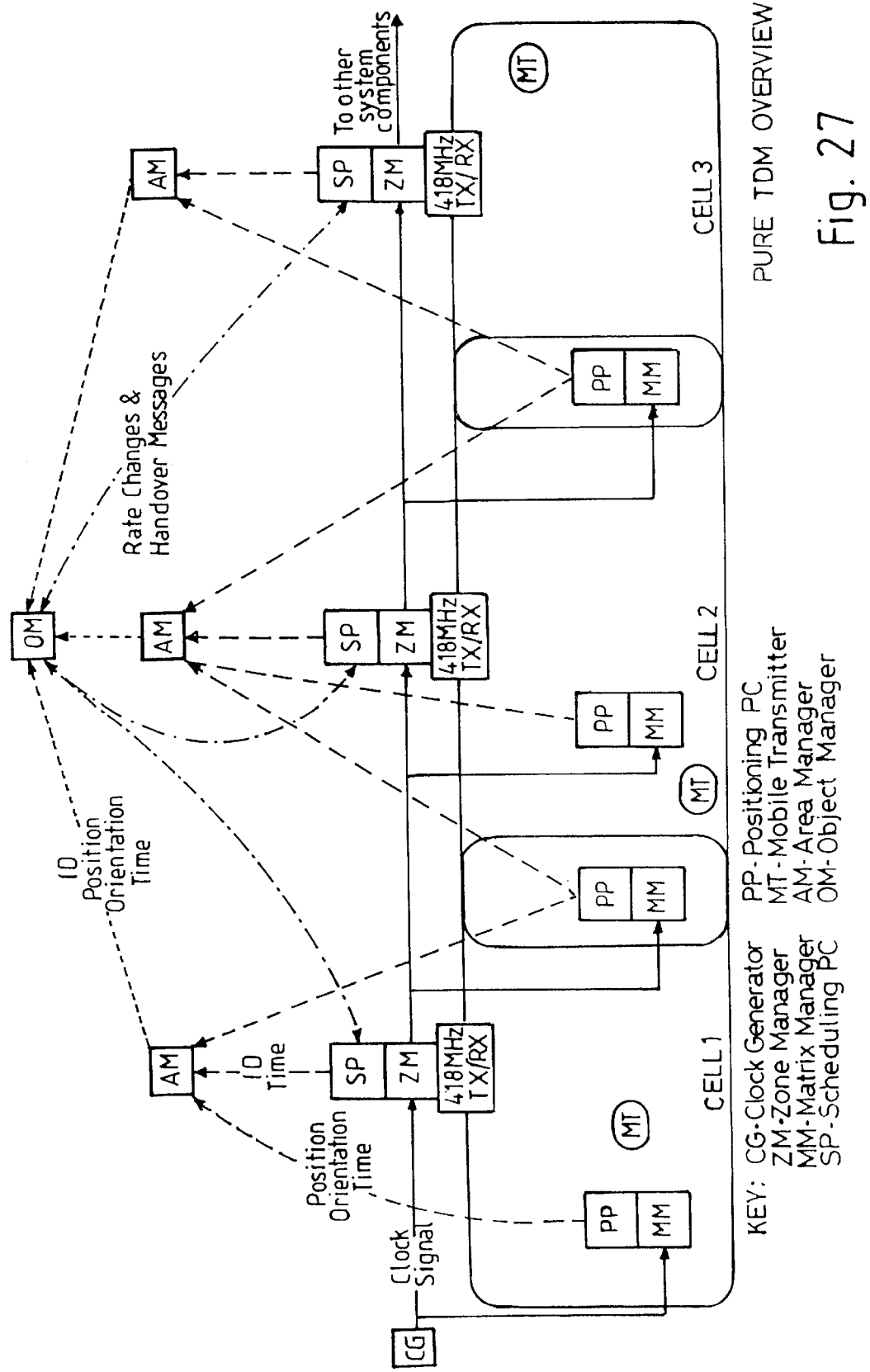
Figure 28:
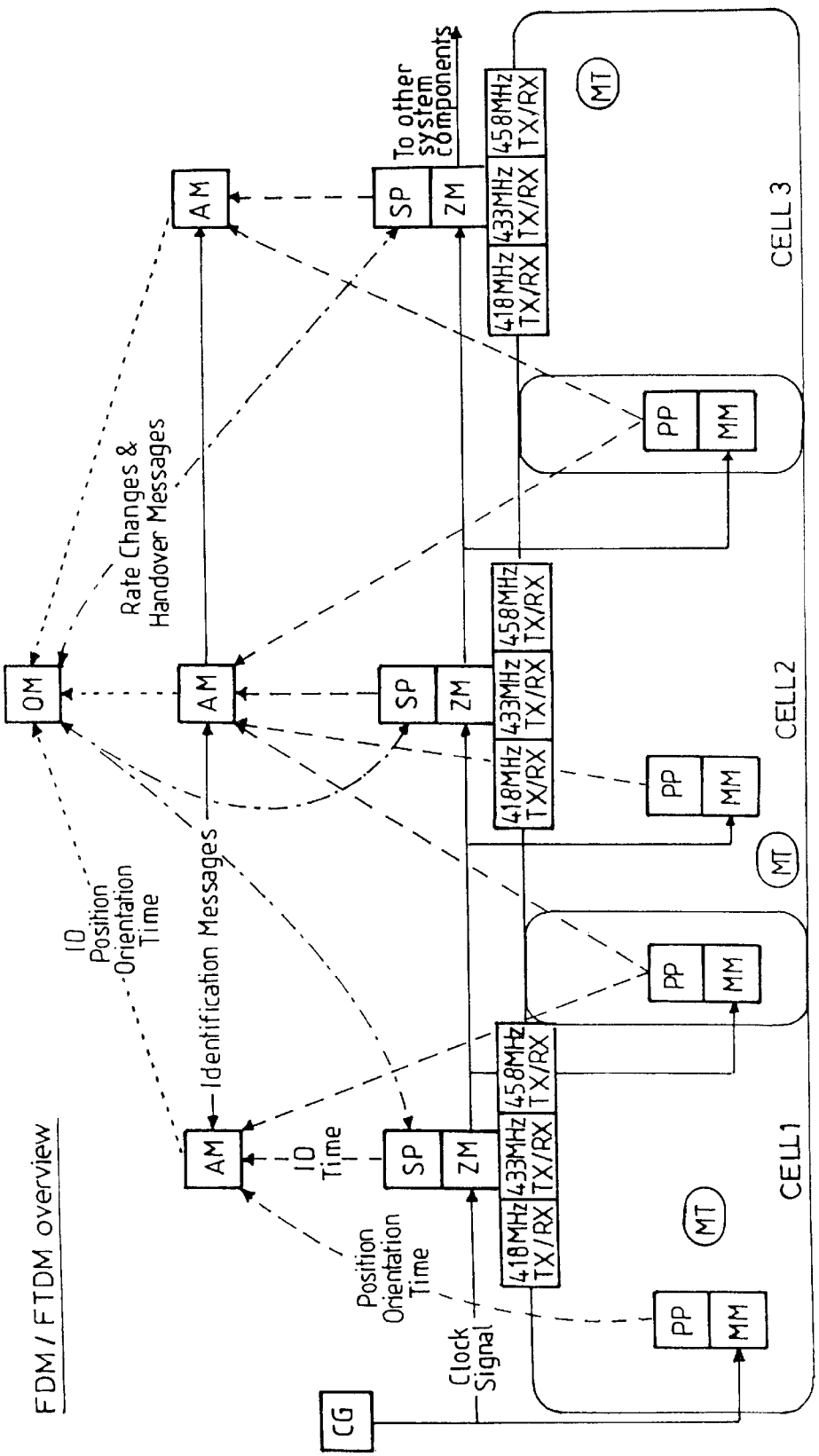
Figure 29A:
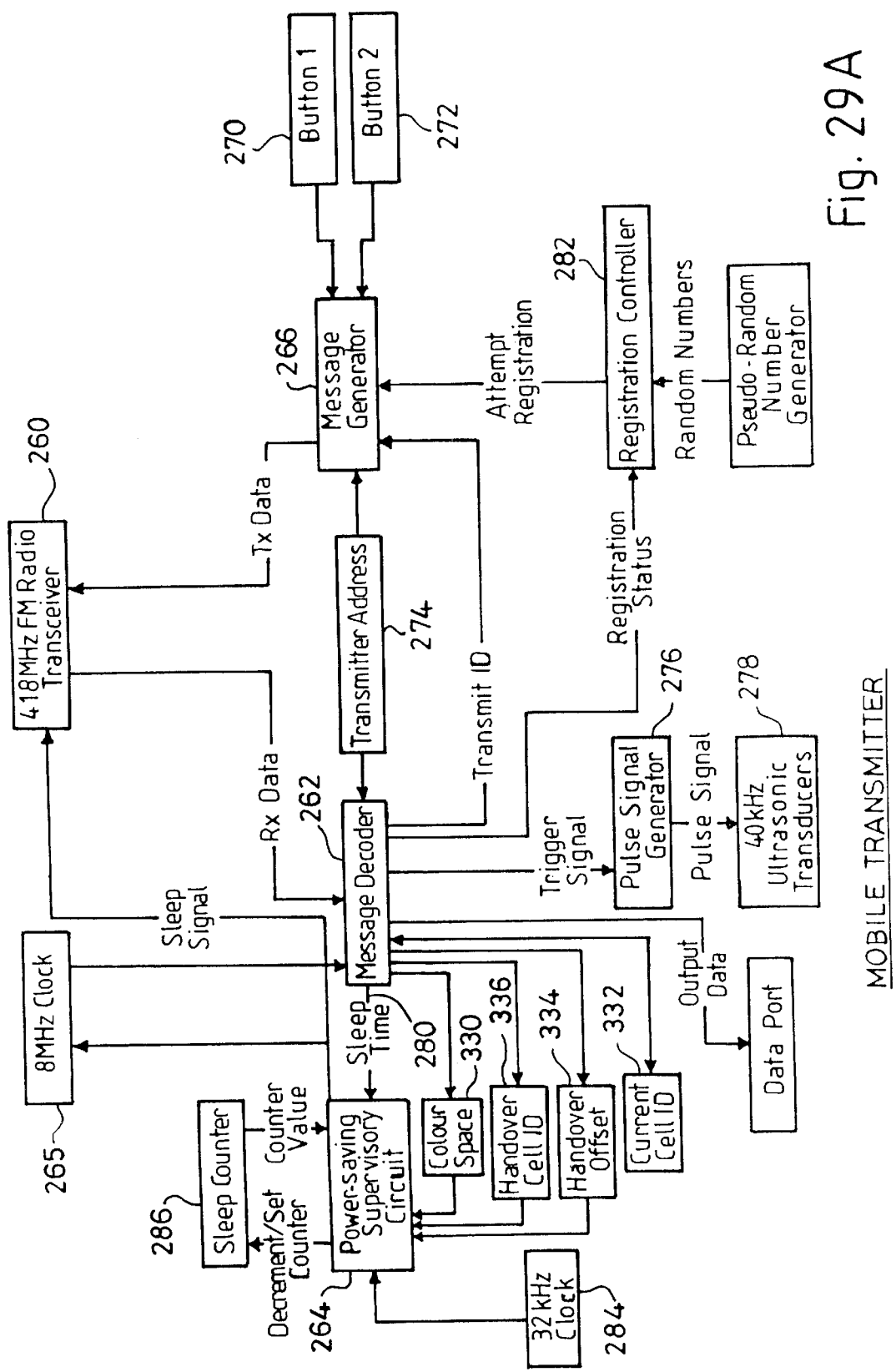
Figure 29B:
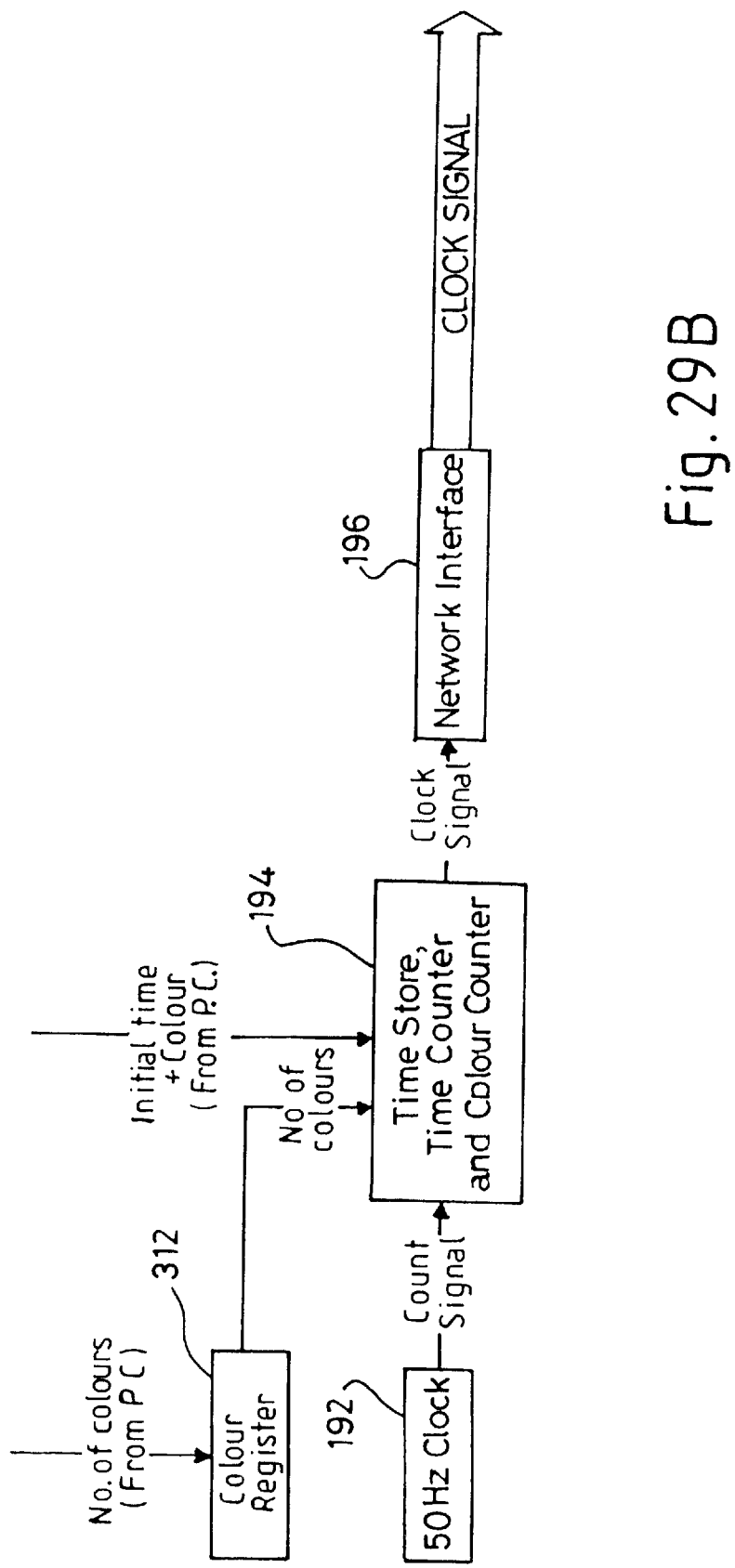
Figure 29C:
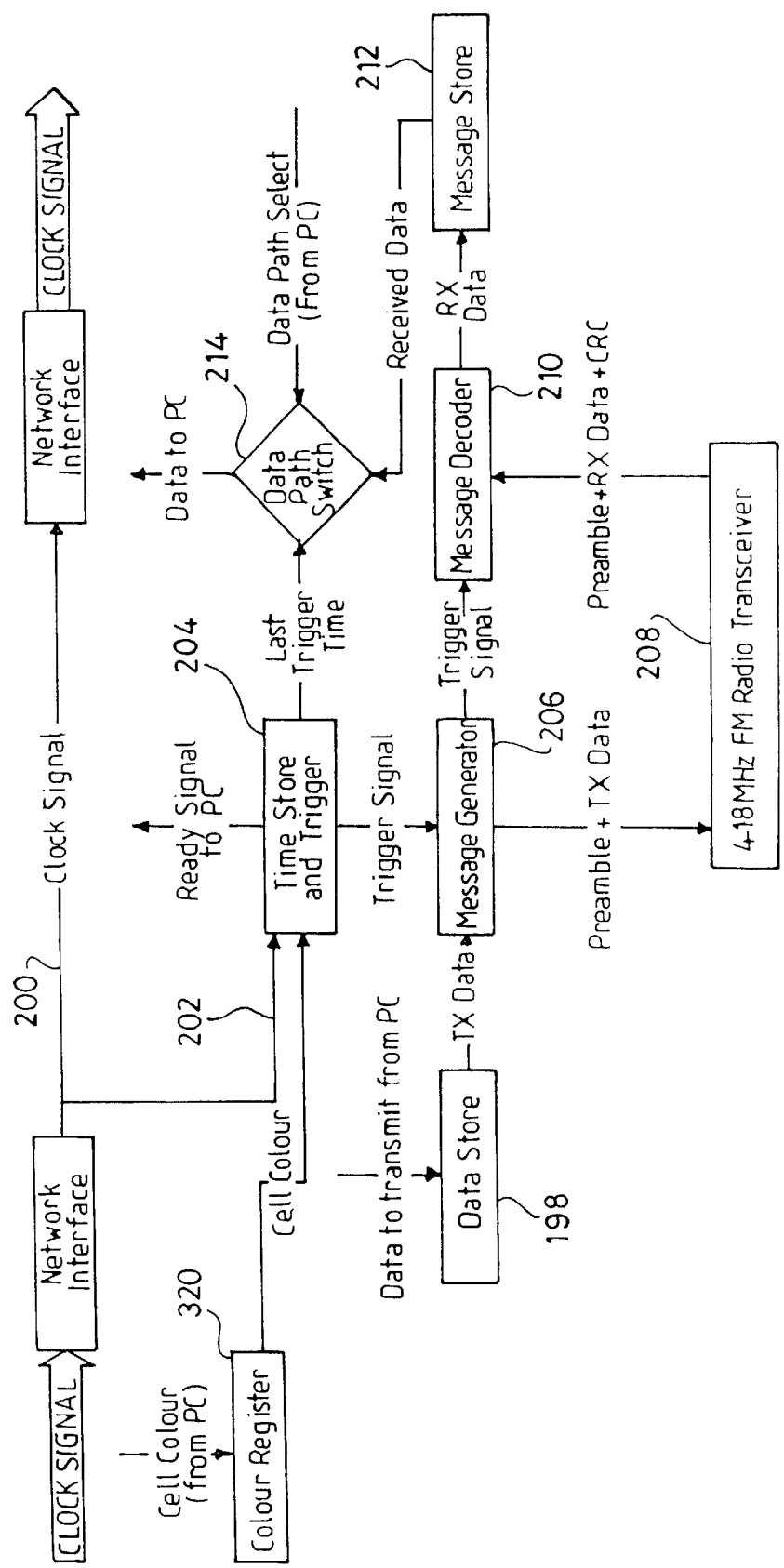
Figure 30A:
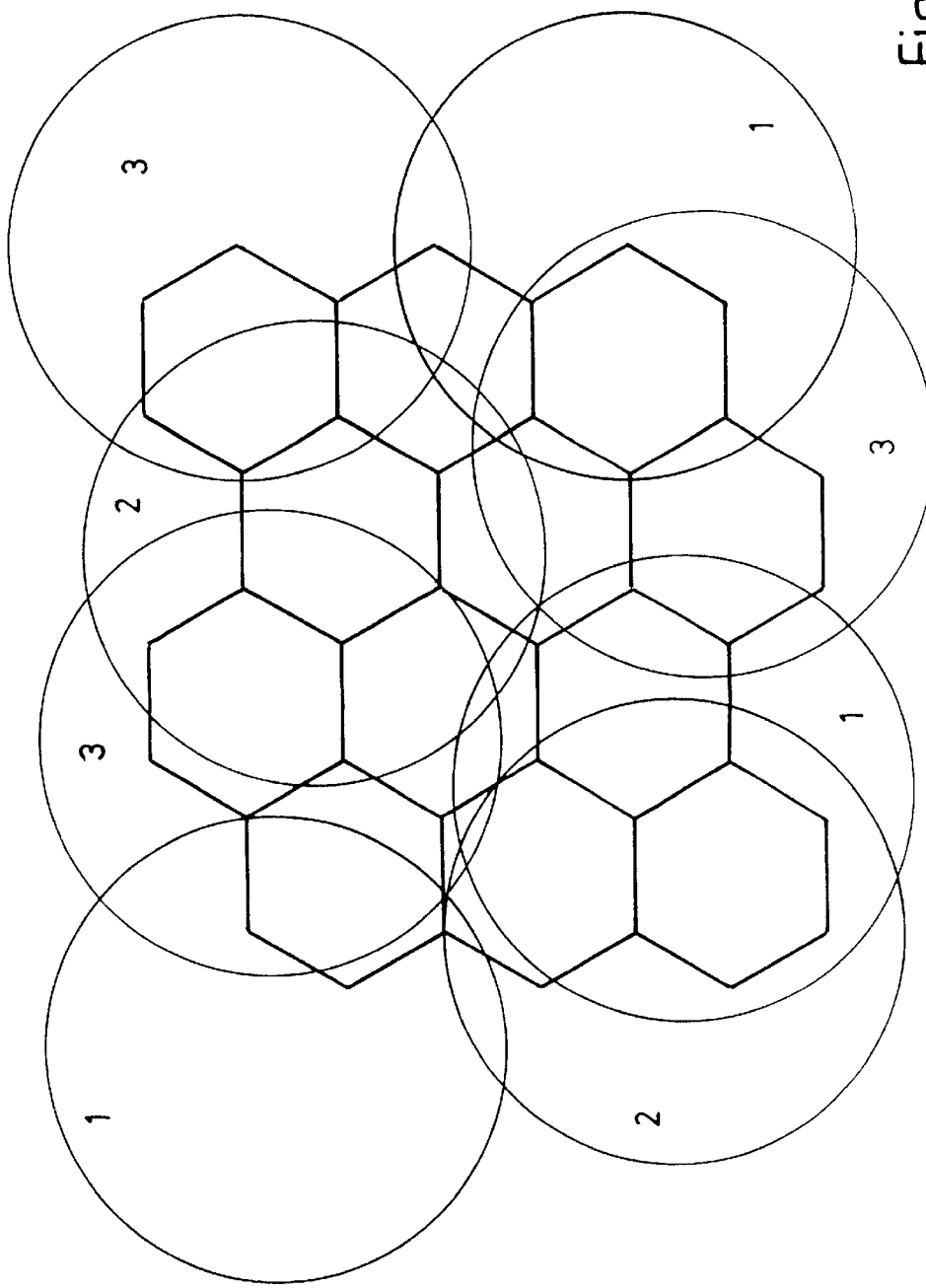
Figure 30B:
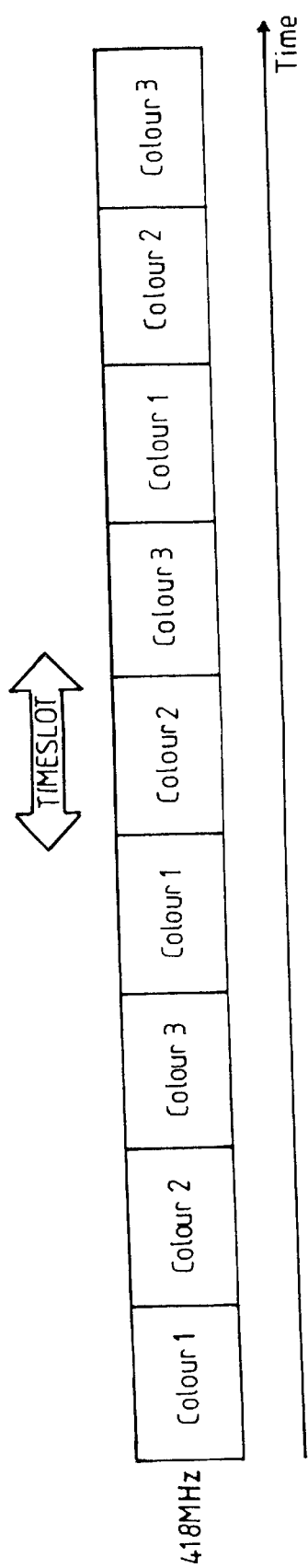
Figure 30C:
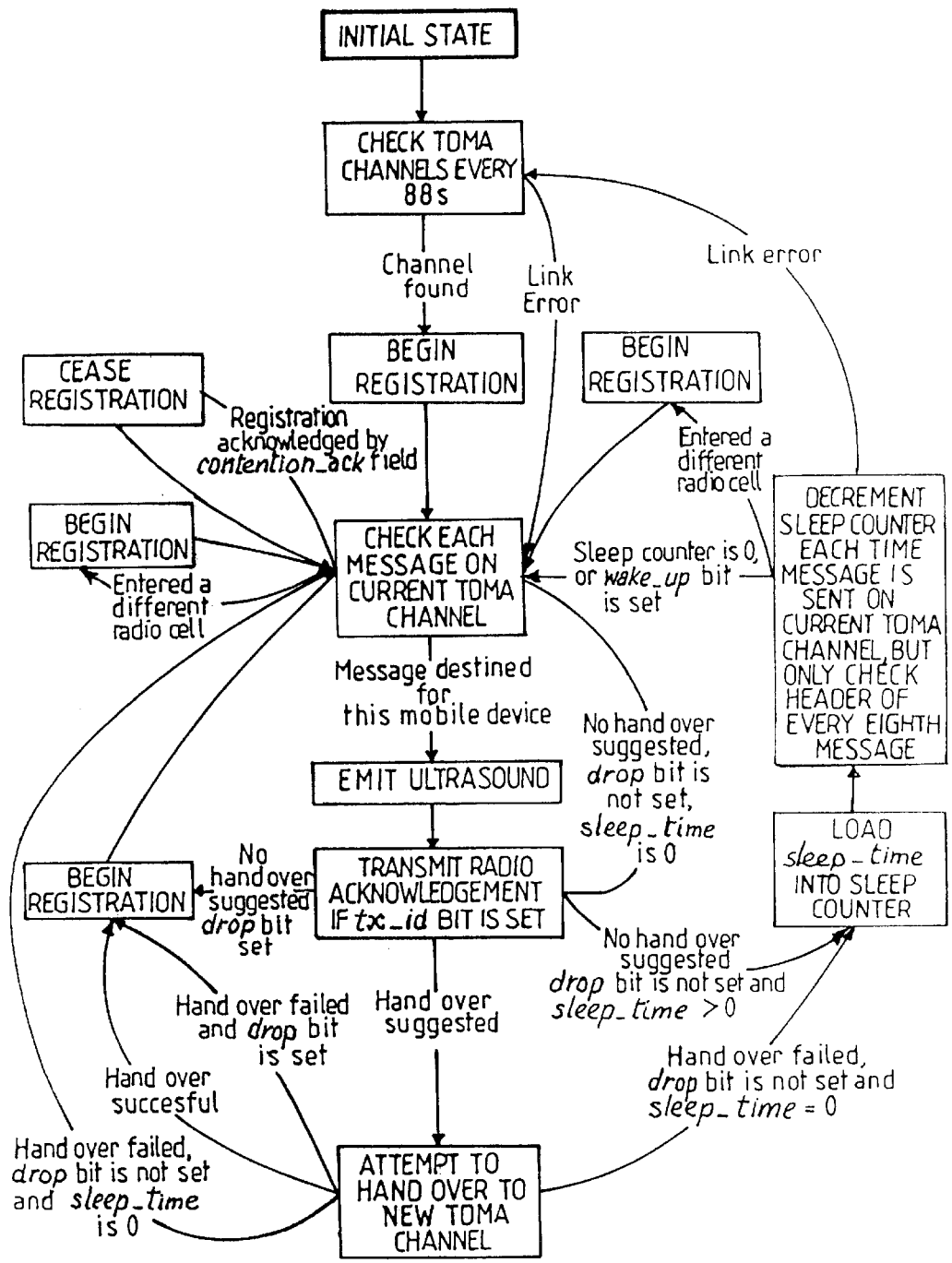
Figure 31A:
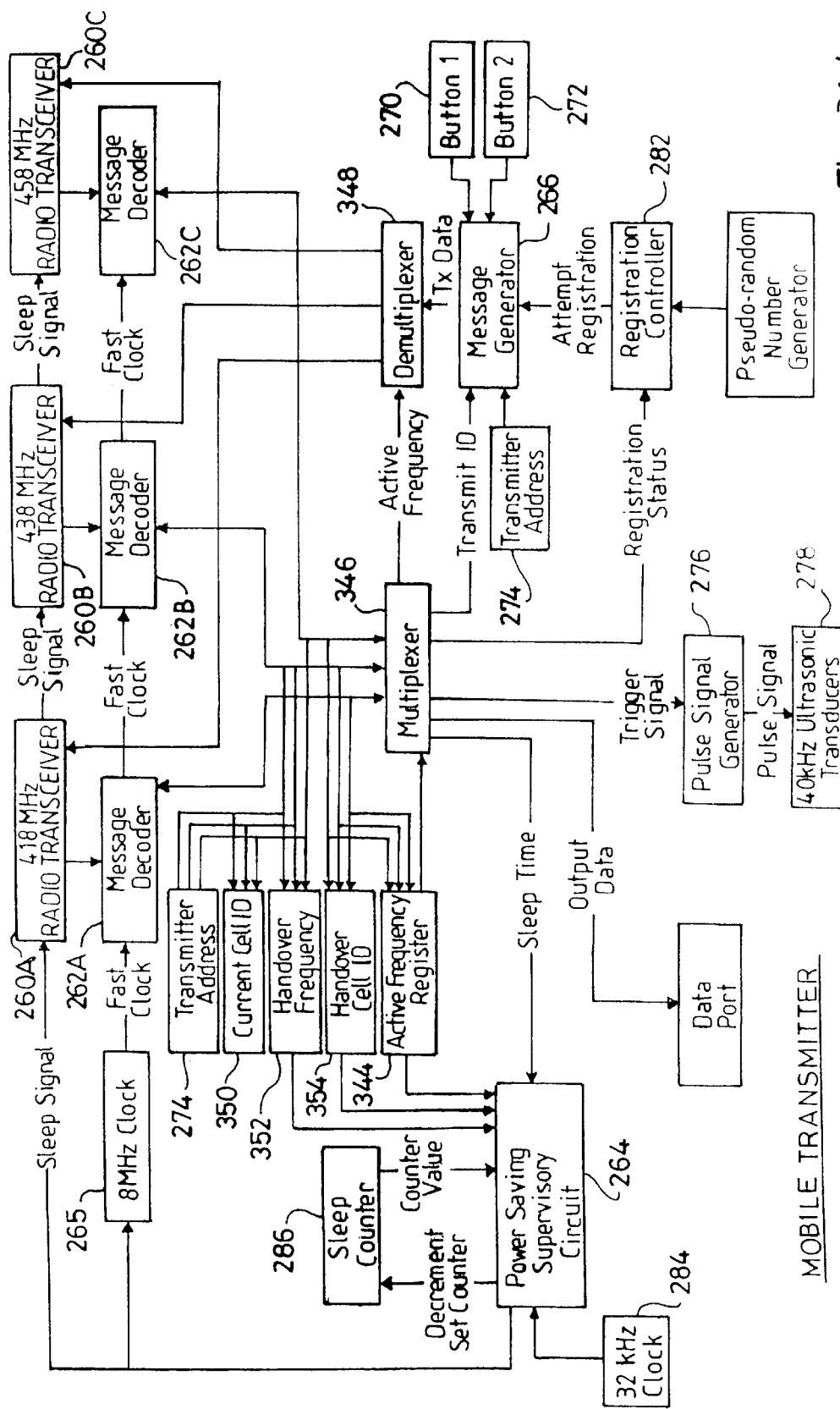
Figure 32:
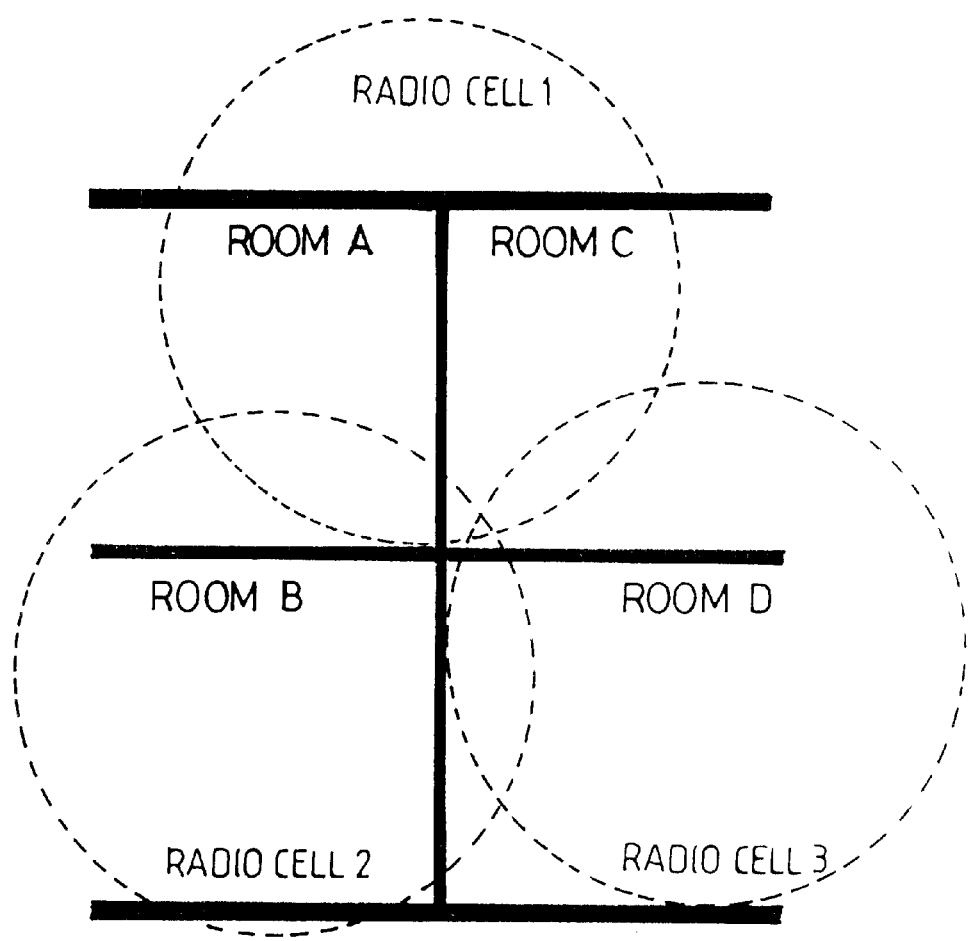
Figure 33A:
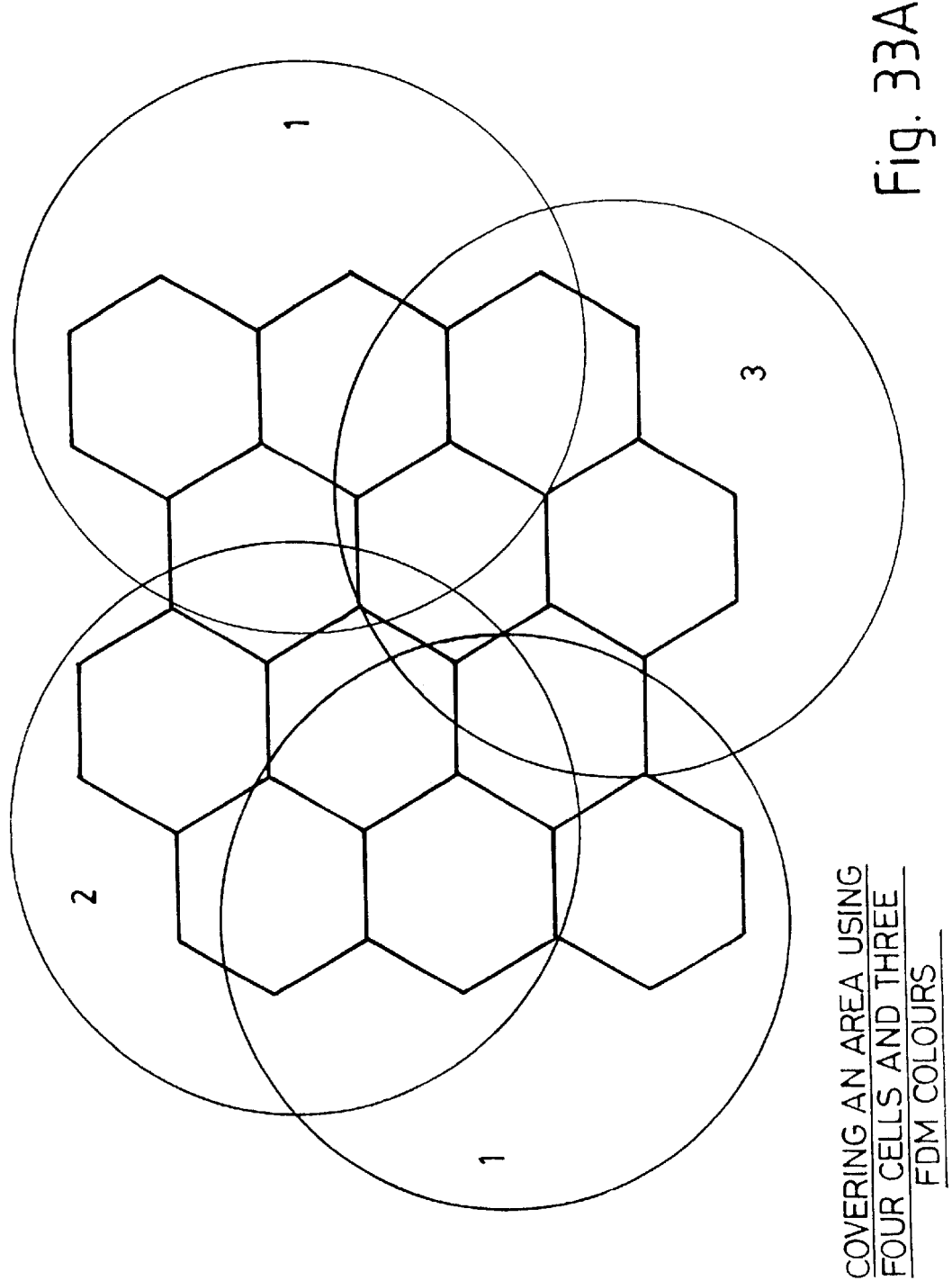
Figure 33B:
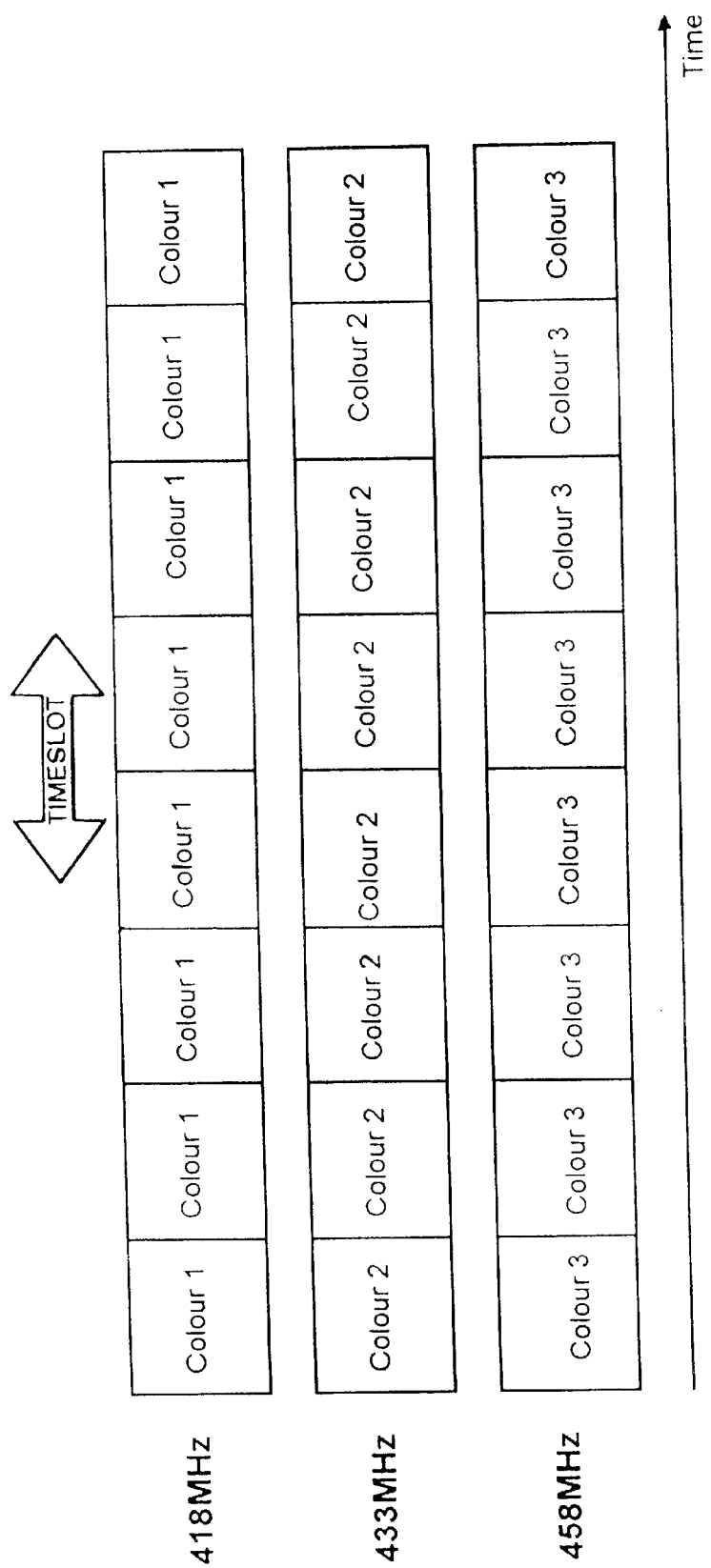
Figure 35:
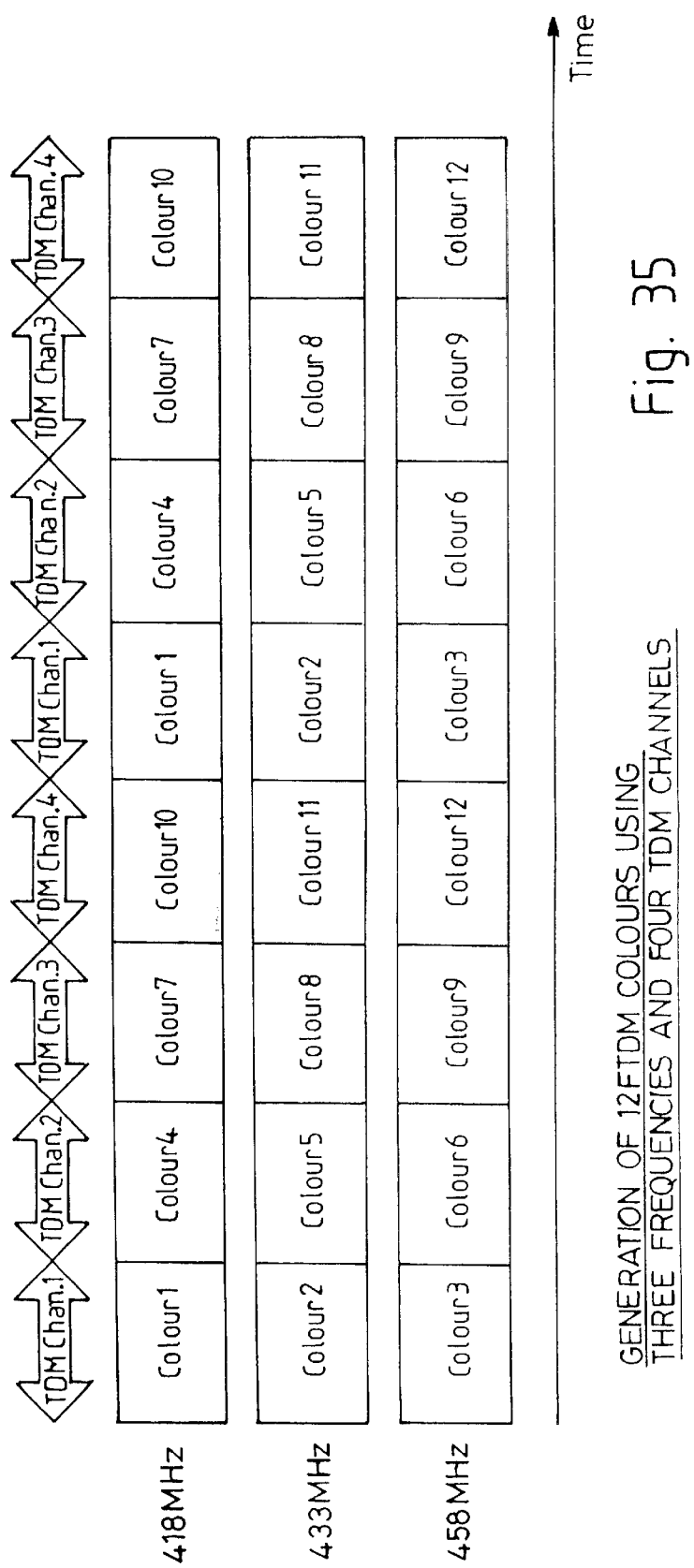
Figure 36A:
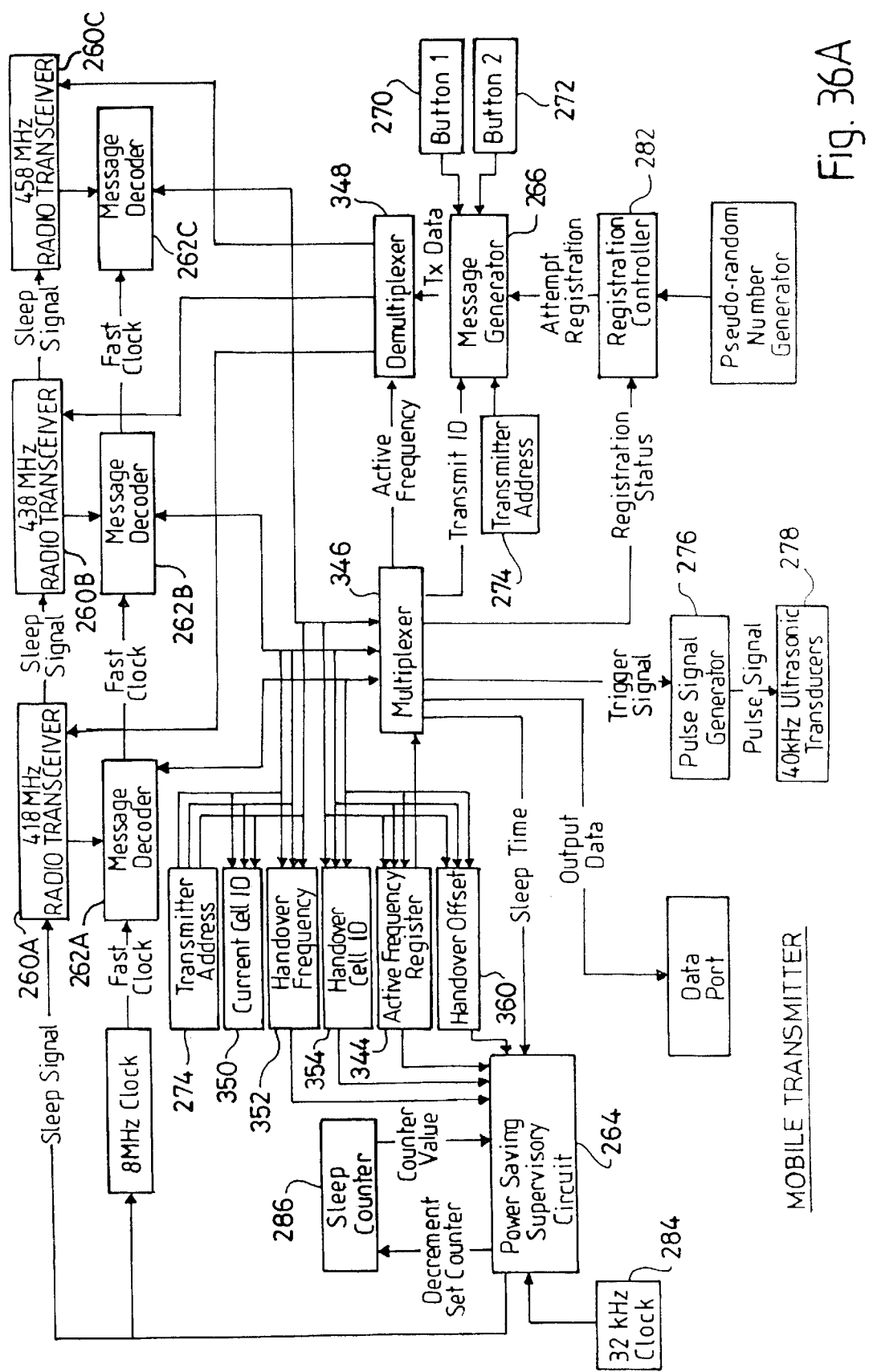
Figure 36B:
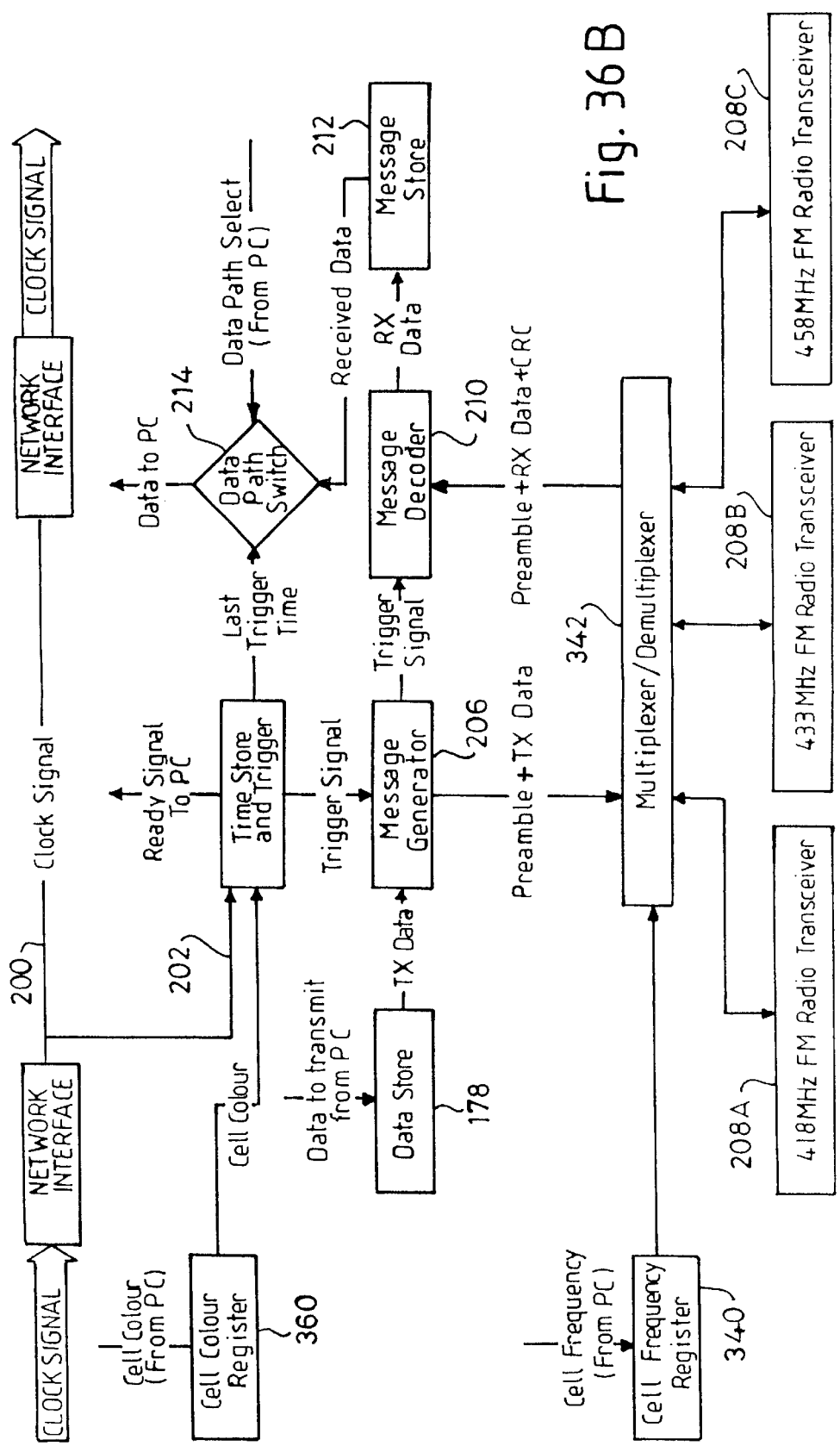

Further figures of the accompanying drawings show embodiments of the invention in which:

FIGS. 24 to 26 show an overview of a system in accordance with the invention having a plurality of zone managers as hereinabove referenced;

FIG. 27 is an overview of a TDM system;

FIG. 28 is an overview of a FDM system;

FIGS. 29A to 29C are block schematic diagrams relating to the system of FIG. 27 being modifications of FIGS. 23, 19 and 20, respectively;

FIGS. 30A and 30B diagrammatically indicate a possible modification;

FIGS. 30C and 30D (1 to 7) are simplified and complex state diagrams for the modification of FIGS. 30A, 30B;

FIGS. 31A and 31B are block diagrams relating to the system of FIG. 28, being modifications of FIGS. 29A and 29C, respectively, FIG. 32 is provided for explanatory purposes;

FIGS. 33A and 33B show a possible modification;

FIG. 34 and FIG. 35 illustrate further possible modifications;

FIGS. 36A and 36B are block schematic diagrams relating to the system of FIG. 35;

FIGS. 37a to 37m are equations (1) to (13), respectively;

FIGS. 38 and 39 are Tables 1 and 2, respectively, and

FIGS. 40 to 49 are Tables A to K, respectively.

OVERVIEW OF THE DRAWINGS

In the drawing a set of ultrasonic receiving elements are placed in a matrix on the ceiling of rooms in which the system is installed, and ultrasonic transmitters are placed on the objects to be located.

An addressable radio link is used to allocate timeslots, transmit the synchronizing timing pulse, and allow transmitting elements to communicate with a coordinating device, eg to register an initial presence.

Radio waves are used because their speed of propagation is very fast, and unknown delays in the radio link will be very small compared to the time-of-flight of, for example, ultrasonic pulses used to measure distances. In this way, to a first approximation, the measurements can be said to be synchronized, and the unknown errors will not significantly reduce the accuracy of the system.

Alternatively a wired network may be used between the fixed receiving elements to distribute a timing pulse. This has the advantage of being less prone to interference, and potentially of lower cost.

At least three receivers must detect valid signals for the system to be able to calculate the position of the transmitter, but if all the receiving elements are coplanar, there can be ambiguity about whether a transmitter is above or below the plane containing the detector—eg the ceiling of a room. This ambiguity can be resolved if it is known for example that all transmitters are always below the ceiling.

The information gathered by this system can be used to automate computing and communications equipment in an intelligent manner. By locating the position of people and equipment for example in an office, hotel, hospital facility or home environment, it is possible for example to route phone calls, dispatch a printing job to the nearest printer, automatically identify the nearest visible screen to a user (for display of information requested by them), and intelligently select camera views in videophone conversations.

Availability of fine-grain high resolution location information can allow new methods of human-computer interaction, e.g. connection of video and audio streams by bringing their endpoints into close physical proximity.

It may also be possible to use a transmitting unit as an input device, e.g. as a wireless mouse, a 3D pointer, or for three-dimensional gesture generation.

It may also be possible to use the information gathered by the system to detect motion (by observing changes in the position of an object over time, or by Doppler methods), and the presence of opaque objects (which may shadow receiver elements), which can be deduced from patterns of reception of the distance measuring pulses.

DETAILED DESCRIPTION OF THE DRAWINGS

Figure 1:
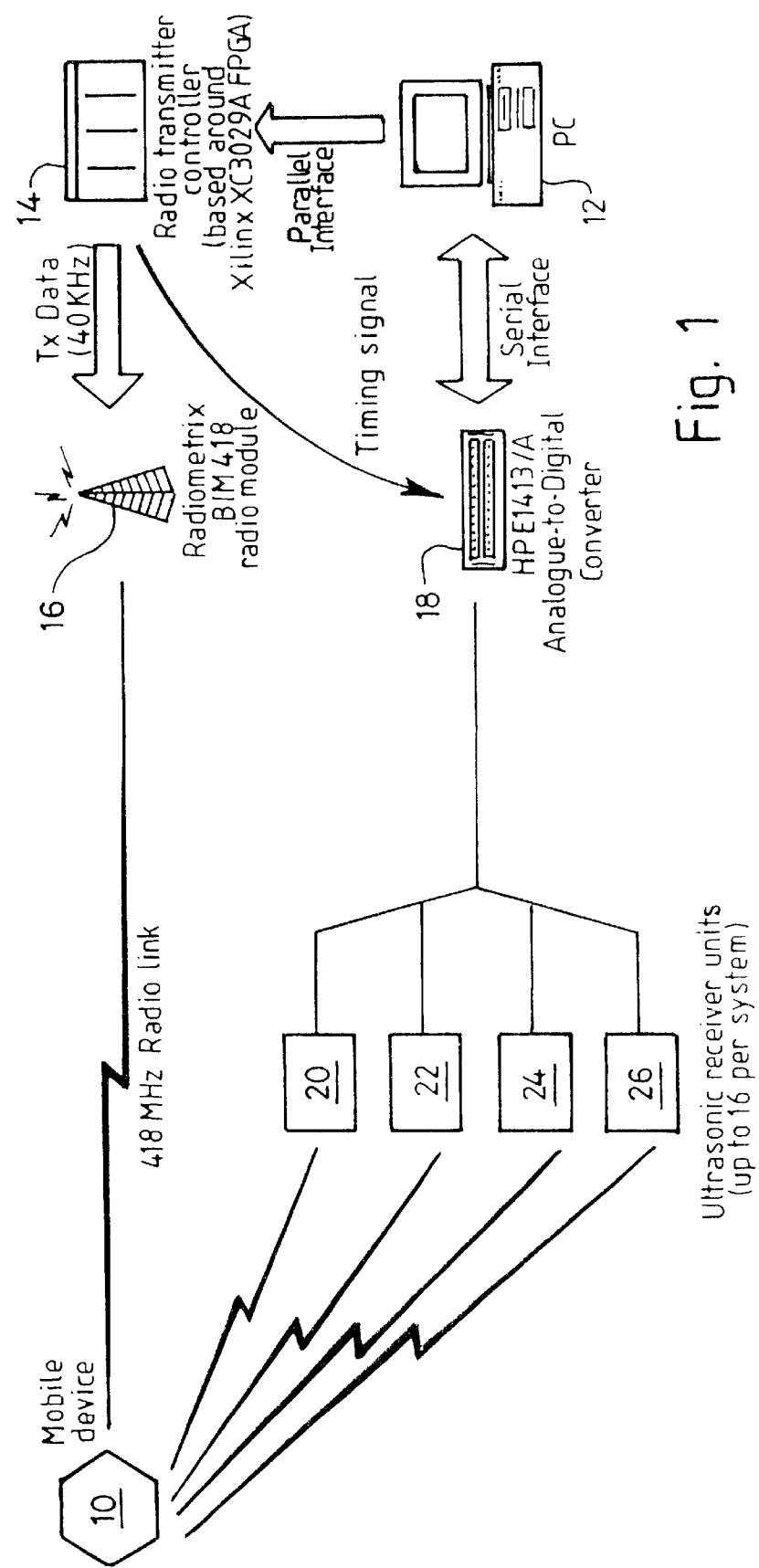
FIG. 1 is a schematic diagram of a positioning system.
Figure 2:
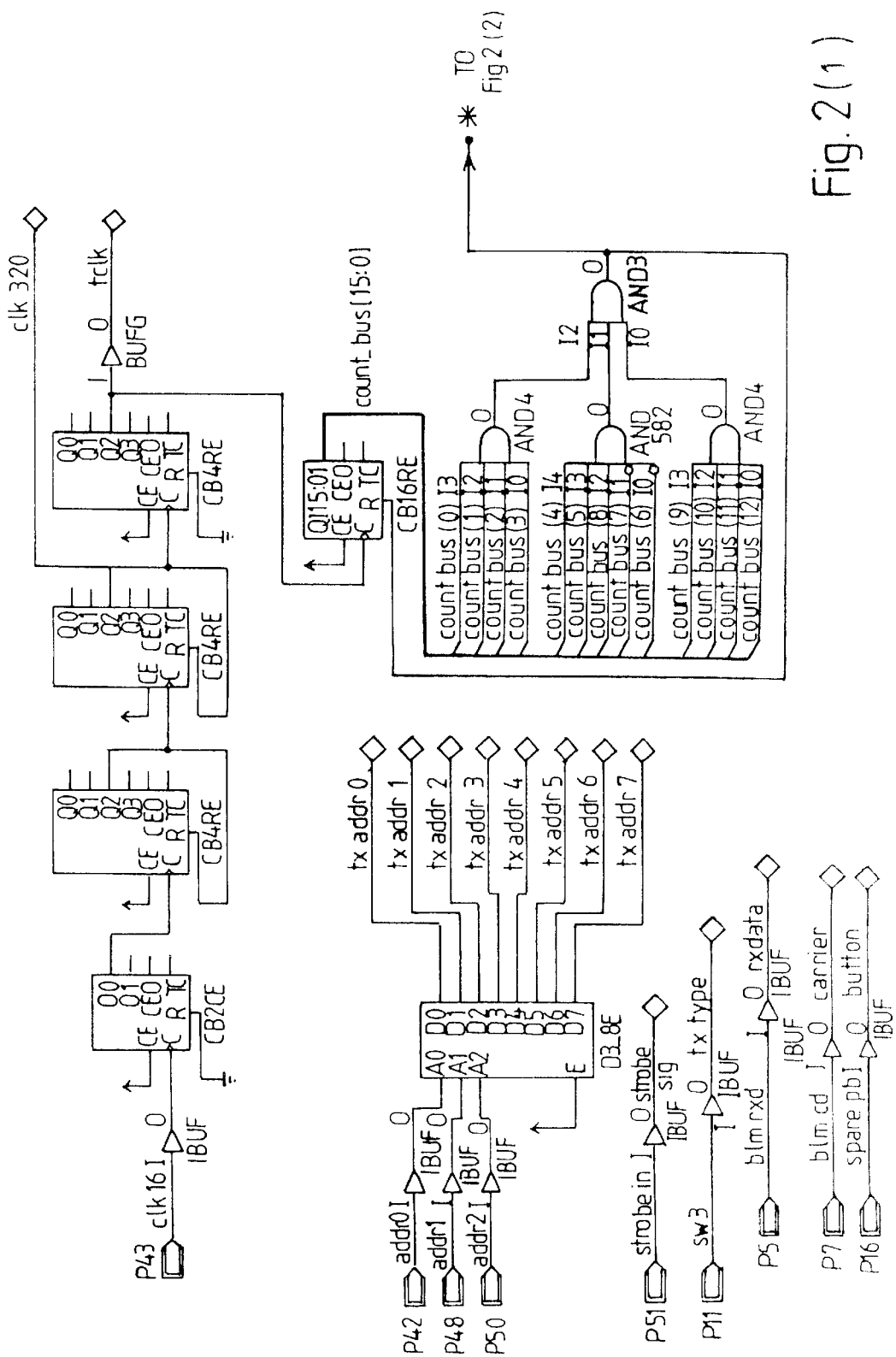
FIG. 2 shows the FPGA configuration of the transmitter unit.
Figure 2B:
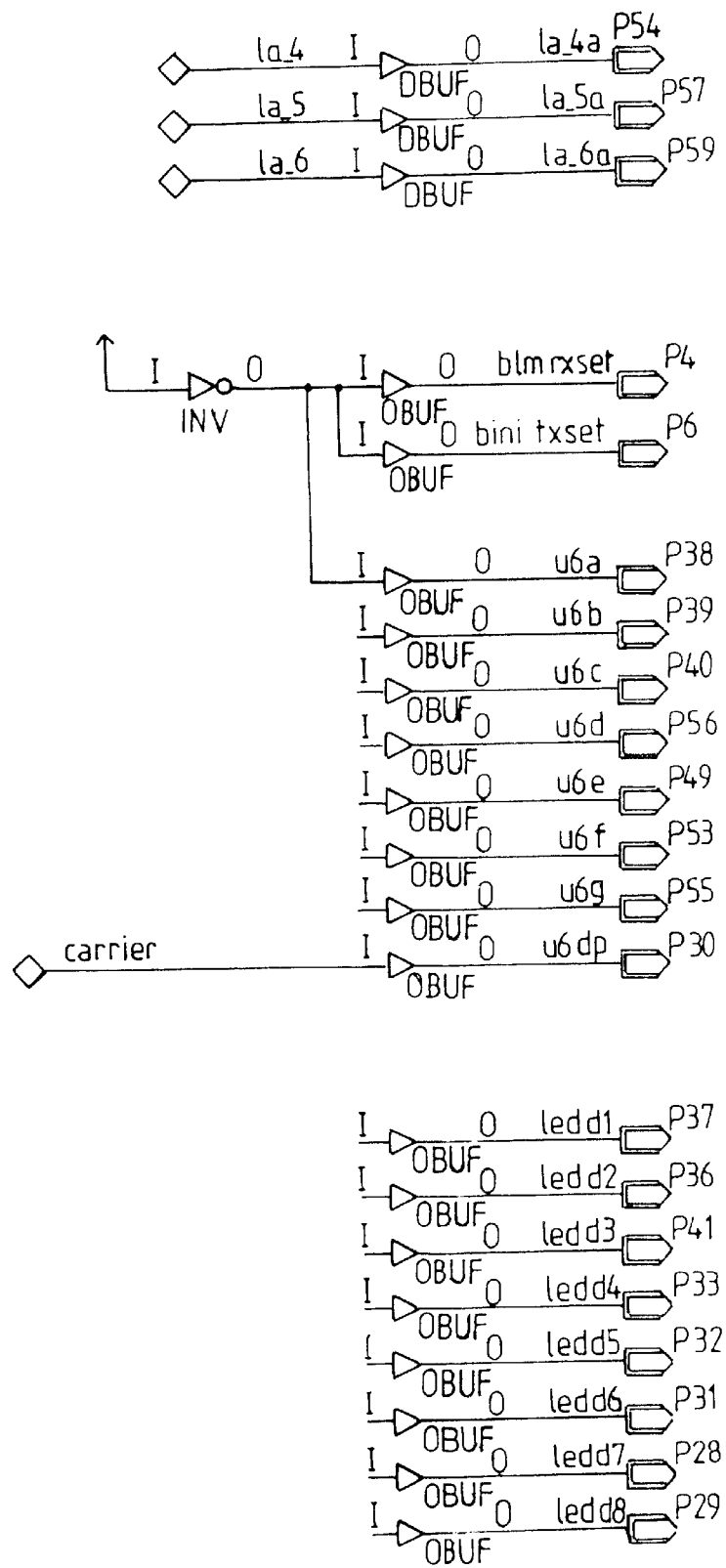

In FIG. 1, the position system operation is as follows:
1. To find the position of a mobile transmitting device (transponder) 10, a PC 12 loads an 8-bit address of the mobile device onto its parallel port.
2. A transmitter controller, based around a Xilinx XC3020A FPGA (the FPGA configuration is shown in FIG. 2) and interfaced to the PC parallel port, reads this address five times a second, and generates a 40 KHz data stream comprising a preamble and the address from the parallel bus of the PC.
3. The 40 KHz data stream is FM encoded onto a 418 MHz radio link by a Radiometrix BIM418 radio module 16.
4. As the first bit of the preamble is generated by the transmitter controller, a signal from that controller commands an ADC 18 (HP E1413/A) to begin sampling at a rate of 100 KHz (shared between all channels being sampled).
5. Mobile devices such as 10 described in detail in later Figures of the drawings located in the area covered by the system, pick up the preamble and 8-bit address and compare the address with their own. If the addresses match, the mobile device in question transmits a 750 microsecond pulse of 40 KHz ultrasound. Typically an array of five transducers is mounted on each device, typically in a hemispherical pattern (not shown).
6. The ultrasonic pulse is picked up by one or more ultrasonic receiver units of which four are shown at 20, 22, 24 and 26. Those receiving the pulse process the signal in a manner described later before passing the processed signal to the ADC 18, which is set to sample them when instructed.
7. After the initial command to begin sampling, the ADC continues to sample at 100 KHz for 20 milliseconds and the samples values are stored. The stored sample values are passed over a serial interface to the PC 12. HP Vee software is loaded into the PC to manage the sampled data, find signal peaks, determine transponder-receiver distances, and calculate and position relative to the receivers of the mobile device that was addressed, using the algorithms described herein before.

In addition to the unique address for each transponder, at least one additional item of information (a weighted hierarchy indication for schedule positioning, or "WHISP") is stored in a manner which can be associated with each unique address and the transmitter controller is programmed to select from the addresses of the transponder next to be polled, using the WHISP values to determine the order of addressing.

A WHISP may be stored for each unique address, and it is the WHISP which must be changed to adjust the subsequent addressing of the transponders.

Alternatively a set of standard WHISPS may be stored and an association between each unique address and one of the standard WHISPS is stored for each unique address, so that an appropriate WHISP is linked to each unique address. In that event only the associations need to be changed so as to influence the subsequent addressing of the transponders. Likewise a change to one (standard) WHISP will mean that all the associated addresses will be given a new hierarchial position.

For complete flexibility unique addresses, WHISPS, (and/or the associations between unique addresses and WHISPS) can all be changed to allow for the entry or exit of transponders into and out of the environment, and to alter the manner in which those in the environment will be addressed by the coordinating control system.

In one example, the WHISP may be a simple logic 1 or 0 to indicate whether the transponder combination is to be addressed or not.

The WHISP may comprise a priority or weighting measure to determine the order or rate at which the transponder is to be addressed.

The WHISP may comprise two items of information, firstly for example the length of time since the transponder was last addressed (which may be continually updated by clock information) and secondly for example a rate of interrogation figure to be achieved by the system for that transponder.

The transmitter controller may compile a list of transponders to be addressed in a sequence by interrogating all of the unique addresses and their relate WHISPS and compiling the order in which they are to be interrogated using the current WHISP information.

Thus in one arrangement the transmitter controller may create a schedule of unique transponder addresses using the WHISP data, and arrange the order of the addresses in the schedule, and therefore the order in which they are to be interrogated. The schedule is then used to determine the encoding of each trigger burst from the radio module 16 and the order in which the transponders are thereby interrogated.

The FPGA configuration of the transmitter controller of FIG. 1 is detailed in FIG. 2.

Figure 3:
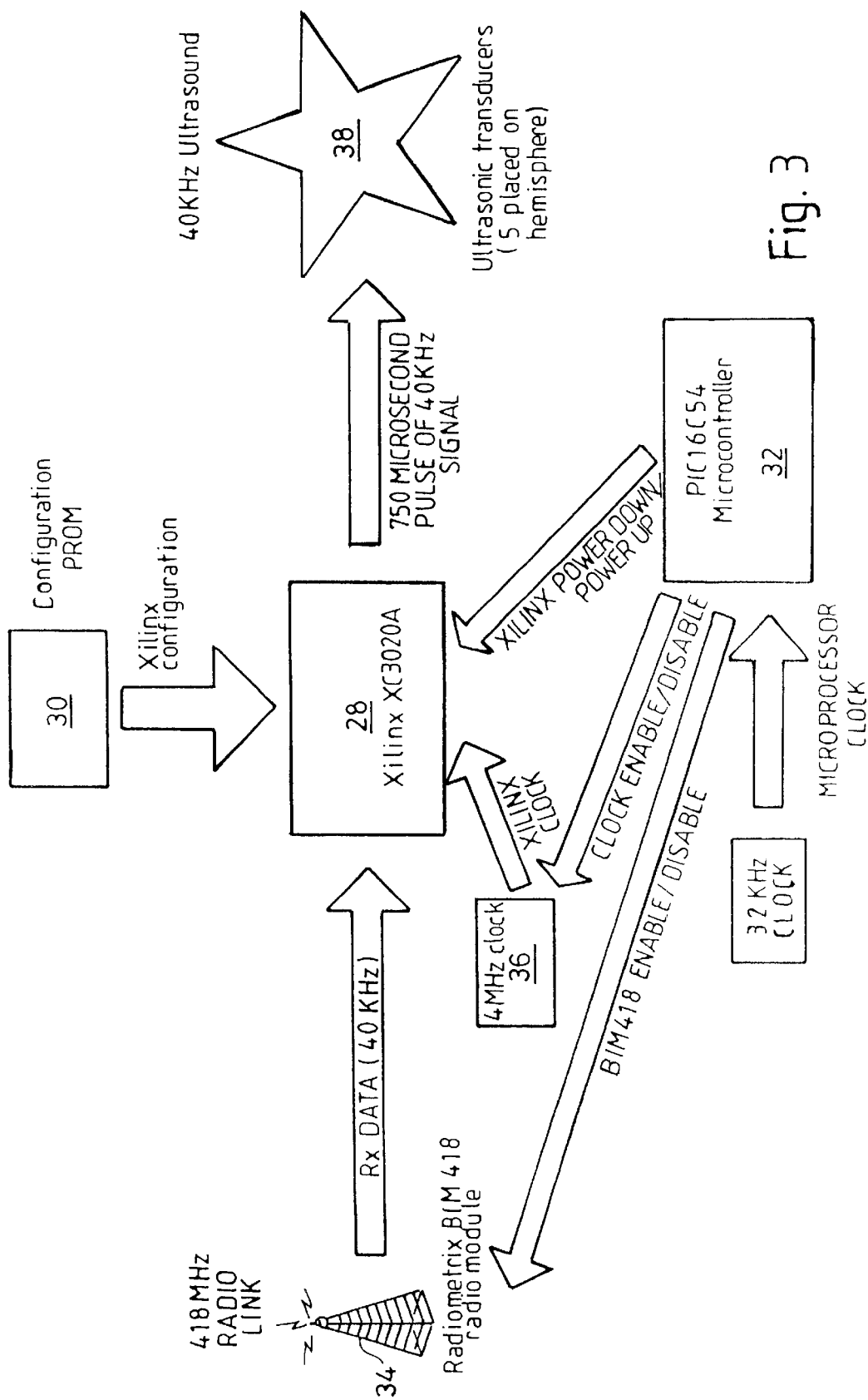
FIG. 3 is a schematic diagram of a mobile transmitter unit for the system of FIG. 1.
Figure 4A:
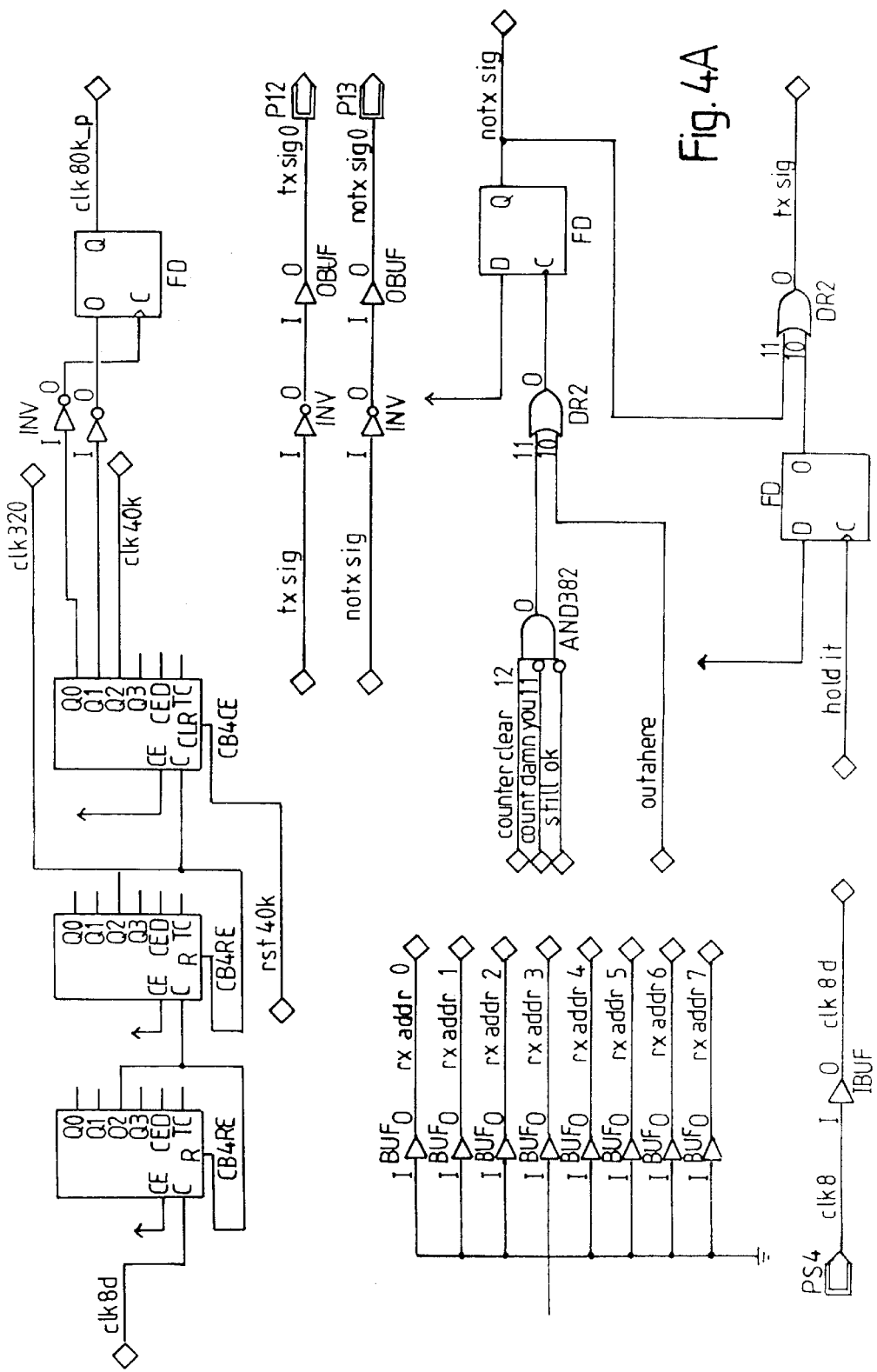
FIG. 4 shows the FPGA configuration of the mobile transmitter unit on the system of FIG. 3.
Figure 4B:
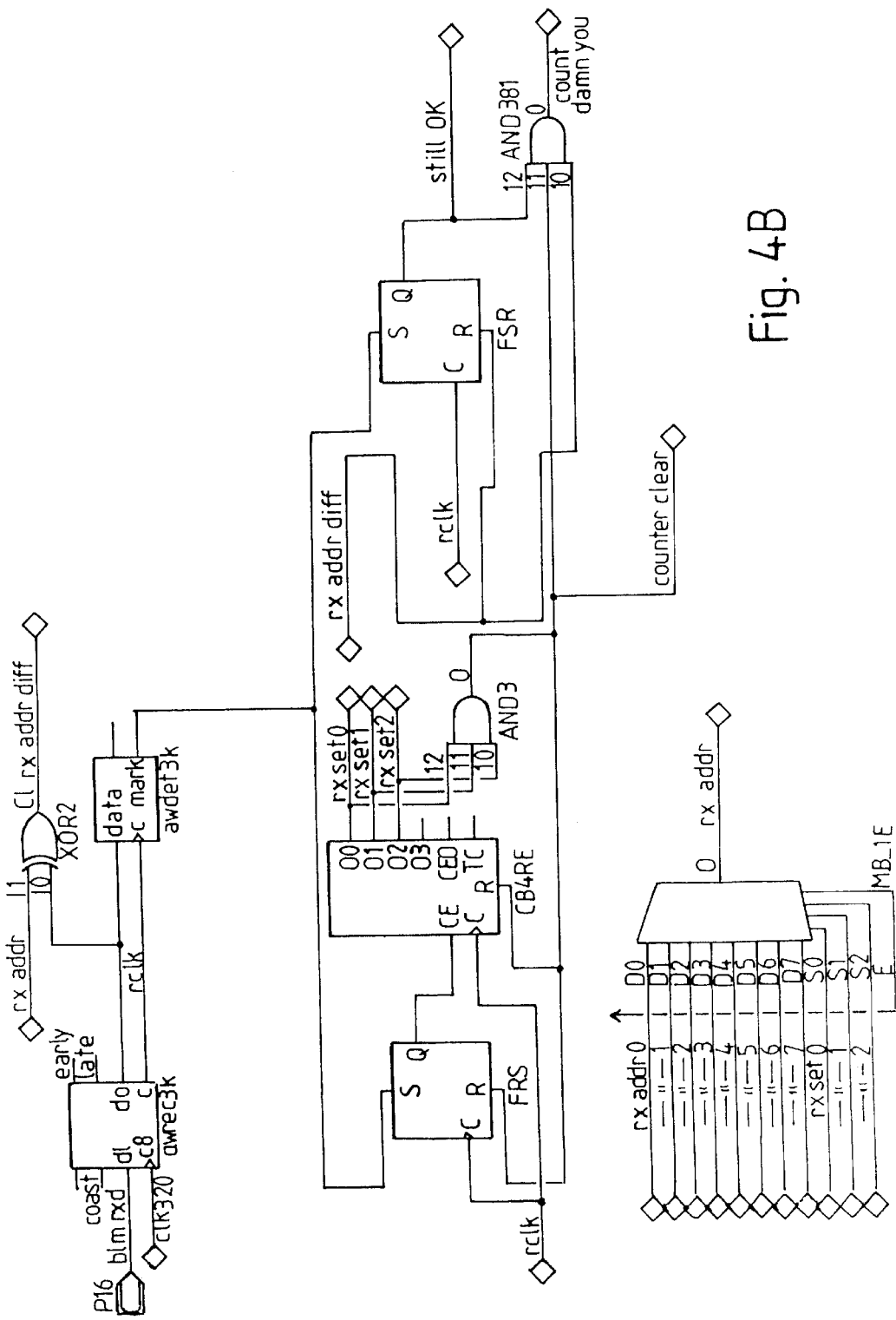
Figure 4C:
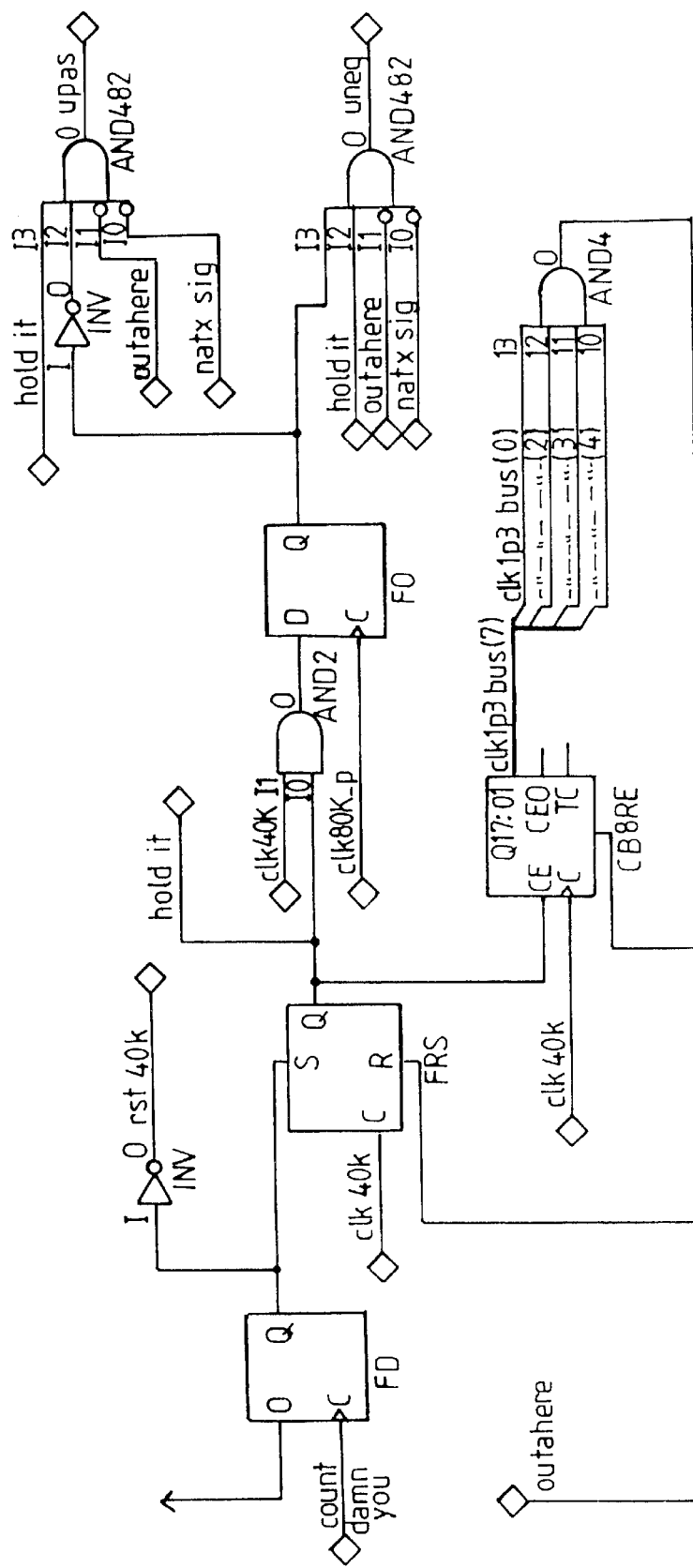

In FIG. 3 the operation of a mobile transponder is as follows:

1. At power-up, the Xilinx XC3020A FPGA unit 28 downloads its configuration from a Xilinx 1736PC serial PROM 30 (the FPGA configuration is shown in FIG. 4). A PIC16C54 microcontroller 32 enables a Radiometrix BIM418 radio module 34 and a 4 MHz Xilinx clock 36 (built around a 4 MHz crystal and a 74HCT00 1C).
2. The XC3020A unit 28 monitors incoming 40 KHz received data until it detects a preamble and 8-bit address. It then compares the received address with its own (stored in its serial PROM), and if the addresses are identical it drives five ultrasonic transducers such as (Farnell Electronics part No. 213-214) at 40 KHz for 750 microseconds (of which one is shown at 38).
3. The PIC16C54 microprocessor 32 then disables the BIM418 radio module 34 and 4 MHz clock 36, and places the XC3020A unit 28 into powerdown mode, to save power, for 0.196 seconds. It then re-enables these components and step (2) is followed again.

Power is typically derived from two 3.6V half-AA lithium thionyl chloride batteries, regulated to 4V by an LT1129 IC. The FPGA configuration of the transmitter controller of FIG. 3 is detailed in FIG. 4.

Figure 5:
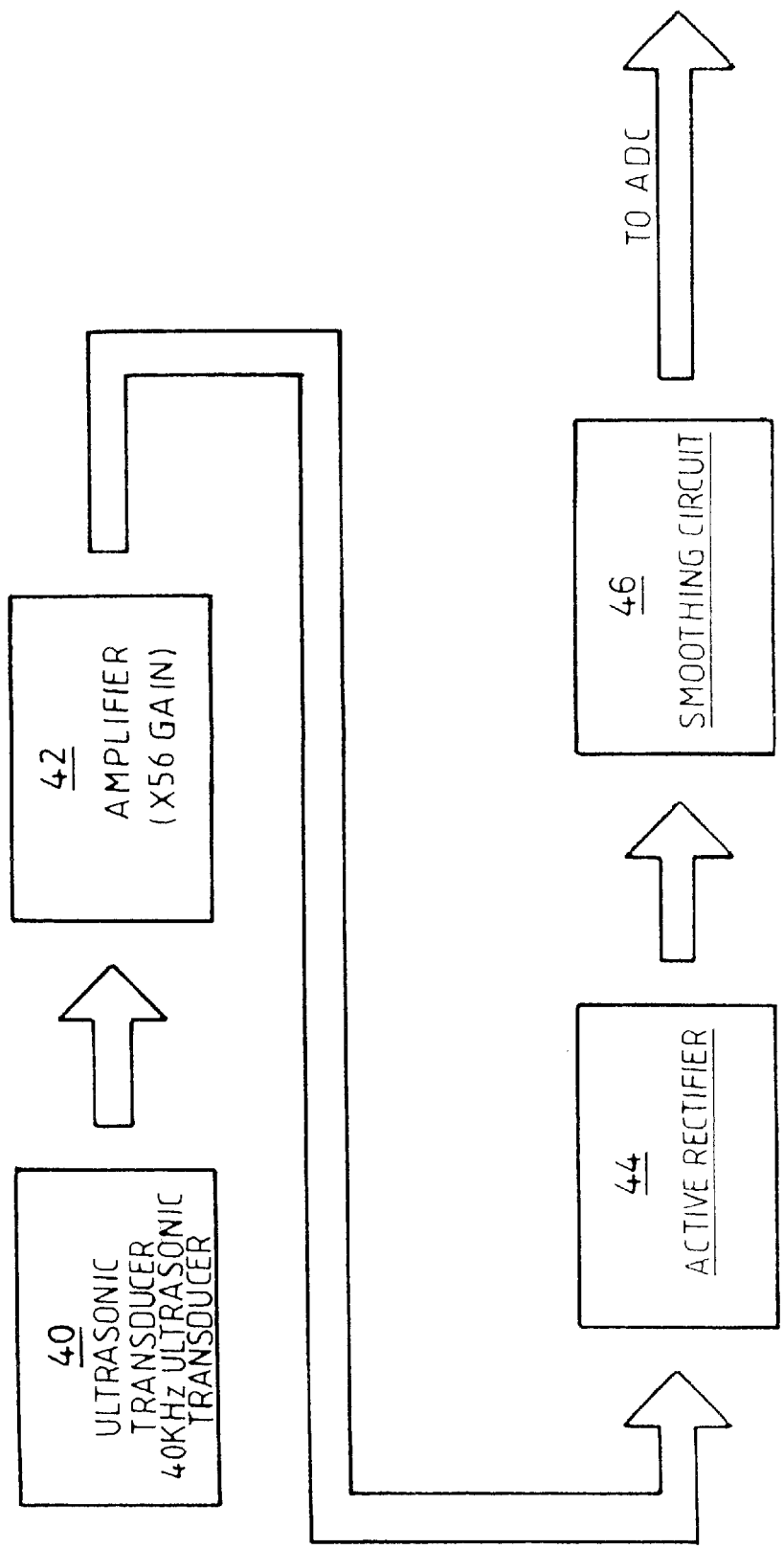
FIG. 5 is a simplified block schematic of the ultrasonic receiver unit.

The operation of the ultrasonic receiver shown in FIG. 5 is as follows:
1. The ultrasonic signal is detected by an ultrasonic transducer such as a Farnell Electronics part No. 213-226 denoted by 40.
2. This signal is amplified (typically by a factor of 56) using an inverting amplifier 42. Typically this is built around one-quarter of a TL074 quad op-amp.
3. The amplified signal is rectified using a full wave active rectifier 44. Typically this is built around one-half of a TL074 quad op-amp.
4. The rectified, amplified signal is smoothed using an RC circuit 46 to obtain a signal which represents the envelope of a rectified version of the original signal.
5. This signal is passed to the HP E1413/A ADC 18 (see FIG. 1) via an RJ45 jack plug and one wire of a four wire network, which also supplies the unit with +5V, −5V and GND power lines.

Standard Receiver

A number of these are located at known locations around the environment (room) in the ultrasonic positioning system.

Figure 6A:
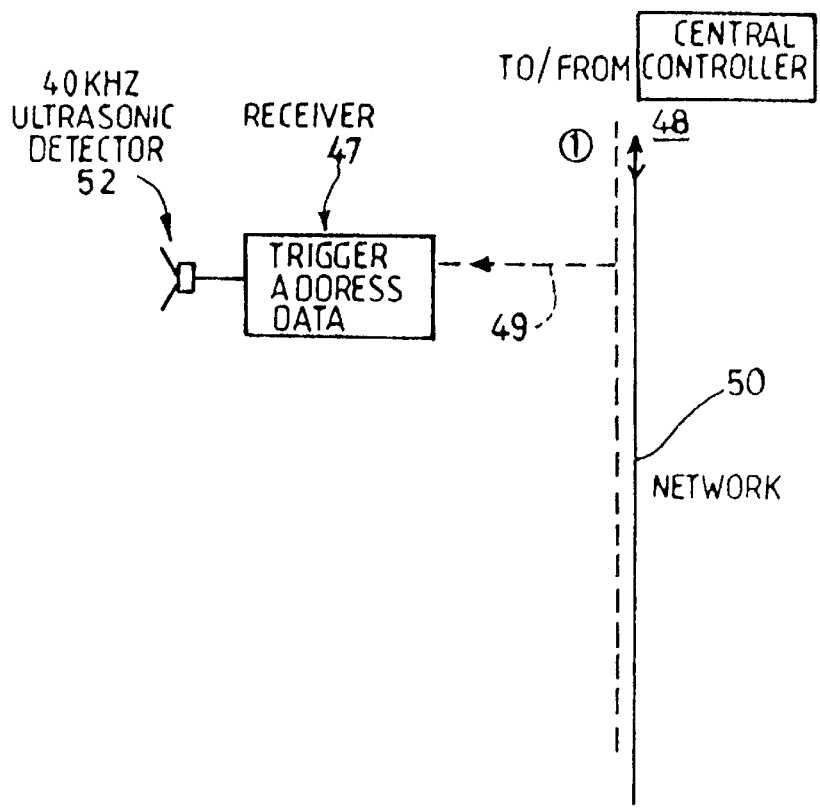
FIGS. 6A to 6C show how a standard ultrasonic receiver operates as part of a transponder in a complete system as shown in FIGS. 18 to 23 and FIGS. 27 to 36.
Figure 6B:
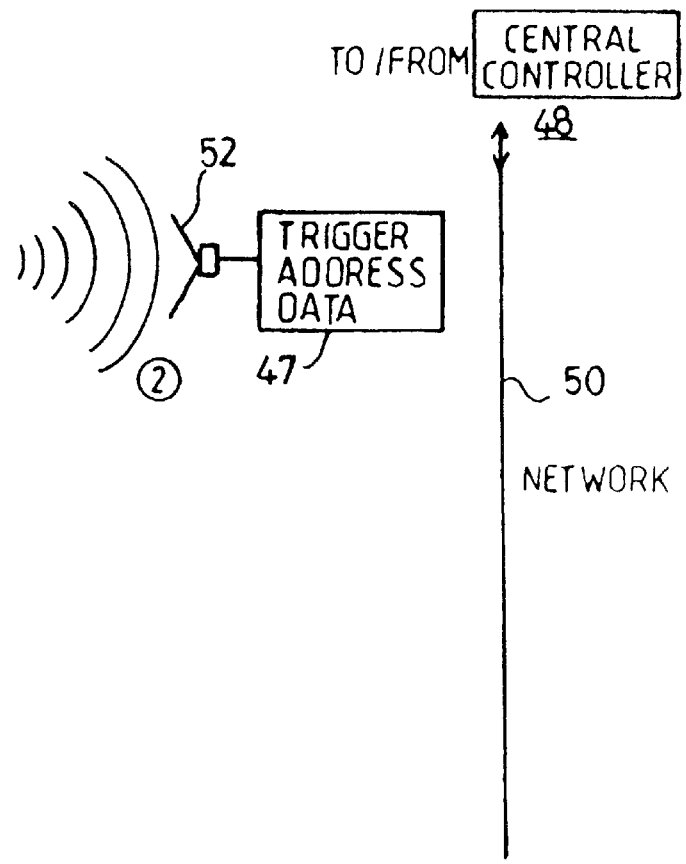
Figure 6C:
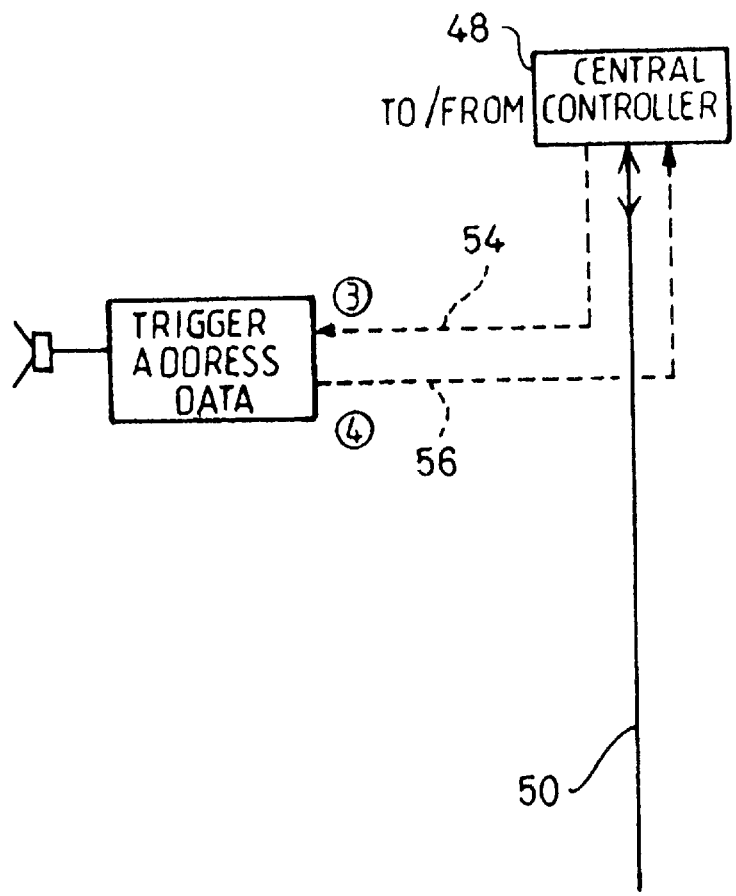

As shown in FIG. 6(A), each receiver 47 is triggered by a central controller 48 across a network 50. Following a timing or reset signal 49, the receiver monitors signals from a 40 KHz ultrasonic detector 52 for 20 ms as depicted in FIG. 6(B), and the time at which the incoming signal peaked for the first time is determined and held in the receiver. After the 20 ms window closes, the central controller 48 polls each receiver across the network 50 as depicted at 54 and 56 in FIG. 6(C), and retrieves the time value. The value from each receiver is either the time after the window opened at which the signal first peaked, or is zero (which indicates that no useful signal was detected).

Reducing System Response to Spurious Acoustic Signals

To confer noise immunity a two channels and two ultrasonic detector are provided as shown in FIG. 7. The first detector 52, and first channel 58 are sensitive to 40 kHz and the second, 60, 62 to another frequency eg 25 kHz.

Figure 7A:
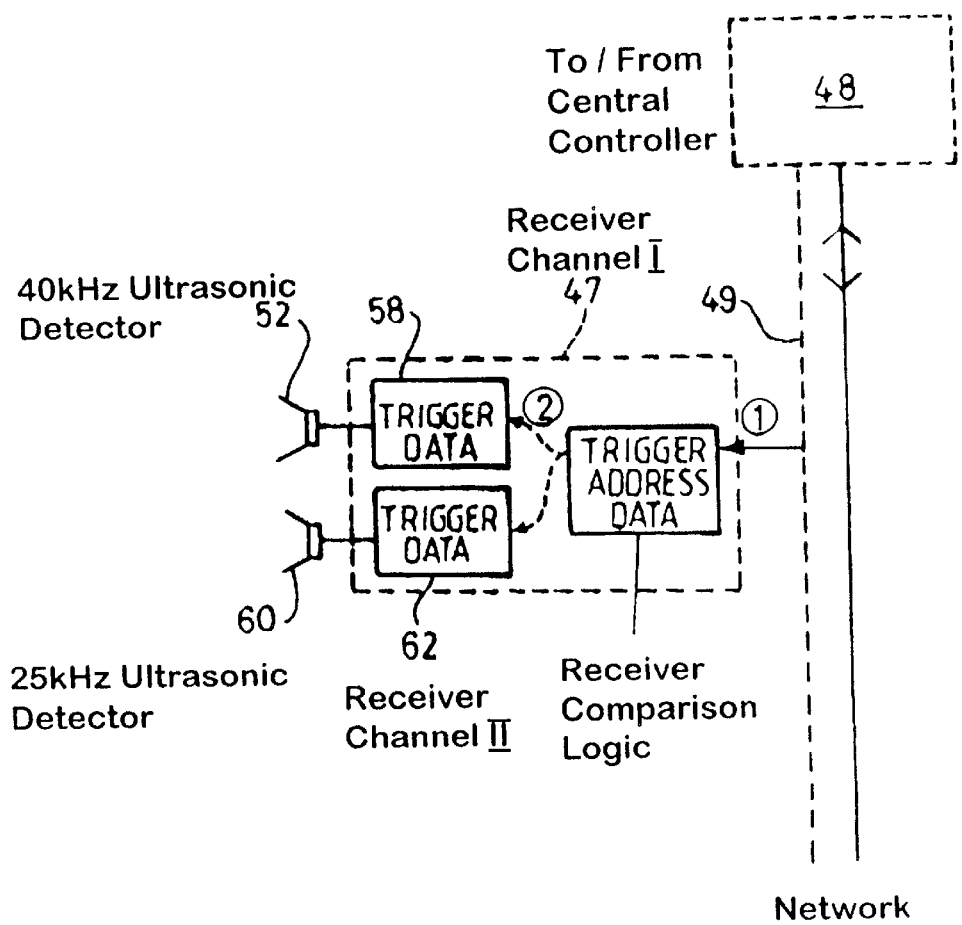
FIG. 7A to 7D show the operation of a modified ultrasound receiver, adapted to render it insensitive to spurious noise signals, in the system of FIGS. 18 to 23 and FIGS. 27 to 36.
Figure 7B:
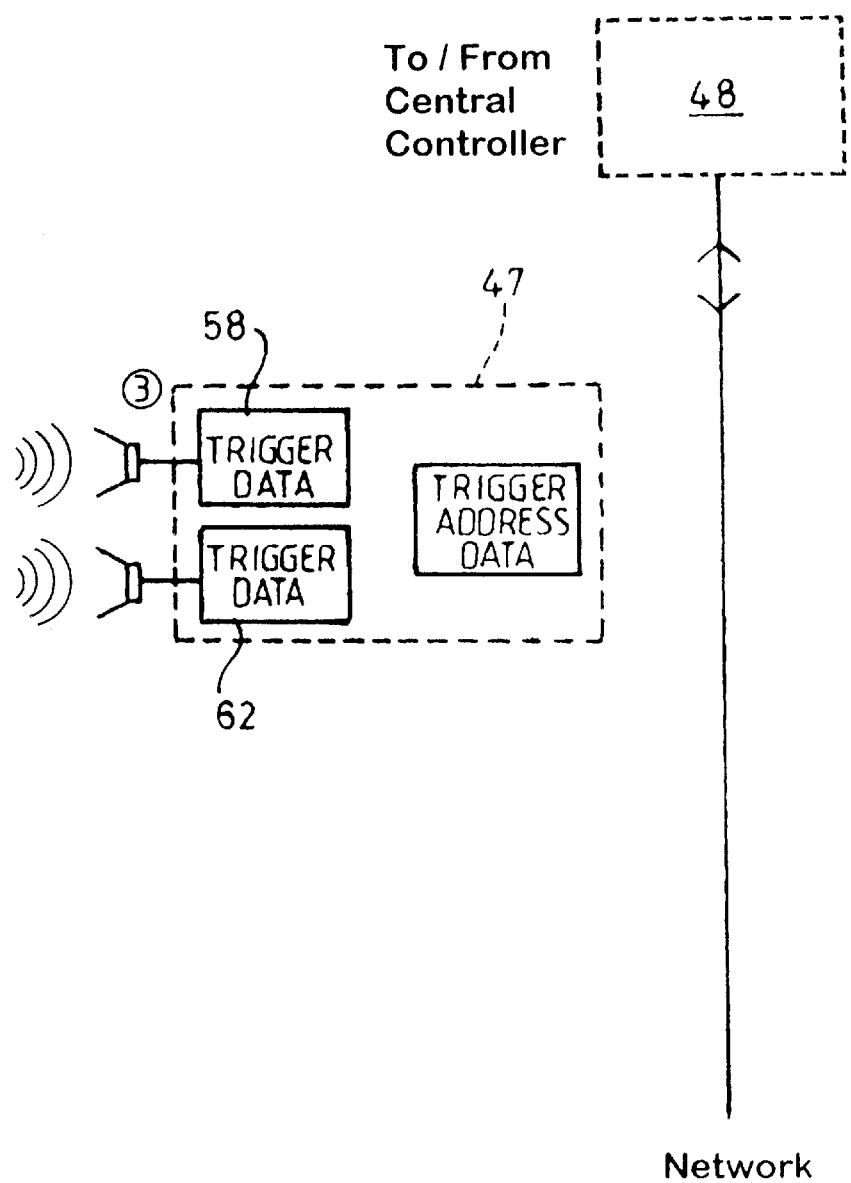

When the receiver is triggered, both channels are reset and monitor the incoming signals for 20 ms, and determine the times (a,b) at which any received signals peak for the first time as shown in FIG. 7(B).

Figure 7C:
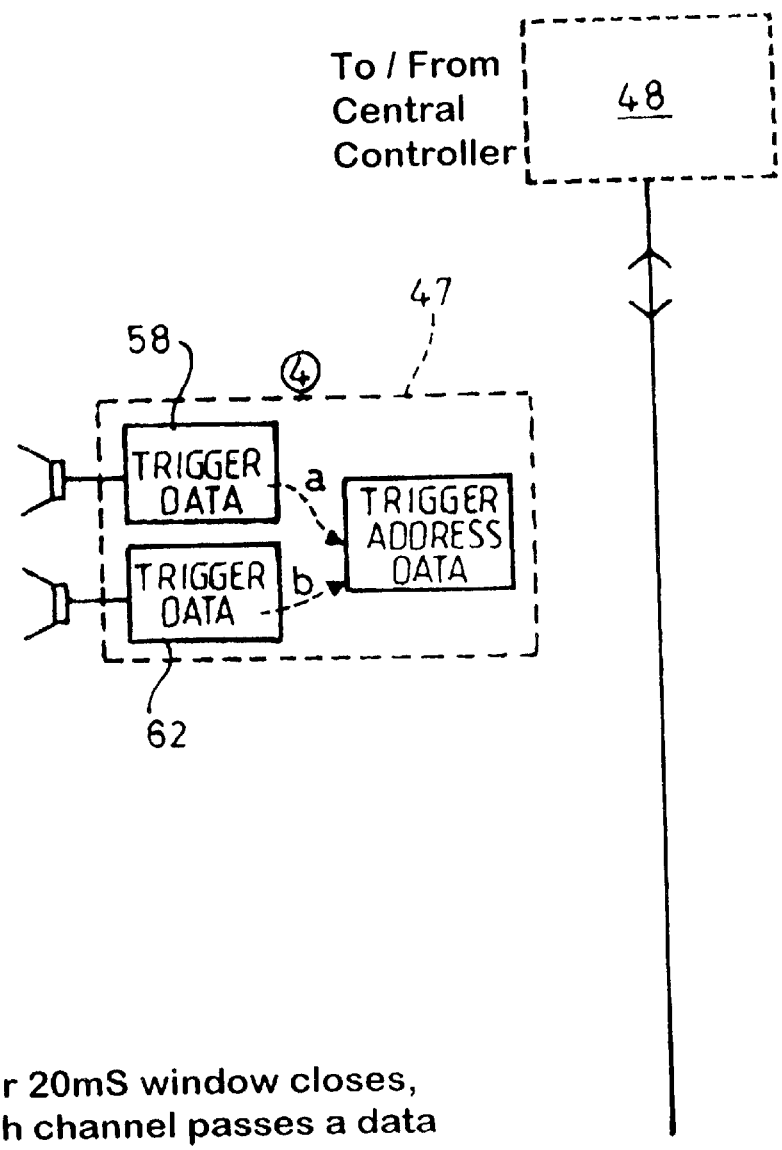

The value b is checked and if greater than 0, the value of a is forced to 0, also, as shown in FIG. 7(C). If b equals 0, the value of a is available to be returned to the central controller.

Figure 7D:
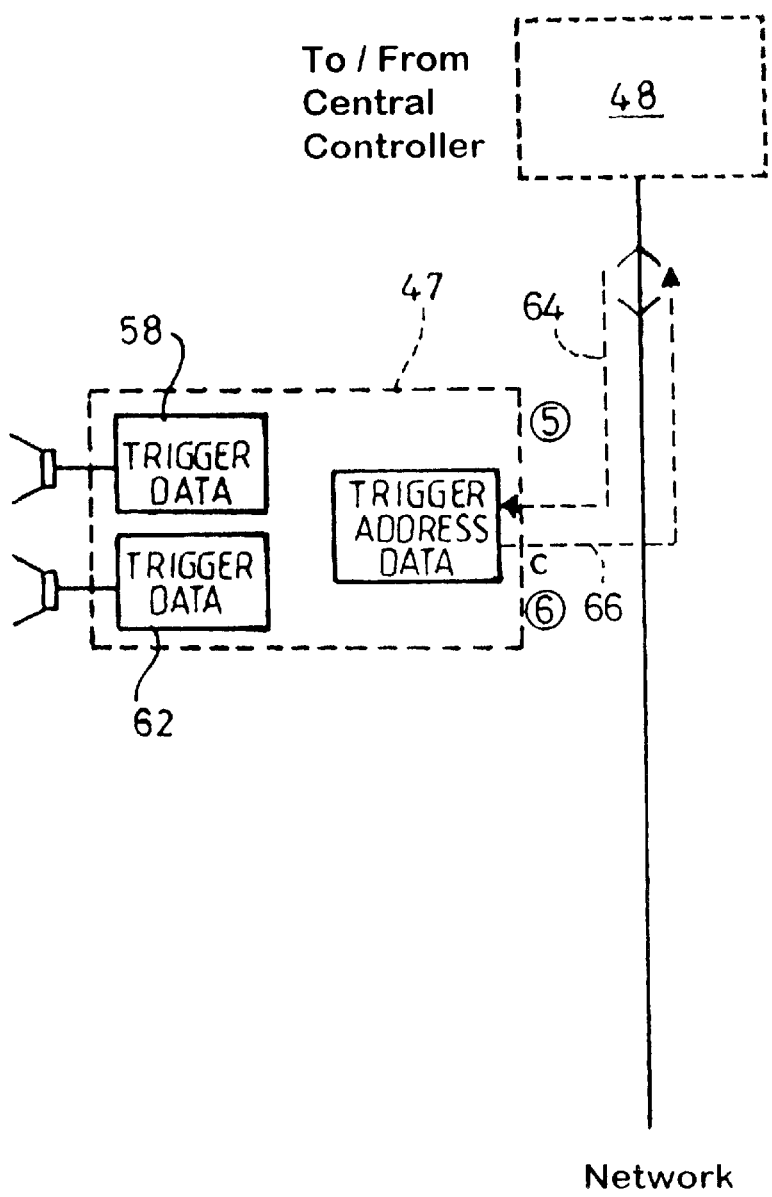

When the central controller 48 polls each receiver 47 across the network is shown in FIG. 7(D), and noted by 64, the time value a from the first channel 52, 58 is returned to the controller 48, as denoted by 66. If the second channel value b had been non-zero (indicating that a spurious acoustic signal was detected), then zero is returned to the controller from the first channel 52, 58.

Transponder Design

Figure 8:
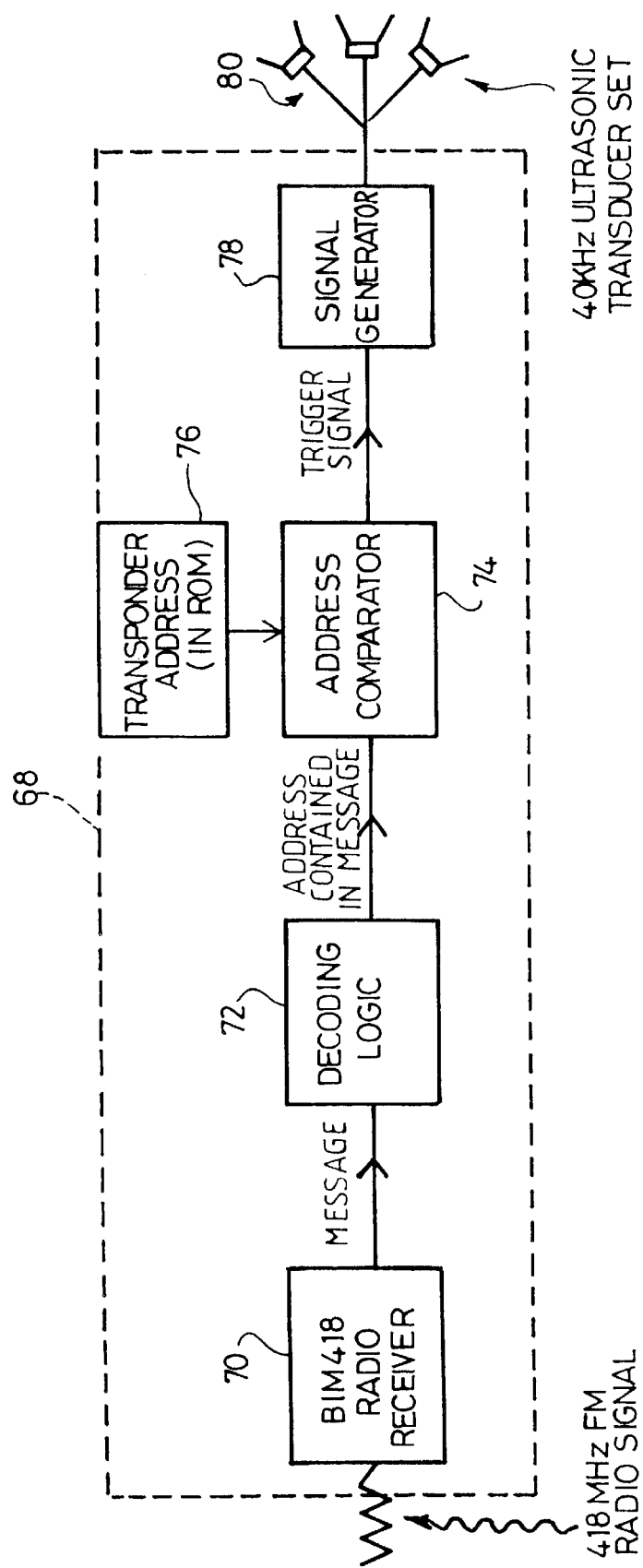
FIG. 8 shows a standard ultrasonic transmitter as used in FIG. 9, and in the systems of FIGS. 1 to 5, 18 to 23 and 27 to 36.

A standard receiver-transmitter (transponder) unit 68 (such as item 10 in FIG. 1) is shown in FIG. 8.

This comprises a radio receiver 70 which picks up encoded FM signals in the 418 MHz band from a radio transmitter (16 in FIG. 1) controlled by a central coordinating device 48 (not shown).

These signals are passed through decoding logic 72, which presents the address contained in any decoded message, to an address comparator 74. If the latter identifies the address in the message as that of the transponder stored in ROM 76, it triggers a signal generator 78, which drives a set of ultrasonic transducers 80 to transmit an ultrasonic pulse.

Figure 9:
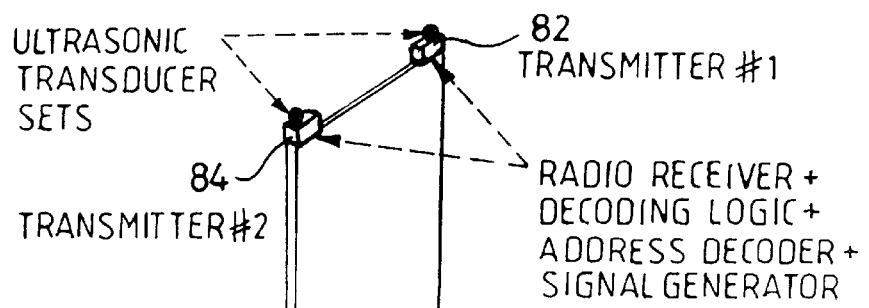
FIG. 9 shows how two transponders each incorporating standard ultrasound receivers can be mounted on a movable object such as a chair to indicate rotational movement.

Two such standard transponders 82, 84 are shown in FIG. 9 attached to two spaced apart points on a chair 86.

Figure 10:
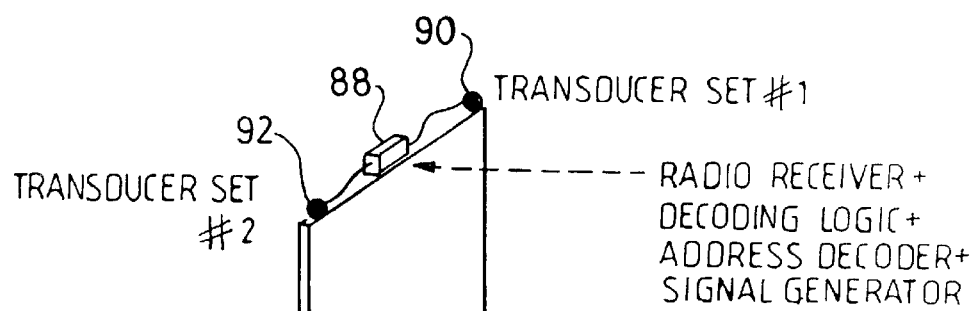
FIG. 10 shows how component redundancy in a two transponder arrangement such as shown in FIG. 9, can be reduced.

Since the two transponders 82, 84 contain similar duplicated components, an alternative arrangement is possible as shown in FIG. 10. Here, a single receiver and control unit 88 drives two individually addressable ultrasonic transducer sets, mounted at the same points on the chair 86, 90, 92 as were the standard transponders 82, 84.

Figure 11:
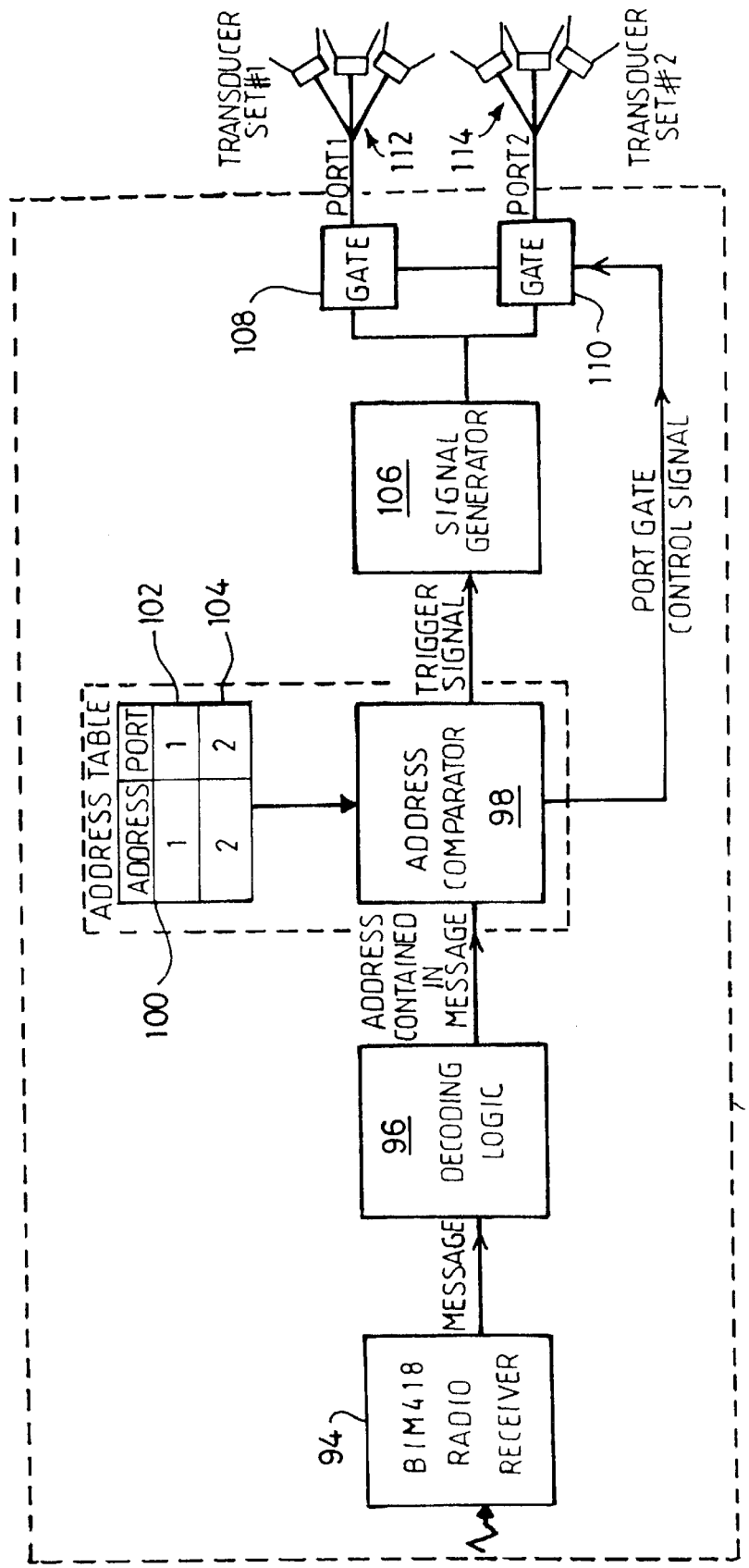
FIG. 11 shows a more complex ultrasonic transmitter provided in the system of FIG. 10.

The alternative arrangement is shown in more detail in FIG. 11. The unit 88 is made up of a radio receiver 94 which picks up the encoded FM signals in the 418 MHz band from the central transmitter. These signals are passed through decoding logic 96, which presents the address contained in any message detected to an address comparator 98. The latter is associated with a look-up table 100 containing in this case two rows 102, 104. Each row stores a transducer address and a port number (e.g. If transducer set 1 is attached to port 1, one of the rows will be the ordered pair (1,1)).

If the address comparator identifies that the address in a received radio message matches one of the transducer addresses in the look-up table 100 it triggers a signal generator 106. The address comparator also controls gates 108, 100, to direct the output of the signal generator 106 to the port identified by the port number in the received transducer address. It can be seen therefore that the number of radio receivers, decoders, comparators and signal generators required by a system where two or more ultrasonic transmitter transducers are to be mounted as single objects, can be reduced, with consequent economies.

Two groups of ultrasonic transducers 112, 114 are connected separately one to port 1 (controlled by gate 108) and the other to port 2 controlled by gate 110.

Introducing Directionality into the Transducers

Figure 12A:
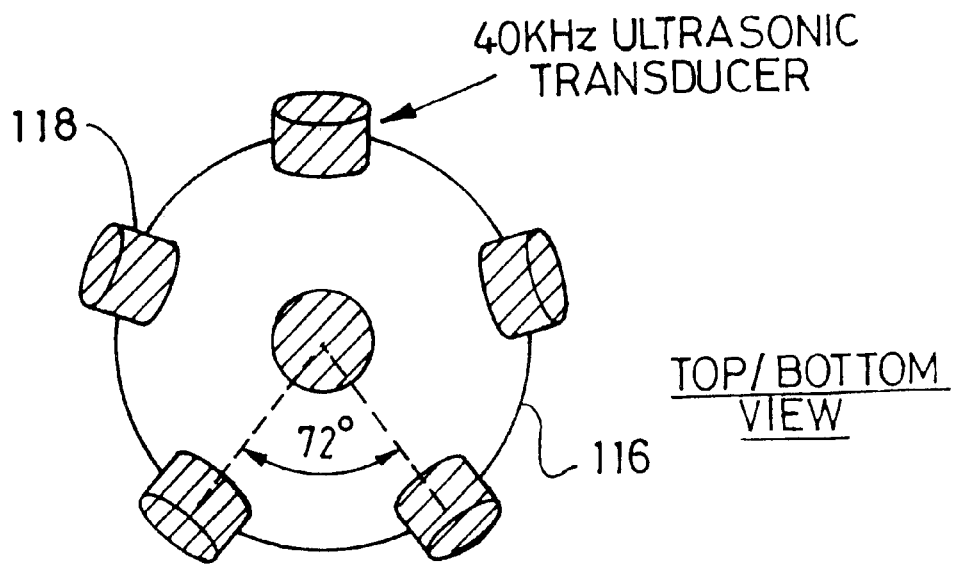
FIGS. 12A and 12B are top (or bottom) and side view of an omnidirectional ultrasound source.
Figure 12B:
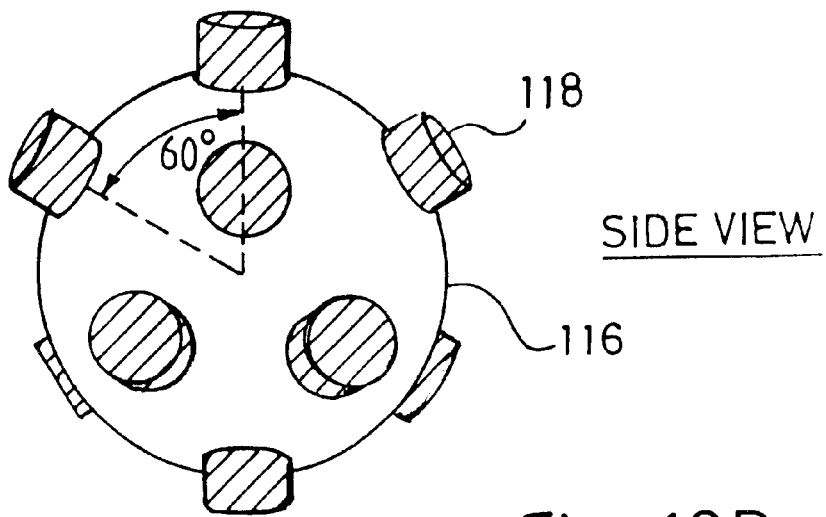

Since ultrasonic transducers tend to produce a sound wave over a relatively small solid angle, and are therefore rather directional. A less directional transducer is shown in FIGS. 12A and 12B. This comprises a spherical body 116 from which protrude a plurality of regularly spaced transducers, one of which is shown at 118 in each of the views.

Figure 13:
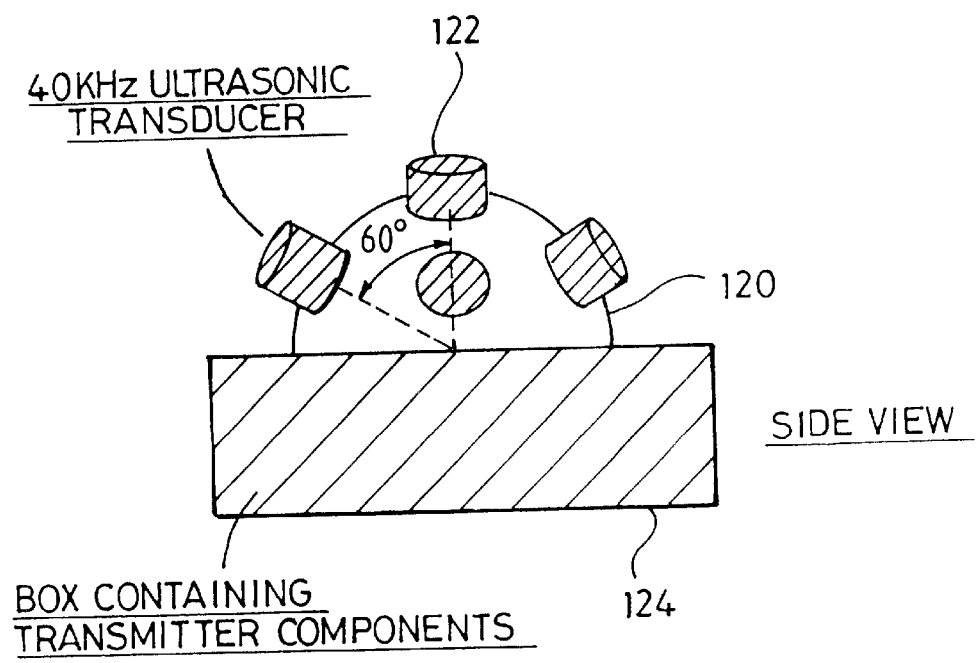
FIG. 13 illustrates a more directional ultrasound source.

If the spherical unit 116 of FIGS. 12A and 12B is mounted so that its lower half is acoustically shielded, none of the lower transducers serves any useful purpose and could be omitted. Such a unit is shown in FIG. 13, where the hemispherical body 120 carries transducers 122.

The device 120 is shown mounted on a housing 124 which may contain electronic components making up the transponder. Less than half the number of transducers are required than in an omnidirectional source such as shown in FIGS. 12A, 12B.

Figure 14A:
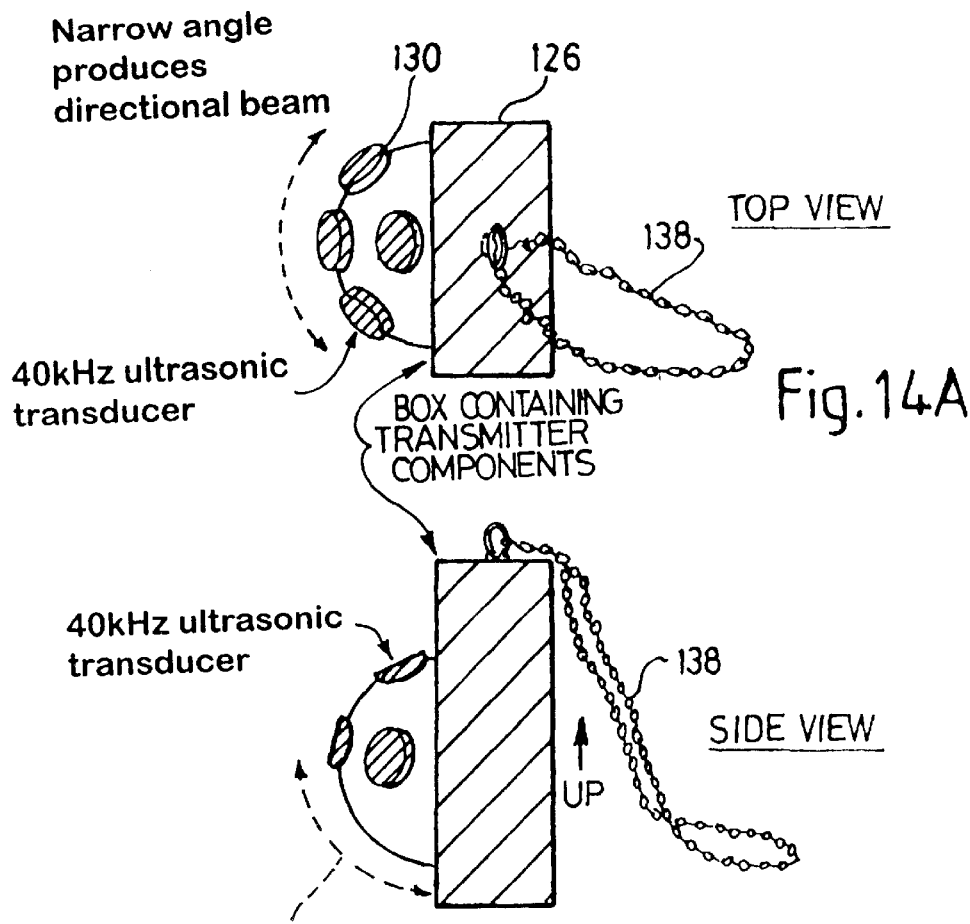
FIGS. 14A and 14B are top and side views of a transponder unit designed to be worn round the neck.
Figure 14B:
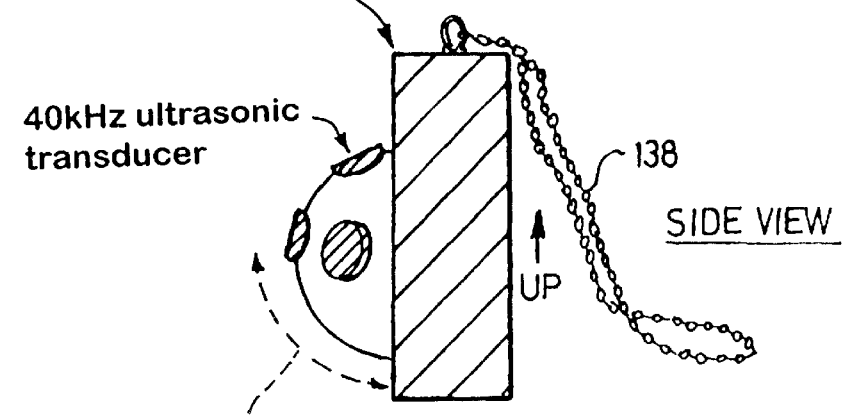
Figure 14C:
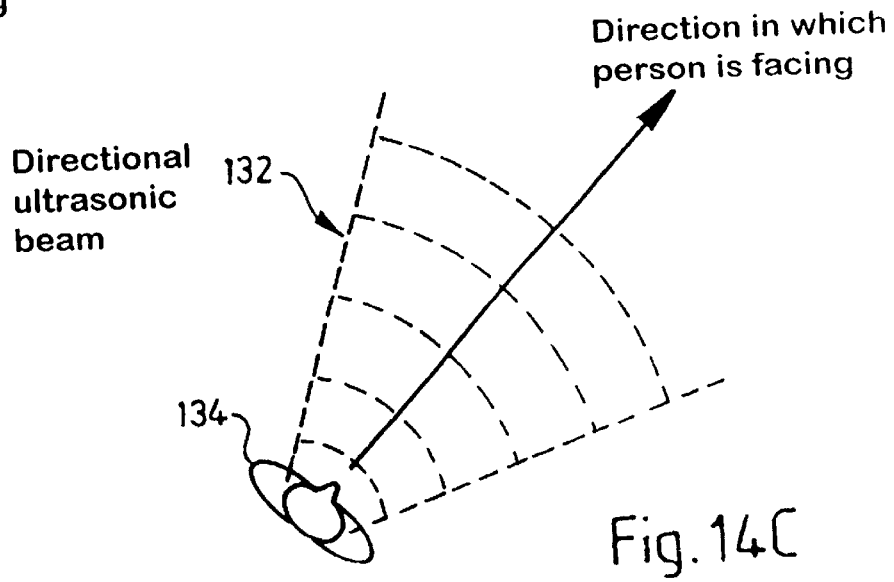
FIG. 14C is a view from above showing the directionality of the device shown in FIGS. 14A and 14B.

FIG. 14A shows a transponder 126 capable of being worn by a person around their neck for example on a chain 128. As seen in FIG. 14C, the ultrasonic transducers 130 can be arranged to give a relatively narrow beam 132 which will project in front of the person 134. By finding the position of the person 134 and the locations of the receivers (20, 22, 24 etc. in FIG. 1) at which the beam is detected, it is possible to deduce which way the person is facing.

Figure 15:
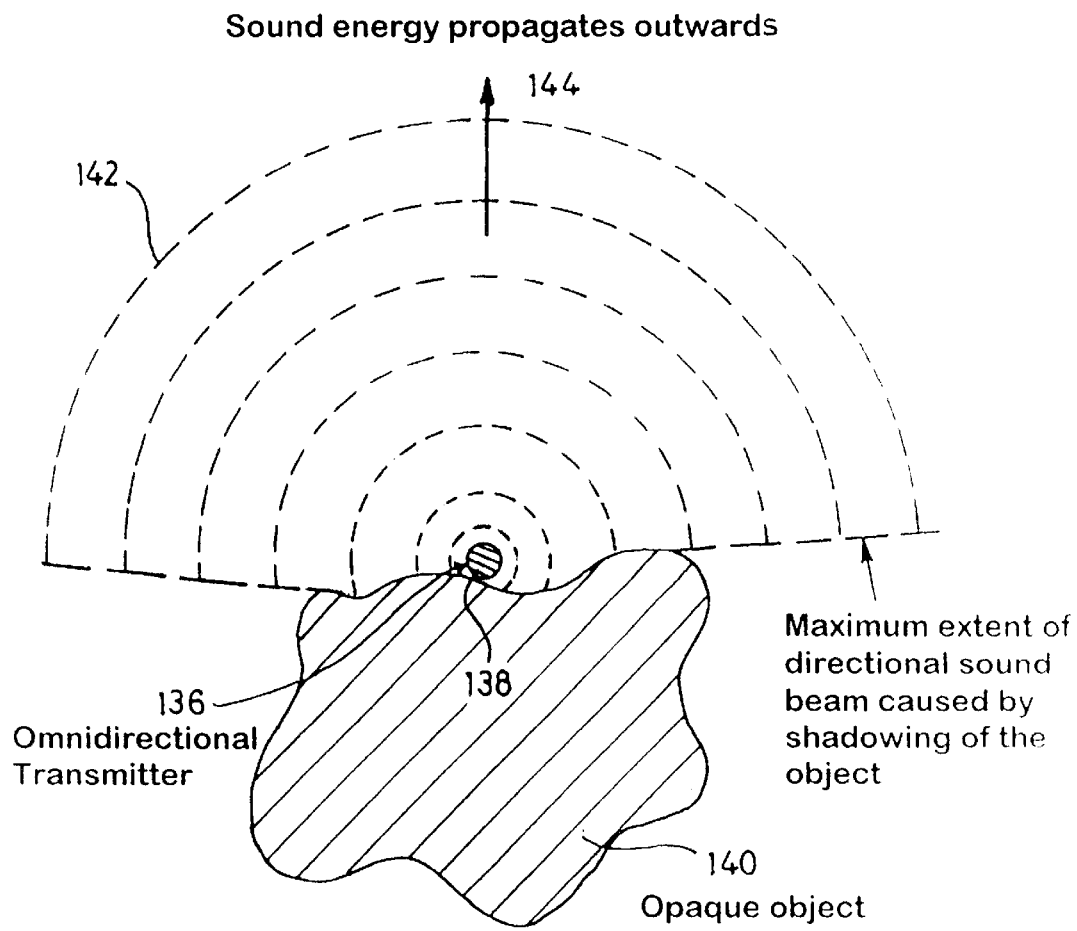
FIG. 15 is a view from above of the sound pattern which emanates from an omnidirectional ultrasound transducer (or transducer group) when attached to or partly obscured by an object which is of acoustically opaque and/or absorbing material.

Derivation of Orientation Information

Where the objects on which transponders omnidirectional (standard) are attached are opaque or relatively opaque to ultrasound, it is possible to obtain information about the orientation of those objects from the data collected by the receivers such as 20, 22 etc. in FIG. 1. Consider a transponder 136 attached to a known point 138 on such an object 140, as in FIG. 15. The opacity of the object 140 ensures that the only sound energy 142 which can leave its vicinity does so in the direction 144. This effect may be amplified if the transmitter is itself directional to some degree.

By interrogating the receivers (20, 22 etc. (FIG. 1)) in an environment containing such an object and performing a calculation on the information they provide, the location system can calculate in three dimensions the position (x,y,z) of the transponder 136. The location system also knows the positions $(u_1, v_1, w_1) \ldots (u_n, v_n, w_n)$ of the n receivers that have detected the ultrasonic signal. Using the known location of the transponder on the object and the known locations of the receivers, the direction, relative to the object, in which the ultrasonic energy will have left its vicinity, can be deduced. Correlating these three items of information allows the object's orientation to be determined, where the position of point 138 relative to the object 140 is known.

Figure 16:
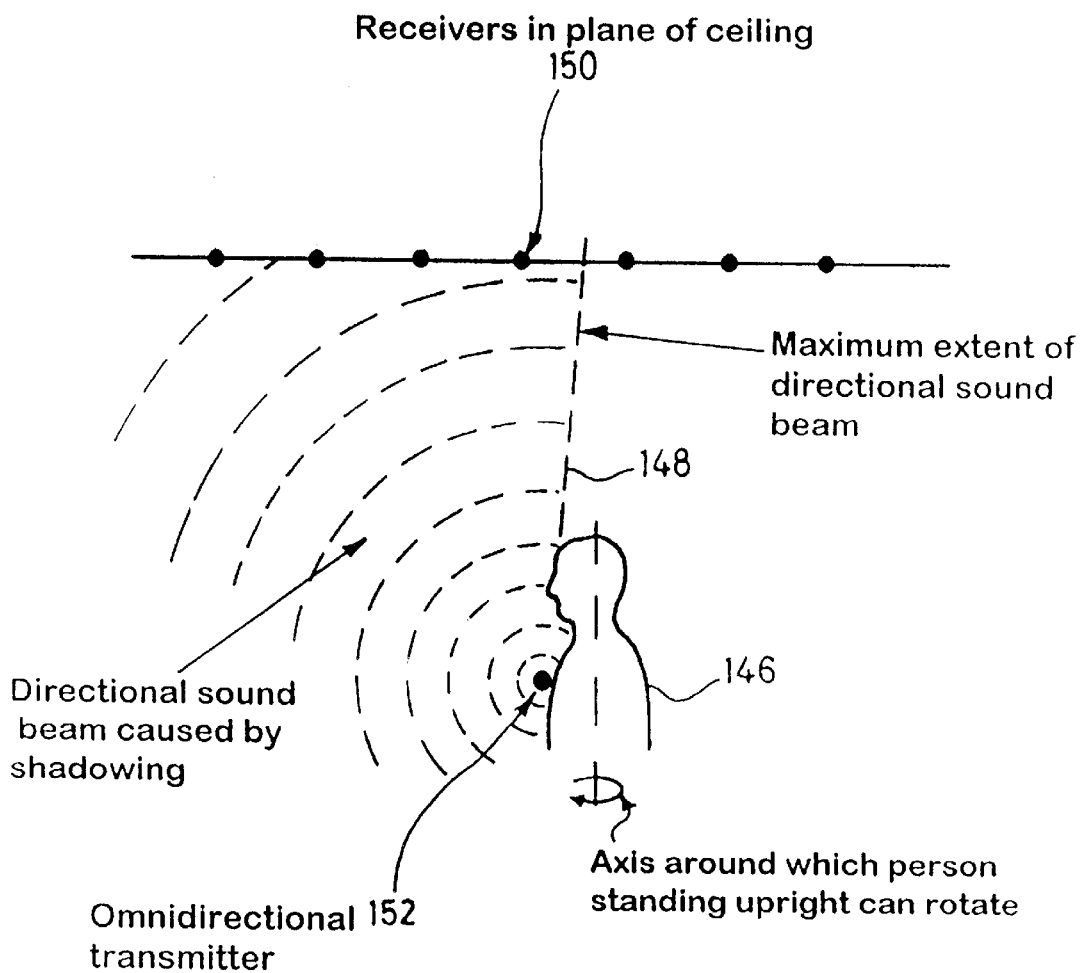
FIG. 16 is a side view of a person wearing a device such as shown in FIGS. 14A and 14B.
Figure 17:
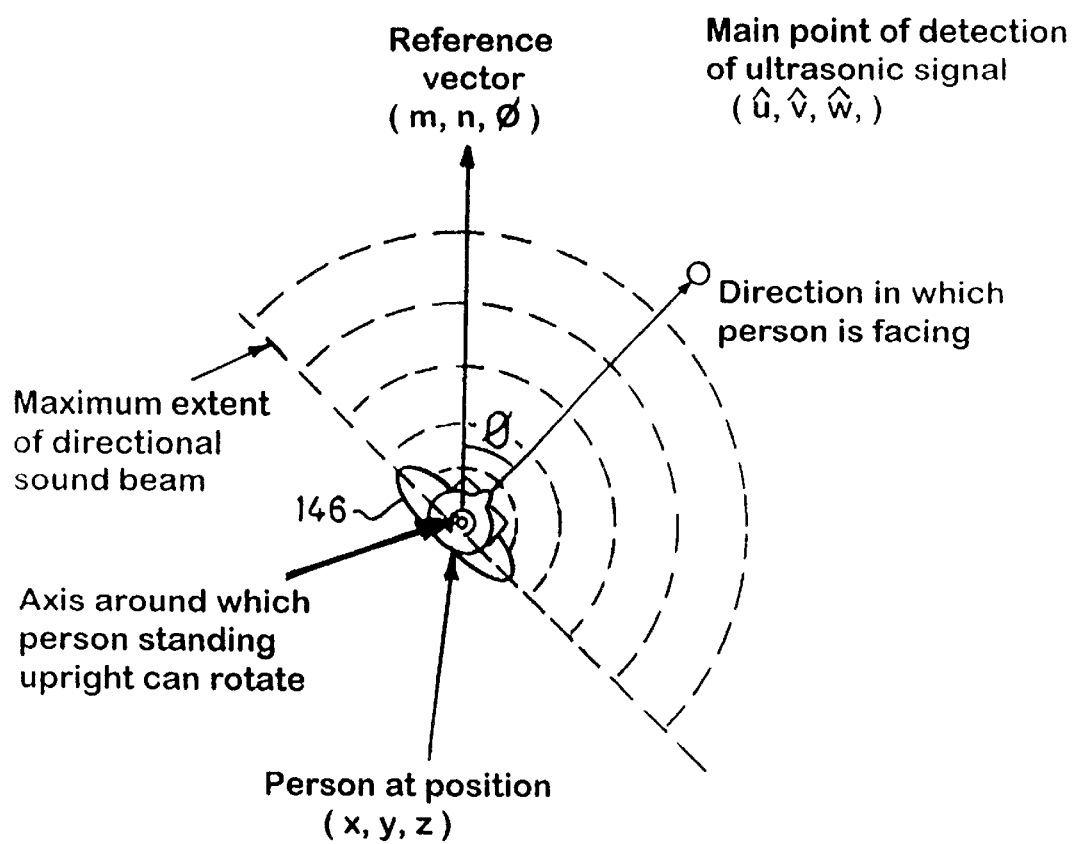
FIG. 17 is a top view of the person shown in FIG. 16.

An example of how this can be derived will be described with reference to FIGS. 16 and 17 which show a standing person 146, who can face in any direction and therefore be said to be rotatable about a vertical axis 148, relative to a horizontal array of receivers one of which is denoted by 150.

Figure 18:
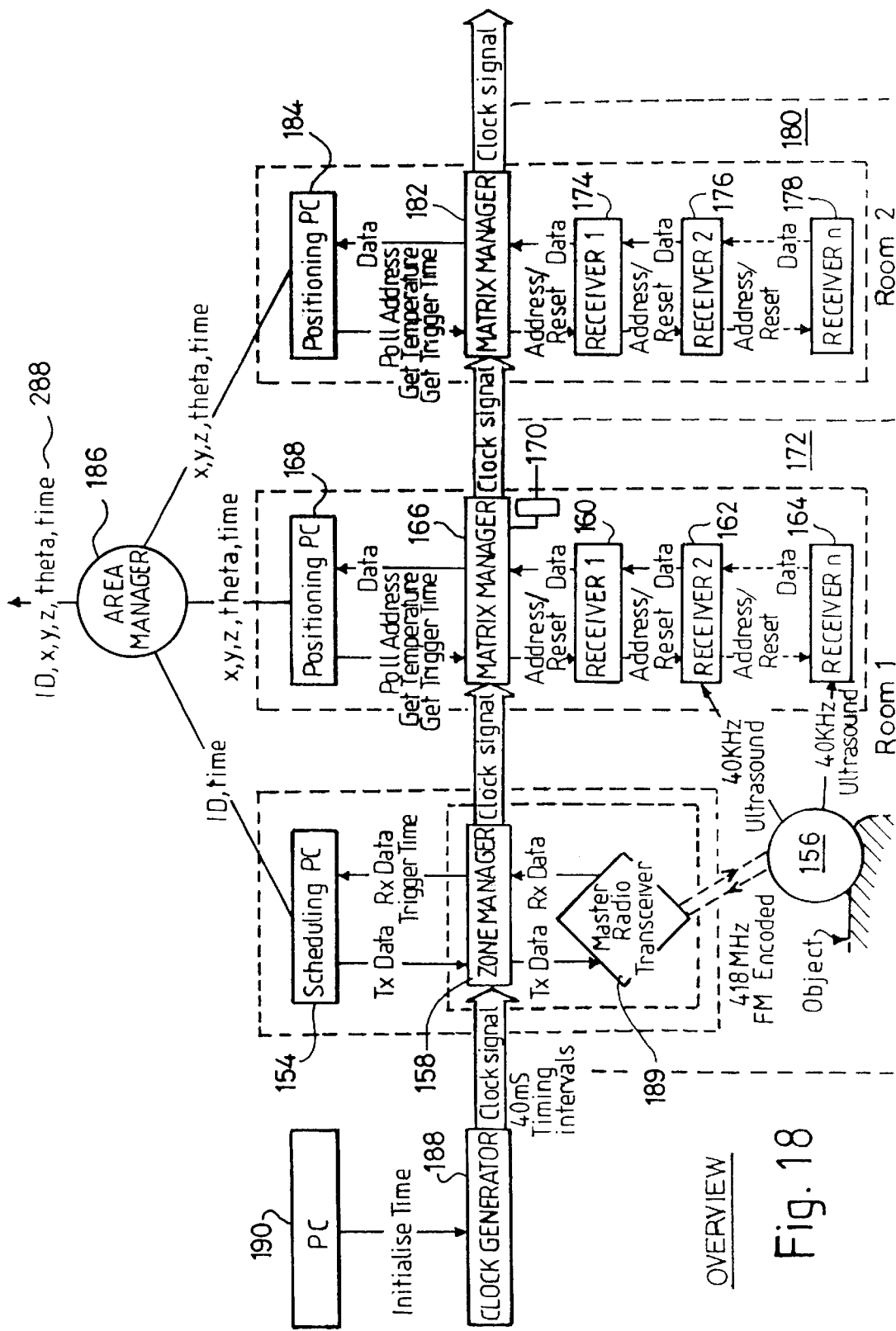
FIG. 18 is a block schematic overview of a complete system incorporating the present invention and also including a bidirectional radio link between the master transmitter unit and each of the addressed transponders.

The person 146 is wearing a transponder 152 on a chain around his neck. In this case, the sound energy is directed in front of the person, with the middle of the beam lying in the same vertical plane as the direction in which they are facing. FIG. 18 shows the person from above and the area in the horizontal plane over which sound energy will be radiated from the ultrasonic transducers on the transponder 152.

First it is necessary to compute the mean point of detection of the ultrasonic signal on the ceiling (û, v̂, ŵ), given by Equations (5), (6) and (7).

Secondly, the vector (a,b,c) is computed from the transponder to the mean point. The vector a, b, c, is computed using Equations 18, (9) and (10).

The vector (a,b,0) usually can be taken to be a good estimate of the horizontal direction of the middle of the sound beam leaving the object's vicinity, and can be used to calculate the direction A, in which the person is orientated around a vertical axis (relative to some other horizontal direction specified by a vector (m,n,0).

The value of A in the range $(-\pi, \pi]$ can be computed from the values of sin A and cos A given by Equations (11) and (12).

The value of A can be used as an estimate of the direction in which the person is facing.

FIGS. 18 to 23 illustrate a position detection system embodying the invention and the separate parts making up the system.

Complete System

FIG. 18 is a block schematic diagram of the complete system in which a Scheduling PC 154 dictates which one of a set of Mobile Transponders (one of which is shown at 156) are to be addressed in each of 25 timeslots per second. Addressing messages generated by the Scheduling PC are sent to Mobile Transponders via a Zone Manager 158, which also passes registration messages from the Mobile Transponders 156 back to the Scheduling PC.

Ultrasonic signals generated by the addressed Mobile Transponders 156 in response to the addressing messages sent by the Zone Manager, are detected by a set of Receivers three of which are shown at 160, 162, 164 attached to a Matrix Manager 166. Typically, there will be one Matrix Manager and a set of Receivers per room (or other space in which ultrasound is confined).

A Positioning PC 168 connected to the Matrix Manager 166 derives the air temperature of the room in which the polled receivers are located via a thermometer 170, and polls the Receivers 160, 162 etc. to retrieve the three measurements derived from the received ultrasonic signals, and uses this data, and the measurement of air temperature in the room 172, to calculate the 3D position of the source of the ultrasonic signals.

A second set of receivers (174, 176, 178) in a second rom 180 are also shown, with associated matrix manager 182 and positioning PC 184. Other similar set-ups can be provided for each room in a building, each linked to a central area manager 186.

Information from the Scheduling PC and the Positioning PCs is collated by an Area Manager 186, which produces a stream of location events that may be sent to users or applications. In order to perform this collation, elements of the system must be synchronized—this is achieved using a 25 Hz signal from a Clock Generator 188 and initialising PC 190.

Radio signals are transmitted to the mobile transponder radio receivers from a master radio transmitter/receiver unit 189 operating at 418 MHz with FM encoding.

Individual Parts of the System (1) Clock Generator (FIG. 19)

The Clock Generator 188 sends an accurate 25 Hz clock pulse and global time value to the Zone Manager and the Matrix Managers across a serial network. The generator has a 25 Hz 192 clock which drives a time store and counter 194. The time store holds the current global time value, and the counter increments it with every pulse. An initial global time value may be loaded from a the PC 190 connected to the Clock Generator (see FIG. 18).

After incrementing the current global time value, that value, and the clock pulse are gated to a serial network interface 196, which distributes these signals to other system components, so as to synchronize them.

(2) Zone Manager (FIG. 20)

Each zone manager (158) in FIG. 18 handles the radio interface between the scheduling PC and the mobile transmitters. As shown in FIG. 20, it has a data store 198 which is filled by the scheduling PC with the next packet to be transmitted. When this process is complete, the zone manager unasserts the "Ready" status line. On receipt of a clock pulse from the synchronisation network (200) along 202, the zone manager stores the associated time in a time store, 204, and triggers a message generator 206. The message generator sends a 136-bit preamble followed by a Manchester-encoded copy of the stored packet at 40 kbps to the transmit side of a 418 MHz FM radio transceiver 208, thus sending a DC-balanced copy of the desired message to the mobile transmitters.

After sending the message, the zone manager triggers a message decoder 210, which looks at the incoming signals picked up by the receive side of the transceiver 208. Any incoming radio message sent by the radio transmitting section of the mobile transponder is decoded and error-checked, and if the message is valid it is stored in a message store 212.

When time has been allowed for the outgoing message to be sent and any incoming messages to be detected, the zone manager asserts the "Ready" status line, indicating that the scheduling PC can review the stored time and any stored message. To this end the scheduling PC controls data path switch 214 to supply trigger tune (from 204) and/or message (from store 212) as appropriate, before loading the next packet to be transmitted.

The global clock synchronisation network signals pass unchanged through the Zone Manager.

(3) Scheduling PC

The scheduling PC 154 (FIG. 18) is programmed to determine the order in which mobile transmitters should be addressed based on the Location Qualities of Service (LQoS) assigned to them (either statically, or dynamically by users and applications). The scheduling PC also constructs the packets to be sent to mobile transponders (via the zone managers), and performs resource reclamation.

The algorithm used to choose the next Mobile Transmitter to be addressed is described as follows:

Scheduling Algorithm

Consider a system having the following parameters:
(1) The length of a timeslot is 40 ms (ie the system is capable of determining 25 positions per second)
(2) The transmitters each have a unique 16-bit address
(3) The reserved address 0 is not allocated to any transmitter.
(4) Every transponder is also a member of one transponder group, also identified with a 16-bit number (again, identifier 0 is reserved).
(5) The scheduler is a CORBA-based distributed software programme (Object Management Group, The Common Object Request Broker; Architecture and Specification. Revision 1.1, OMG Document Number 91.12.1, December 1991) running on a workstation.
(6) Location Quality of Service (LQoS) is expressed as an integer representing the desired period of positioning (eg an LQoS of 25 requests one position every 25 timeslots, ie once per second).

In accordance with the invention, the scheduler is adapted to maintain a scheduling table stored in memory. Each row of the table contains six entries:
1. A 16-bit transponder address, a
2. A 16-bit group identifier for the transponder, g
3. The LQoS for the transponder, l
4. A real number called the Effective LQoS (or ELQoS), e
5. A real number called the score, s
6. A bit called the slotswap bit, b.

A row in the table is described by an ordered six-type (a,g,l,e,s,b). A global flag called "excess-demand" (to be described later) and an integer called "last-group" are also maintained by the scheduler.

When the scheduler process is initialised, the scheduling table is empty. A single row (0,0,1,1,0, false) is immediately added. This entry represents a dummy transponder. The excess-demand flag is set to false, and the last-group is set to zero.

Adding or Changing a Request

An operator (user) or software application can contact the scheduler over its CORBA interface to indicate that the location requests for a transponder group should be added or changed. It should be noted that if two or more transponders are members of the same transponder group, then their location requests should not be capable of being added or changed separately. Furthermore, the requests involving the dummy transponder address 0 and dummy transponder group ID 0 will be ignored. The user or application passes the following information to the scheduler:

g, the transponder group identifier
l, the desired LQoS for members of this transponder group
$a_1, \ldots, a_n$, the transponder address of members of this transmitter group.

For each transponder address $a_1 \ldots a_n$, the scheduler then adds or modifies an entry in the scheduling table.

For values of i between 1 and n, if a row of the form $(a_i,g_i,l_i,e_i,s_i,b_i)$ is present in the table, it is updated to $(a_i,g,l,e_i,s_i,b_i)$, otherwise a row $(a_i,g,l,0,0,\text{false})$ is added.

The scheduler is then arranged to recalculate the ELQoS for each of the m entries in the table.

First, it calculates the total level of LQoS demand, (t), where t is given by Equation (1).

Next it updates the ELQoS for each of the n entries in the scheduling table, $_{ie}$, with a new value $e'_i$. If t is less than 1, then $e'_i$ is given by Equation (2).

Otherwise, if t is greater than or equal to 1, $e'_i$ is given by Equation (3).

Deleting a Request

When a user or application contacts the scheduler over its CORBA interface to indicate that a location request for a transponder should be deleted, it also passes the address of that transponder $a_i$, to the scheduler. (The entry corresponding to transponder address 0 may not be removed). If the scheduler finds that an entry for that transponder is present in the table, it removes the corresponding row $(a_r,g_r,e_r,s_r,b_r)$ from the table. The scheduler then updates every other row in the table $(a_x,g_x,l_x,e_x,s_x,b_x)$ to $(a_x,g_x,l_x,e_x,s'_x,b_x)$ where the value of $S'_x$ is given by Equation (4).

In Equation (4) n is equal to the number of rows in the table before removal of the location request. The scheduler recalculates the effective rates based on the remaining table entries as described in the previous section.

Allocating Timeslots

Once every 40 ms, the Scheduler must tell the central coordinating device (across a CORBA interface) the address of the transponder which should be located next. It does this by examining the contents of the scheduling table and any attempts to update the table are blocked until this examination is complete.

First, the scheduler steps through each row in the scheduling table. If the last-group register does not contain 0, and the scheduler encounters a row in which the transponder group ID is the same as the contents of the last-group register, and in which the swap-slot bit is false, it sends the transponder address contained in that row to the coordinating device, and sets the swap-slot bit on that row to "true".

Otherwise, the scheduler operates in accordance with the following algorithm:
(5)
1. Choose the row in the table with the highest score $(a_c,g_c,l_c,s_c,b_c)$.
2. If $b_c$ is false, for each row of the table which has the transmitter group ID $g_c$ set the swapslot bit to false. Then, update each row in the table $(a_x,g_x,l_x,e_x,s_x,b_x)$ to $(a_x,g_x,l_x, e_x,s'_x,b_x)$ where $s'_x$ is given by $$s'_x=(s_x+1/e_x)$$

Next, the single chosen row in the table is further updated to $(a_x,g_c,l_c,e_c,s''_c,b_c)$ where $s''_c=s'_c-1$.

The last group register is set to $g_c$.

Finally, the coordinating device is informed of the address $a_c$ of the transponder that should be located next (if $a_c$ is zero, this indicates that no transponder should be addressed in the next timeslot).

3. If $b_c$ is true, update each row in the table $(a_x,g_x,l_x,e_x,s_x,b_x)$ to $(a_x,g_x,l_x,e_x,s'_x,b_x)$ where $s'_x$ can be computed as above. Next, the single chosen row in the table is further updated to $(a_c,g_c,l_c,e_c,s''_c,\text{false})$ where $s''_c=s'_c-1$. The row in the scheduling table with the highest score is chosen again, and the above steps are retaken.

Once the next mobile transmitter's address has been determined, the scheduling PC determines whether an application requires that an "Output Data Value" should be sent to that transmitter. It also determines whether applications have indicated that the transmitter is no longer responding to addressing messages (perhaps because it has been removed from the range of all the receivers in the room or building in the case of a multi-zone system). If so, the transmit or drop bits in the next message should be set, to check the situation, or reclaim resources (as described above).

The scheduling PC also determines whether any mobile transmitters should be woken prematurely from a sleeping state, in which case the wake bit should be set. It also can acknowledge that a mobile transponder has been registered with the system whether this has been done by an operator, or an application according to data/time or data forcing the system to look for a particular mobile transponder address or has been achieved automatically.

Two values, s (the score) and e (the Effective Location Quality of Service) associated with the mobile transponder to be addressed, and maintained by the scheduling algorithm, can be used to estimate a time for which that mobile transponder may go to sleep. It can be shown that, assuming the LQoS demands managed by the system do not change, the mobile transmitter will not be addressed in at least the next st timeslots, given by Equation (13).

A message packet is then constructed from the collected information. The packet has a number of Cyclic Redundancy Check (CRC) error checking codes embedded within it (the standard CRC-8 code is used), and its format is given in Table 1.

If no data value is to be sent to the mobile transponder, the Output Data Value field is set to 255. Similarly if no mobile transponder registrations require acknowledgement, the Registration Acknowledgement field is set to zero.

The message packet is loaded into the zone manager's Data Store in 8-bit chunks. After the last chunk is loaded, the scheduling PC start to continuously poll the zone manager's "Ready" status line. This line is asserted when the zone manager has transmitted any stored message where the radio receiver section of the transceiver 208 is being employed.

At this time, the scheduling PC retrieves (from the zone manager) the time at which the transmission was made, and sends an event of the form (identifier, time) to the area manager across a CORBA interface (Object Management Group, The Common Object Request Broker; Architecture and Specification. Revision 1.1, OMG Document Number 91.12.1, December 1991), indicating the 16-bit identifier of the addressed mobile transmitter and the time of addressing.

Finally, the scheduling PC retrieves from the zone manager any incoming message sent by the radio transmitter of the address mobile transponder (where fitted and utilised). Any such message will contain an address and button status bits. The scheduling PC must deal with any registration request detected in this way, and/or inform any applications which are interested in "Button Pressed" events from mobile transponders.

It then identifies the address of the next mobile transmitter by repeating the scheduling process described in this section.

Figure 21:
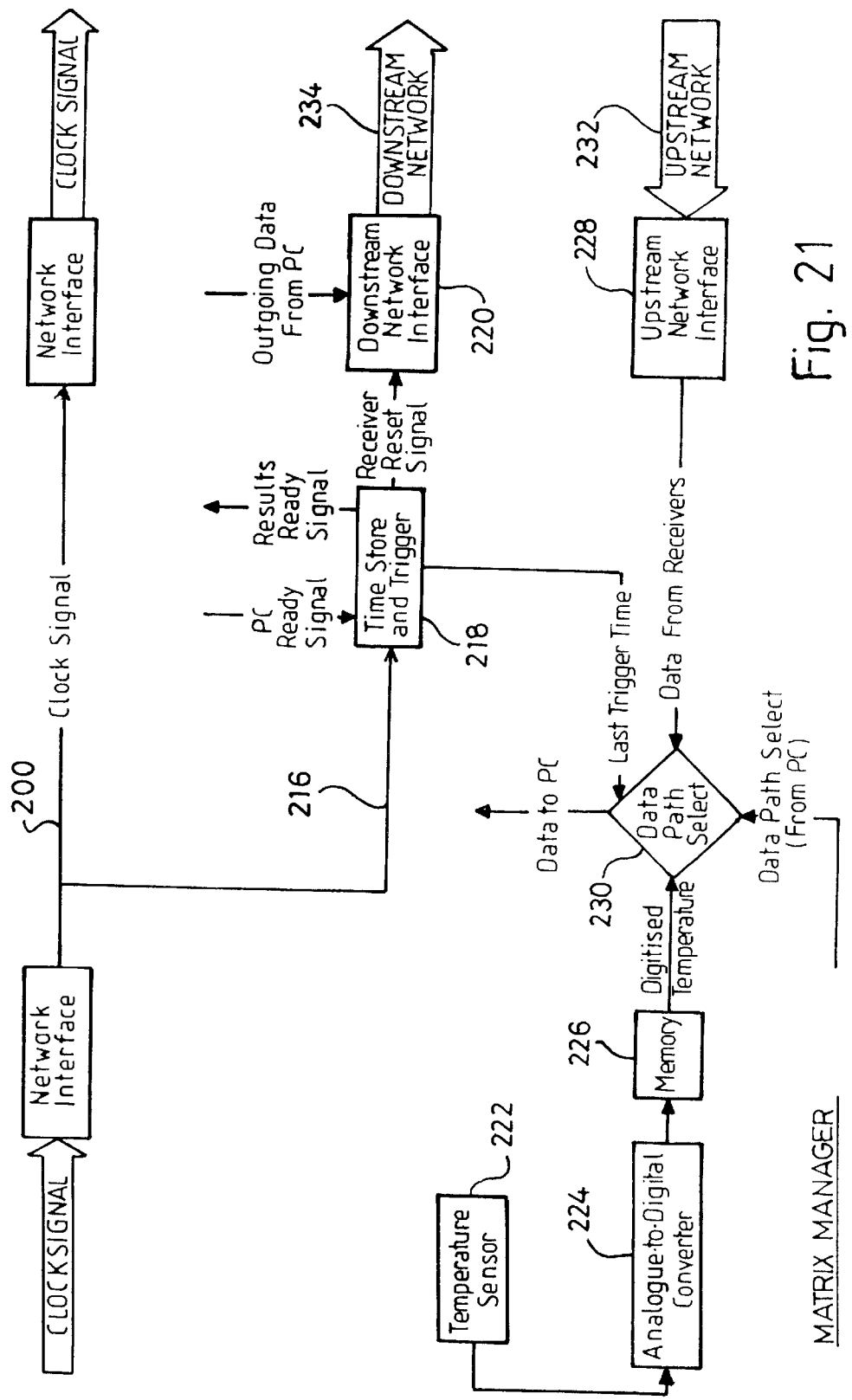
FIG. 21 is a detailed block schematic of a matrix manager of FIG. 18.

(4) Matrix Manager (FIG. 21)

The matrix manager shown in FIG. 21 resets ultrasound receivers (eg 20, 22 etc. in FIG. 1) connected to it, at a precise time, and acts as an interface between the positioning PC and those receivers.

On receipt of a clock pulse along line 216 from the synchronisation network 200, the matrix manager stores the associated time in a time store 218, waits for 9.65 ms to allow the radio message to be sent and sends a "Reset" signal over its Downstream Network Interface 220 to the ultrasound Receivers connected to it. After 20 ms, the matrix manager asserts the "Results Ready" status line, which indicates to the positioning PC that the receivers will have made their measurements, and that the positioning PC can now use the "Outgoing Data" bus to poll those receivers to determine the results.

The positioning PC can also retrieve the time at which the receivers made their measurements by recovering the time held in the time store 218. It can also retrieve the latest measurement of the temperature in the room measured by a temperature sensor 222, the output of which is continually digitised by ADC 224 and stored in memory 226 for retrieval for example when the receivers are reset.

The positioning PC can also send commands to the ultrasound receivers through the "Outgoing Data" bus to change the peak detection algorithm or thresholds used by the ultrasound receivers.

When the positioning PC asserts the "PC Ready" status line to indicate that it has performed all necessary actions associated with the current measurements, the matrix manager unasserts the "Result Ready" status line and prepares itself for the next clock pulse.

Results from the Receivers are accepted via the upstream Network Interface 228. A Data Path Selector switch 230 (FIG. 20) allows the positioning PC to retrieve those results or the digital temperature measurement from 226, as desired.

The global clock synchronization network signals pass unchanged through each matrix manager in turn.

Figure 22:
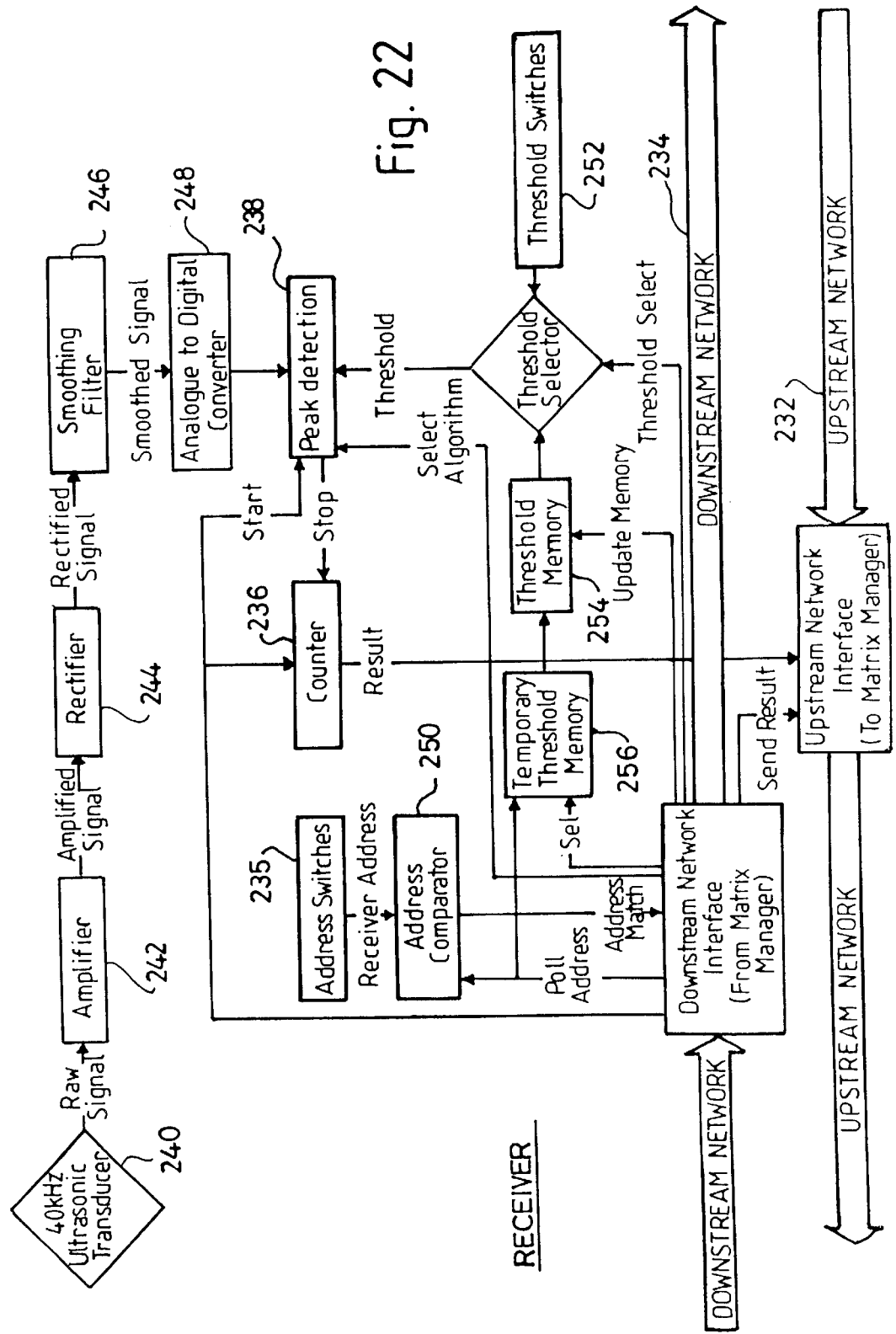
FIG. 22 is a detailed block schematic of an ultrasound receiver such as is incorporated in each room of the system of FIG. 18.

(5) Receiver (FIG. 22)

The receiver shown in FIG. 22 detects ultrasonic signals from the transducer on the mobile transponders, and converts them to electric signals and processes those signals to determine the time at which the received acoustic signal peaked for the first time. Receivers are connected in a serial daisy-chain to a matrix manager by two networks—an upstream network, 232 which carries information to the matrix manager, and a downstream network 234 which carries information from the matrix manager. Each receiver has an address which is unique amongst those connected to the same matrix manager, allowing it to be polled by the positioning PC also connected to that matrix manager. The address may be coded for example by setting switches 235 on the PCBs of the receivers.

When a receiver detects a "Reset" signal condition on the downstream network 234, it resets an on-board counter 236 and peak detection circuit 238. For the next 20 ms, the counter is updated at a frequency of 20 kHz, and the peak detection circuit monitors a signal from a 40 KHz ultrasonic transducer which has been amplified in 242, rectified in 244, smoothed in 246 and digitized in 248.

When the peak detection circuit indicates that the signal has peaked for the first time, counter 236 is stopped.

If the 20 ms window closes before a peak is detected, the value 0 is formed in the counter.

After the 20 ms period, the receiver may be polled by the positioning PC via the matrix manager and the downstream network 234. If an address comparator 250 in the receiver linked to the switch coded address 235 detects that the receiver is being polled, the stored value in the counter is sent back to the positioning PC via the upstream network 232 and matrix manager, together with error-checking information. Incoming information from other receivers on the upstream network is blocked during this period.

Additional lines on the downstream network 234 can be used by the positioning PC to change the peak detection algorithm used by the Receiver. Two algorithms may be used:

Stop the counter when the signal has risen above a certain absolute threshold and when the signal peaks for the first time. This is the default algorithm.

Stop the counter when the signal has risen above a certain threshold relative to the lowest signal value seen so far. This algorithm is more useful when the offset of the receiver amplifier is liable to change.

The threshold source may be a bank of switches 252 on the receiver PCB, or a threshold memory 254. The threshold source may, again, be changed by the positioning PC by using lines on the downstream network. To set the value in the threshold memory 254, the positioning PC sets the poll address on the downstream network to the new value, and then asserts further lines such that each of the receivers load the poll address value into a temporary threshold memory 256. The positioning PC then sets the poll address on the downstream network to the address of the receiver whose threshold must be altered, and asserts further downstream network lines to transfer the value from the temporary threshold memory 252 into the threshold memory 254 of the appropriate receiver.

(6) Mobile Transponder (FIG. 23)

The mobile transponder shown in FIG. 23 can be attached to objects, and generates ultrasonic signals 258 by which its position and possibly orientation can be determined.

Incoming radio messages from a zone manager are picked up by a 418 MHz FM Radio Transceiver 260 and decoded by a message decoder 262. The message decoder also uses error-checking information in the incoming messages to determine if bit errors on the radio link have occurred.

After the message has been received, the power-saving supervisory circuit 264 switches off the receive side of the radio transceiver 160.

A message generator 266 allows the mobile transponder to contact the zone manager through the transmit side of the radio transceiver 260. The message generator is used by a registration controller 268, which handles attempts to make the zone manager aware of the presence of the mobile transponder, and is also activated when a user presses one of two buttons 270, 272 on the transponder (if fitted).

If a good message is received, the message decoder compares the transmitter address contained in the incoming message with that stored in ROM 274. If the addresses match, then:
1. A trigger signal is sent to a pulse signal generator 276, which drives a set of ultrasonic transducers 278 (arranged around a hemispherical shell) at 40 KHz for 50 $\mu$s to produce the ultrasound pulse 258.
2. A counter in the power-saving supervisory circuit is loaded with the value of the sleep time in the message (via line 280).
3. If the drop bit in the message is set, a registration controller 282 on the mobile device is informed that the zone manager will no longer address this mobile transmitter. The registration controller will then begin attempts to register with the zone manager. If the drop bit is not set, but the mobile transmitter is attempting to register with the zone manager, the registration controller 282 is informed that the registration attempts were successful, and it need not attempt to register again.
4. If the transmit bit in the message is set, the mobile transponder prepares to immediately transmit its address over its bidirectional radio interface (260) to 208.
5. The 8-bit Output Data Value in the message is sent to a 10-way data port on the mobile transponder (the port also includes a ground line, and a strobe line which indicates when the data is valid).

If the message doctor indicates that the incoming message is not for the current transmitter, but that the registration acknowledgement field contains the address of the current transmitter, then the registration controller 282 is informed that the zone manager is now aware of this mobile transponder, and that no more registration attempts are needed.

After the incoming message has been decoded, the mobile transponder may attempt to send a data packet back to the zone manager through the transmit side of the 418 MHz radio transceiver 260. This behaviour may be caused by a number of events:
1. The transmit bit in the incoming message was set, and the transmitter address encoded in the incoming message is the same as that of the mobile transponder.
2. A button switch on the mobile transponder has been pressed.
3. The registration controller 282 is attempting to register the mobile transponder with the zone manager, and the transmit bit of the incoming message is not set, and the probabilistic "Slotted ALOHA" contention-resolution protocol (driven by a pseudo-random number generator) indicates that the mobile transponder should attempt to send data to the zone manager in this timeslot.

If one of these events does occur, a message generator waits a 25 $\mu$s turnaround time before switching on the transmit side of the radio transceiver 260, and sending (at 40 kbps) a 168-bit preamble followed by a Manchester-encoded version of the packet whose format is shown in Table 2.

A cyclic redundancy check code may be included in the packet to detect link errors or collisions with transmissions from other mobile transmitters. A standard CRC-8 algorithm is used to generate the CRC.

After transmission of the preamble and packet, the message generator switches off the transmit side of the radio transceiver 260.

The power-saving supervisory circuit 264 is used to control other parts of the mobile transmitter in order to save power. It is driven by a 32 kHz clock 284, which allows it to be low-powered itself. The prime function of this circuit is to turn on the receive side of the radio transceiver 260 every 40 ms, so that the next incoming radio message from the zone manager may be detected and decoded. However, if the sleep counter is not zero (indicating that the mobile transponder may enter an even lower-powered sleeping state), the power-saving supervisory circuit 264 decrements this counter once every 40 ms, and only activates the receive circuitry of the mobile transmitter 260 once every eight timeslots (so that the wake bit periodically may be checked). The power-saving supervisory circuit 264 also controls an 8 MHz clock 265 which is used by the message decoder 262 and message generator 266.

If the message decoder 262 indicates that the wake bit in the incoming message was set, then the power-saving supervisory circuit 264 sets sleep counter 286 to zero. This action ensures that the transmitter will check each incoming message until it is instructed that it no longer needs to do so.

If the message decoder 266 indicates that an error occurred on the radio link, or that no message was received when one was expected, the mobile transponder will enter a "Searching" mode. In this mode, the low-power supervisory circuit switches on the receive side of the 418 MHz radio transceiver 260 approximately once every 80 s, for a period of just over one second, and the registration controller 282 is informed that it should attempt to register with the zone manager. The "Searching" mode is also the default state of the mobile transponder when it is switched on for the first time.

(7) Positioning PC

A 200 MHz Pentium-pro IBM compatible PC with a 48 line parallel digital IO card may be used and the same hardware is suitable for all PCs shown.

Associated with each matrix manager is a positioning PC 154, 168, 184 which computes the compositions of mobile transmitters from the time-of-flight values determined by receivers 160, 1672 etc. (whose surveyed positions are stored in memory by the positioning PC). It continuously polls the matrix manager to determine whether the receivers have been triggered and have results which should be processed. When the "Results Ready" status line is asserted by the matrix manager, the positioning PC (via the matrix manager) polls each of the n receivers connected to the matrix manager, retrieves a data value from each (along with error checking information), and unasserts the "PC Ready" status line.

For each receiver that returns a good non-zero data value (ie. the error checking information indicates a good data value, which, being non-zero, indicates a signal was detected by that receiver), that data value is used to calculate a transmitter-receiver distance. The positioning PC interrogates the matrix manager such as 166, 182 and determines the current temperature of the room, t (measured in ° C.). It is then possible to calculate the speed of sound in the room, c, from equation (14).

Calibration of the system during installation provides a value, d, for the fixed delays in the system (such as the time taken to decode the radio message by the mobile transponder). From the pulse time-of-flight, f, from the mobile transponder to receiver i, the corresponding transponder-receiver distance $l_1$, can then be calculated as $l_i = c \times (f_i - d)$.

If a mobile transponder is at the coordinates (u,v,w) and the distance from it to a receiver at the coordinate (x,y,0) is l, are that all receivers lie in the plane of the ceiling. It can be shown that $l^2$ is given by Equation 15.

Equation 1 can be regarded as a nonlinear model, see Myers, R. Classical and modern regression with Applications, PWS-KENT, 1990, and can use nonlinear regression to fit the values of l,x and y for several receivers to this model. This gives estimates $\hat{u}$, v and $\hat{w}^2$. This allows the determination of a best least-squares estimate for the mobile transponder's position as the coordinate $(\hat{u}, v, -\sqrt{\hat{w}^2})$, taking the negative square-root of $\hat{w}^2$ to fix the transponder below the ceiling. A shadow solution $((\hat{u}, v, -\sqrt{\hat{w}^2})$ corresponds to an impossible transmitter position above the ceiling. The non-linear model has three degrees of freedom, and knowledge of at least three transponder-receiver distances is therefore required to calculate the mobile transponder's position. Furthermore, the model cannot be fitted to the data if all receivers that detected a signal are collinear.

Reflected signals from objects in the environment can lead to incorrect distance measurements. Normally, the first signal peak detected by a receiver will be due to a pulse travelling along a direct line from the transponder. This pulse will arrive before any reflected pulses, which must travel along longer paths. The distance thus measured by the system will be that of a straight line joining transponder and receiver. Occasionally, however, the direct path may be blocked, and the first received signal peak will be due to a reflected pulse. In this case, the measured transponder-receiver distance will be greater than the true distance, leading to an inaccurate estimate of the transponder's position.

Two techniques have been developed for identifying and eliminating inaccurate distance measurements. First the difference of two transponder-receiver distances cannot be greater than the distance between the receivers. If, by comparing pairs of measurements, two receivers are found whose results do not satisfy this test, it can be stated that the larger of the two distances must be a measurement along a reflected path (remembering that reflections can only increase the measured distance), and can discard that result from the data set.

Secondly, a statistical test has been developed based upon the observation that the proportion of receivers that detect only reflected signals is small. Studentized residuals (Glantz, S., Slinker, B. Primer of Applied Regression and Analysis of Variance. McGraw-Hill, 1990) provide one method of identifying outliers in data sets, and can be calculated for each of the distance measurements during the nonlinear regression process. An incorrect measurement will be considered to be an outlier in the full set of measurements, and it is likely to have a large studentized residual. The result with the largest positive studentized residual is removed from the set of distance measurements (remembering, again, that reflections can only increase the measured distance), before re-computing the nonlinear regression and residuals.

The statistical test is repeated until the variance of the remaining measurements fall below an acceptable threshold (suggesting that all outlying data points have been eliminated), or only three measurements remain. A final calculation of the transmitter's position is then made using those data values.

From the calculated position and the known locations of the receivers that detected a signal from the mobile transmitter, it is also possible to estimate θ, the orientation of the mobile transmitter around a vertical axis. The method used to perform this estimation has been described above.

The positioning PC then retrieves (from the matrix manager) the time at which the measurements used in the position calculation were made. Finally, it sends an event of the form (x,y,z,θ, time) to the area manager across a CORBA interface, indicating the calculated position (x,y,z), orientation (θ) and time of measurement, and informs the matrix manager that it is ready for the next set of readings (by asserting the "PC ready" status line).

It should be noted that the positioning PC (168, 184) can send commands to individual receivers (via the matrix manager) to change the peak detection algorithm they use, or to change the threshold they store in memory, or to change the source of the threshold that the peak detection algorithm uses (either onboard switches, or memory).

(8) Area Manager (FIG. 18)

As shown in FIG. 18 data from the scheduling and positioning PC's is transmitted to the area manager 186 which comprises inter alia a data processor (such as a PC). This gathers events of the form (identifier, time) from the zone manager, and events of the form (x,y,z,θ,time) from each matrix manager.

An associative memory in the area manager links events using the time parameter, and generates a stream of events of the form (identifier, x,y,z,θ,time).

It can be seen that these events contain identification, location, orientation and time information, and therefore allow the position and orientation (at a particular time) of a transponder to be determined.

This event stream (shown at 288 in FIG. 1) may be passed on to users and client applications.

Power Saving at the Receiver-transmitter Units

Power saving can be achieved in the transponders by switching the receiver into a quiescent or OFF mode during the time intervals between addressing, and if the frequency at which a particular transponder unit is to be addressed is known this can be encoded into the radio message so that after decoding the message the receiver section can be turned off for that period of time.

Control Signals Using Radio Transmitters

Additional information in the form of control signals may be encoded into the radio addressing signals transmitted to the transponder units so as for example to control a display or robotic device, associated with the transponder unit.

Shape Determination

Electrical signals indicative of the positions of a plurality of transmitters located at selected, strategic points on an object, may be derived and stored and processed, for example by comparison with stored electrical signal data or processed by means of an algorithm, to produce a decision signal indicative of the shape of the object. This may enable a new object to be identified by reference to its shape.

Display of Monitored Area

Electrical signals indicative of the position and/or orientation of an object whose position and orientation (relative to the area) have been determined by position determining systems, may be employed to control the display of a graphical representation of the object on a TV or computer monitor, together with graphical representations of other objects also identified by positions (and orientation if measured).

In accordance with our UK Patent Application No. 9808526.9 the following changes to the system described with reference to FIGS. 1 to 23 are required to implement which a system in a single radio transmitter serves two or more ultrasonically separate spaces, it first being understood that, as previously explained, the timeslot in the system described could safely be reduced to 20 ms, without affecting the way in which the system operates.

First, a stagger time is adopted of 10 ms (this is a quite conservative stagger time). The clock generator is charged so that it signals timeslots of 30 ms, allowing two mobile transponders to be addressed in a staggered sequence. Also the receivers are altered so that they receive signals over a 30 ms window.

The scheduling PC selects two mobile transponders to be addressed during the next timeslot. For this purpose, the following algorithm is used:

1. Set variable a to zero.
2. If a is zero, use the existing scheduling algorithm to select the next two mobile transponders to be addressed. Set variable b to the address of the first, and variable c to the address of the second. If a is not zero, set variable b to be equal to the value of a, and use the existing scheduling algorithm to select the next mobile transponder to be located, placing its address in variable c.
3. If the last position information for the mobile transponders b and c suggests that they are in separate ultrasonic spaces, locate both mobile transponder b and mobile transponder c in the next timeslot (b at the start of the timeslot, c 10 ms later), and set variable a to zero. Otherwise, locate the mobile transponders with addresses b and zero in the next timeslot (b at the start of the timeslot), address zero 10 ms later), and set variable a to be equal to the value of c.
4. Go to step 2.

This scheduling algorithm has the property that the Location Quality of Service (LQoS) demand for each mobile transponder is at least satisfied, but may be exceeded by a factor of two. Obviously, the choice of address is strongly affected by the previous positions of the mobile transponders, in order to try to select mobile transponders that are in independent ultrasonic spaces. For this purpose the scheduling PC holds a 3D description of all ultrasonic spaces to allow it to determine if two points are in the same space. It should also be noted that the sleep times calculated by the algorithm for the two mobile transponders are divided by a factor of two, so as to ensure that they remain conservative estimates.

The format of the message packet to be sent to the mobile transponders via the zone manager is changed to reflect the fact that it must now contain information to be sent to two addresses. A suitable format is shown in Table A appended hereto.

It is to be noted that the registration of up to two mobile transponders in the previous timeslot may now be acknowledged using the two registration acknowledgement fields. The zone manager is changed to accept this new packet format from the scheduling PC and transmit it to the mobile transponders. After the packet is sent by the zone manager, the scheduling PC retrieves the time at which the packet was sent from the zone manager. It then forwards an event of the form (identifier1, identifier2,time) to the array manager across a CORBA interface, indicating the 16-bit addresses of the two mobile transponders located in the last timeslot, and the time of the start of that timeslot.

The mobile transponders are changed to reflect the new packet format and length. Since a mobile transponder may be triggered by either of the addresses contained in the message sent from the zone manager, its message decoding logic is changed. If a mobile transmitter is triggered by one of the two addresses, this logic deals with the corresponding drop and transmit bits, sleep time and output data value. Mobile transponders which are attempting to register with the zone manager also check both of the registration acknowledgement fields within the incoming message to see whether their registration has been successful.

If a mobile transponder is triggered by the first address in the incoming message, the pulse generation circuit immediately drives the ultrasonic transducer set with a 40 kHz signal for 50 $\mu$s. If a mobile transponder is triggered by the second address in the incoming message, the pulse generation circuit waits for exactly 10 ms before driving the ultrasonic transducer set with a 40 kHz signal for 50 $\mu$s.

The message generator which sends data packets to the zone manager is changed to reflect the fact that two mobile transponders may be required to transmit their address to the zone manager in the same timeslot. Thus two opportunities or transmission slots for a mobile transponder to contact the zone manager are provided in each timeslot. The first transmission slot starts 25 $\mu$s after the end of the incoming radio message, and the second transmission slot starts 25 $\mu$s after the end of the first transmission slot. When using a transmission slot, the mobile transponder sends (at 40 kbps) a 168-bit preamble followed by a Manchester-encoded version shown in Table B appended hereto.

The length of the transmission slot is the time taken to send the preamble and Manchester-encoded packet. If a mobile transponder is triggered by the first address in an incoming radio message, and the corresponding transmit bit is set, the mobile transponder will use the first transmission slot to send its address back to the zone manager. If the mobile transponder is triggered by the second address in the message, and the corresponding transmit bit is set, it will use the second transmission slot to send its address to the zone manager. Any mobile transponder which is attempting to register with the zone manager, or which is reporting a button press, may transmit its address and button status in any transmission slot for which the corresponding transmit bit is not set (ie which is not reserved for one of the triggered mobile transponders). The zone manager is changed to allow messages sent in both transmission slots to be received and passed on to the scheduling PC.

The matrix manager now waits 12.95 ms after seeing a trigger signal from the clock generator before triggering its associated receivers (to allow the longer radio message to be sent to the mobile transponders). When triggered, each set of receivers (one per room or other isolated space) opens its receive window for 30 ms. At the end of that period, the positioning PCs connected to the matrix managers poll the receivers to determine firstly whether they saw any ultrasonic signals, and secondly, if they did, the time after the trigger signal at which the incoming ultrasonic signal peaked for the first time. Each positioning PC calculates two sets of transmitter-receiver distances from the measured signals—one assumes that the mobile transponder was triggered at the start of the timeslot, the other assumes that it was triggered 10 ms later. The nonlinear regression calculation is then run twice by the positioning PC, using each of the two distance sets and the positions of the receivers that detected the ultrasonic signals. Each regression calculation yields a result, either a 3D position and orientation if the regression converges to a solution, or an error value if it does not. The positioning PC then sends an event of the form (result1, result2,time) to the array manager over a CORBA interface, indicating the results for the two nonlinear regression calculations for signals detected in the last timeslot, and the time of the start of that timeslot.

The area manager must combine the information streams from the scheduling PC and the positioning PCs. A simple (though not necessarily optimal) algorithm which perform this task is now described.

First, it is assumed that for a particular timeslot, the addresses have been gathered of all those mobile transponders that were located (x and y, where mobile transponder x is located 10 ms before mobile transponder y), and also the two results have been gathered from each of n positioning PC's (ie a collected a data set $r_{11}, r_{12}, r_{21}, r_{22}, \ldots, r_{n1}, r_{n2}$). From that data set, another data set $s_{11}, s_{12}, s_{21}, s_{22}, \ldots s_{n1}, s_{n2}$ is constructed where $s_{ij}=1$ if $r_{ij}$ is a good 3D position and orientation, and $s_{ij}=0$ if $r_{ij}$ is an error value indicating non-convergence of the nonlinear regression model.

If y is not equal to zero (ie the second address in the message was not a dummy address) it is checked that two signals have been detected in separate ultrasonic spaces. For this to be true, it must be possible to find i and j such that $s_{i1}=1$ or $s_{i2}=1$ and $s_{j1}=1$ or $s_{j2}=1$ and i≠j, but not possible to find k such that $S_{k1}=1$ or $s_{k2}=1$ and k≠i≠j. If this is not true, all results for this timeslot must be discarded, because signal cross-contamination could have occurred.

Next, it is checked that only one good set of ultrasonic signals have been identified from each trigger time within the timeslot. For this to be true, there must be only one i such that $s_{i1}$ is true, and at most one j such that $s_{j2}$ is true. If it is found that this statement is not true, all results for this timeslot must be rejected, because it is not possible to determine in which ultrasonic space a mobile transponder is likely to be (although application of heuristics could make some progress in this case). If it is found that the statement is true, it is possible to assign result $r_{i1}$ to the mobile transponder with address x, and any result $r_{j2}$ to the mobile transponder with address y. The area manager then knows the time at which each mobile transponder was triggered and also the position and orientation of the mobile transponders at those times, and it can form this information into an event stream which is passed on to users and client applications.

It can be seen that the above implementation is capable of locating two mobile transponders in a 30 ms period (assuming that two mobile transponders in different ultrasonic spaces and that the system operates correctly). Therefore, the potential aggregate update rate is around 66 Hz, rather than the 50 Hz which was previously possible. Furthermore, it is possible to achieve higher location rates by triggering more than two mobile transponders in a staggered sequence.

Five examples of the Present Invention

There will now be described five embodiments exemplary of the present invention. These are:

1. A system which uses time division multiplexing (TDM), and which has 20 ms timeslots.
2. A system which uses TDM, but with staggered triggering of mobile transponders, in 30 ms timeslots.
3. A system which uses frequency division multiplexing (FDM), with three available frequencies, and 20 ms timeslots.
4. A system which uses TDM and a fast radio interface, with 20 ms timeslots.
5. A system which uses a combination of FDM and TDM, ie Frequency and Time Division Multiplexing (FTDM), with three available frequencies but twelve colours, and staggered triggering of mobile transponders in 30 ms timeslots.

TDM System with 20 ms Timeslots (FIG. 27)

This system is generally similar to that described with reference to FIGS. 1 to 23, but there is a multiplicity of some items. The drawing shows a three cell arrangement (Cell 1, Cell 2, Cell 3) each of which has a Mobile Transponder (MT), a Matrix Manager (MM), a Positioning PC (PP), a Zone Manager (ZM), a Scheduling PC (SP) and an Area Manager (AM). A Clock Generator (CTG) is also shown along with a fresh software item, namely an Object Manager (OM). Transmission paths are also marked in the drawing.

The object manager's purpose is to coordinate the scheduling PCs and to decide whether mobile transponders should hand over from one scheduling PC to another. All scheduling PCs and area managers are connected to the object manager via CORBA interfaces. Area managers pass position and orientation information about mobile transponders to the object manager, which then forwards that information on to client applications and users. The object manager also monitors this data, and if, based on a mobile transponders position and knowledge of the extent of each radio cell, it decides that a handover should be made, it sends the corresponding signals to the appropriate scheduling PCs over the CORBA interface. A handover will be initiated if a mobile transponder moves to the very edge of a cell, into an area which is closer to the centre of another cell. The object manager receives data on the success, or otherwise, of handovers directly from the scheduling PCs, enabling it to send the control messages required to complete or cancel active handovers (as described above). The object manager also holds a static mapping between Cell IDs and the colour (ie TDM offset) used by each cell.

The object manager receives information from the scheduling PCs about registrations and resource reclamation, allowing WHISP information stored for individual mobile transmitter to be forwarded to the appropriate scheduling PCs during handover or after registration. Client applications can also change the WHISP information stored on the object manager whilst the system is running, and such changes are automatically forwarded to the appropriate scheduling PC(s).

An enhanced clock generator (FIG. 29b) is used in this system. This device not only sends an accurate 50 Hz clock pulse and global time value to zone managers and matrix managers, but also distributes a value indicating the current active colour in the TDM scheme. The clock generator therefore contains a register 312 holding the current number of colours, and a counter 194, which increments (modulo the number of colours) every pulse. This register may be set by a PC connected to the clock generator, and the counter may be preset along with the global time value by the PC, so that the colour value is consistent with the globaltime value.

The software process run on the scheduling PC is very similar to that used in the standard system. However, for each mobile transponder managed by the scheduling PC, two extra data values are stored in memory—a 5-bit value indicating the relative TDM offset of the cell to which the mobile transmitter should hand over (or zero, if no handover is to be performed), and an 8-bit value indicating that cell's identifier (again, zero if the mobile transmitter should not hand over). These data values are supplied and updated for each mobile transmitter by the object manager over the CORBA interface. An extra 5-bit register in the scheduling PC holds the TDM channel used by the associated radio cell, and an 8-bit register holds the unique identifier of that radio cell—both are configured when the software process is initialised. No scheduling PC may have address 0. The format of the messages sent out by the scheduling PC is changed to the form shown in Table C appended hereto.

A number of new fields have been added. The first, Cell ID is set to the constant 8-bit cell identifier stored by the scheduling PC. The colour space is a constant 5-bit value which indicates the number of colours used in the TDM system. The handover offset and handover Cell ID fields are used to tell a mobile transmitter to hand over to a different scheduling PC, and are set to the values of the handover information stored by the scheduling PC for the addressed mobile transmitter. A further 1-bit value is stored for each mobile transmitter managed by the scheduling PC, indicating whether the management is provisional or not (ie if the mobile transmitter should be attempting to hand over to that scheduling PC or not). If a scheduling PC addresses a mobile transmitter for which it is allocating provisional resources, the transmit bit in the outgoing message is sent.

The zone manager (FIG. 29C) used for this system is similar to that shown in FIG. 20 and similar reference numerals are employed for similar parts. However, an extra register 320 in the zone manager holds a colour value, loaded from the scheduling PC at configuration time. The zone manager only triggers on a clock pulse when the colour value transmitted simultaneously by the clock generator matches the colour value stored in the register.

A block circuit diagram of a mobile transponder is shown in FIG. 29A, and utilises the same reference numerals as FIG. 23 for similar parts. However, in the present invention, there mobile transmitters must be made aware of the TDM colouring scheme and also the possibility of handovers between cells. The mobile transmitter's message decoder 262 determines the number of TDM channels from the colour space field of the incoming message, and stores it in a register 330. If the sleep counter 286 is zero, the power-saving supervisory circuit 264 now switches the receive side of the radio transceiver on every 20x ms (where x is the number of TDM colours, stored in the register). If the sleep counter is not zero, the power-saving supervisory circuit decrements the counter once every 20x ms, and only activates the receive circuitry of the mobile transponder once every 160x ms (ie once every eight timeslots allocated to the current TDM channel).

Each time the mobile transponder receives a message from a scheduling PC (via the zone manager), the message decoder 262 check the value of the Cell ID field in the incoming message with the value of the same field in the last message (stored by the message decoder in a register, the current Cell ID 332 which contains zero on power-up). If the values differ, the registration controller 282 is immediately informed that the mobile transponder should attempt to register with the zone manager.

If the message decoder detects that the value of the handover offset and/or handover Cell ID fields in the incoming message are not zero, and that the message is destined for that mobile transponder, it attempts to hand over to another zone manager/scheduling PC. The handover offset and handover Cell ID values are stored in registers (334 and 336 respectively), and the power-saving supervisory circuit 264 wakes the receive circuitry of the mobile transponder 20y ms after the start of the current timeslot, where y is the value of the handover offset register. The receive circuitry remains active for at least 4 ms—if a valid preamble is seen within this time, the incoming radio message is received. If the message decoder detects that it is a valid message, it compares the Cell ID field with the value of the handover Cell ID field stored in the register. If the IDs match, the mobile transponder hands over. The message decoder sets the current Cell ID register to be equal to the value of the handover Cell ID register, clears the handover offset and handover Cell ID registers, and then informs the registration controller 282 that it should attempt to register with the new scheduling PC. The power-saving supervisory circuit 264 then resets the sleep counter 286 to 0, and de-activates the receive circuitry, waking the mobile transponder up again 20x ms after the start of that timeslot, where x is the contents of colour space register 326. If the Cell IDs do not match, or no valid preamble or message is detected, then the handover offset and handover Cell ID registers are cleared, and the power-saving supervisory circuit deactivates the receive circuitry, waking the mobile transponder just before the arrival of the next message from the current scheduling PC.

The system can support up to 31 TDM channels, and so if a mobile transponder is in the "Searching" mode, its power-saving supervisory circuit 264 leaves the radio transceiver's receiver circuitry on for at least 31×20=620 ms to ensure that it has allowed time for all of the available TDM channels to be activated.

In this system, each scheduling PC has an associated area manager. All (identifier, time) pairs generated by a scheduling PC are sent to the associates area manager. The positioning PC associated with each space sends any (position, orientation, time) events that it generates to all area managers associated with the scheduling PCs which could trigger mobile transponders in that space. This set of transponders is determined empirically at configuration time. After combining the events, area managers send (identifier, position, orientation, time) events to the object manager.

For completeness, it should be mentioned that the matrix manager employed in the system is the same as that shown in FIG. 21, and the receiver is similar to that shown in FIG. 22.

FIG. 30 shows an example in which an environmental space is covered by eight cells, using three colours (ie three TDM channels).

FIG. 30A shows, with reference to time, the sequence of transmission of the radio energy bursts of the different colours (Cell1, Cell2 and Cell3).

It is to be noted that the three cells numbered 1 do not overlap, and that this is also true of the three cells numbered 3 and the two cells numbered 2.

A simplified state diagram for a mobile transponder suitable for such a system using 40 ms timeslots is given in FIG. 30C. The significantly more complex complete state diagram is given in FIG. 30D.

TDM System with Staggered Triggering in 30 ms

This system shares characteristics with the system described with reference to FIGS. 1 to 23, and the system described with reference to FIG. 27, FIG. 29 and FIG. 30. The changes made are as follows:

The clock generator, mobile transponders and receivers are adjusted to cope with 30 ms timeslots and receive windows.

Mobile transponders are altered to deal with two different trigger times within each timeslot, and to cope with two transmission slots and registration acknowledgements.

The scheduling PCs run an enhanced scheduling algorithm, which can select two mobile transponders to be addressed in the next timeslot.

The matrix managers trigger their Receivers 13.6 ms after the start of the timeslot, to allow the longer radio message to be sent to the mobile transponders.

The positioning PCs are upgraded to calculate nonlinear regressions for both trigger times.

The area managers match calculated positions to both staggered trigger times.

The format of the packets sent out by the scheduling PC (via the zone manager) to the mobile transponders is of the form shown in Table D appended hereto.

FDM System with 20 ms Timeslots (FIG. 28)

The system diagram of FIG. 28 is analogous to that of FIG. 27, with similar letter abbreviations used for the various component parts of the system.

However, the system uses three different radio frequencies, 418 MHz, 433 MHz and 458 MHz, to ensure orthogonality of neighbouring cells. A static mapping between Cell-IDs and the radio frequency used in each cell is also held by the object manager (OM). The clock generator (CG) used in this system sends an accurate 50 Hz clock pulse and global time value to zone managers (ZM) and matrix managers (MM).

The scheduling PC runs software very similar to that used in the basic system, but stores two extra data values for each mobile transponder managed by that scheduling PC—a 2-bit handover frequency value indicating the frequency of the cell to which the mobile transponder should hand over (or zero, if no handover is to be performed), and an 8-bit handover Cell ID value indicating that cell's identifier. These data values are supplied and updated for each mobile transponder by the object manager (OM) over the CORBA interface. The coding of the handover frequency value is as set forth in Table E appended hereto.

The scheduling PC has an extra 2-bit register which holds the value corresponding to the frequency used in the associated radio transmitter, and an 8-bit register holds the unique identifier of that transmitter. Both are configured when the software process is initialised. No scheduling PC may have address 0. The format of the messages sent out by the scheduling PC is changed to that set forth in Table F appended hereto.

A further 1-bit value is stored for each mobile transponder managed by the scheduling PC, indicating whether the management is provisional or not (ie if the mobile transponder should be attempting to hand over to that scheduling PC or not). If a scheduling PC address a mobile transponder for which it is allocating provisional resources, the transmit bit in the outgoing message is sent.

The zone manager (FIG. 31B) used in the system has three FM radio transceivers 208A, 208B, 208C operating at 418, 433 and 458 MHz, but only one is ever used at a time. When the scheduling PC is initialised, it selects via a cell frequency register 340 one of the zone manager's channels for use via a multiplexer-demultiplexer 342, based on the frequency value for that cell. The zone manager is triggered on every clock pulse from the clock generator, and sends out the last message downloaded from the scheduling PC on the selected channel, before listening for transmissions from mobile transponders on that channel.

The mobile transponders (FIG. 31A) are altered to have three FM radio transceivers 260A, 260B, 260C, operating at 418, 433 and 458 MHz, and a message decoder 262A, 262B, 262C for each of the three channels. A 2-bit register holds a value corresponding to the currently active frequency, the coding for which is as set forth in Table G appended hereto.

The contents of the active frequency register 344 controls a multiplexer 346 which passes the output signals from the message decoder associated with the current active frequency to other components of the mobile transponder (or blocks all such output if no frequency is active). A demultiplexer 348 also controlled by the contents of the active frequency register, sends the output from the message generator to the transmitter circuitry associated with the current active frequency (or blocks that output if not frequency is active). When the mobile transponder is switched on, the active frequency register is initialised to zero.

Each time the mobile transponder receives a message from a scheduling PC (via the zone manager), the active message decoder 262A, 262B, 262C check the value of the Cell ID field in the incoming message with the value of the same field in the last message (stored by the active message decoder in a register 350, the current Cell ID, which contains zero on power-up). If the values differ, the registration controller 282 is immediately informed that the mobile transponder should attempt to register with the zone manager.

In this system, the power-saving supervisory circuit 264 works in much the same way as the circuit of FIG. 23. However, when activating the receiver circuitry, the normal behaviour of the power-saving supervisory circuit is now to only activate the receiver circuitry on the channel specified by the active frequency register.

If the message decoder detects that the value of the handover frequency and/or handover Cell ID fields in the incoming message are not zero, and that the message is destined for that mobile transponder, it attempts to hand over to another zone manager/scheduling PC. The handover frequency and handover Cell ID values are stored in registers 352, 354. When the power-saving supervisory circuit 264 next wakes to activate the receiver circuitry on the channel specified by the active frequency register, it also wakes the receiver circuitry on the channel specified by the handover frequency register. The receiver circuitry on the handover channel remains active for at least 4 ms—if a valid preamble is detected by that channel's message decoder in that time, the incoming radio message is received. If that message decoder detects that it is a valid message, and the Cell ID field in the message matches that in the handover Cell ID register, then the mobile transponder hands over. The message decoder associated with the handover channel sets the value of the active frequency register 344 to that of the handover frequency register, sets the current Cell ID register to the value of the handover Cell ID register, clears the handover frequency and handover Cell ID registers, and informs the registration controller that it should attempt to register with the new scheduling PC. The power-saving supervisory circuit resets the sleep counter to 0, and deactivates the receive circuitry, waking the mobile transponder up against just before the start of the next timeslot.

If the Cell IDs do not match, or no valid preamble or message is detected, then the message decoder associated with the handover channel clears the handover frequency and handover Cdll ID registers, and the power-saving supervisory circuit deactivates the receive circuitry, waking the mobile transponder just before the start of the next timeslot.

In order to prevent contention between the message decoders, the message decoders on channels other than the handover channel may not alter the contents of the handover frequency or handover cell ID register 352, 354 whilst a handover attempt is taking place.

If the message decoder indicates that an error occurred on the radio link, or that no message was received when one was expected, the mobile transponder enters a "Searching" mode, and the power-saving supervisory circuit sets the active frequency register to zero before turning off all receiver circuitry and the fast 8 MHz clock for about 80 s. After that time, the active frequency register is set to 1, and the power-saving supervisory circuit activates the 418 MHz receiver circuitry and fast clock.

If, after 20 ms, the mobile transponder is still "Searching", the active frequency register is incremented, the 418 MHz receiver circuitry is disabled, and the 433 Hz receiver circuitry is enabled.

If, after a further 20 ms, the mobile transmitter is still "Searching", the active frequency register is incremented again, the 433 MHz receiver circuitry is disabled, and the 458 MHz receiver circuitry is enabled.

If, after a further 20 ms, no signal has beer; detected, the 458 MHz receiver circuitry and clock are shut down, and the 80 s cycle starts again.

In this way, the mobile transponder searches all of the possible frequency space to try and detect signals from the zone managers.

The "Searching" mode is also the default state of the mobile transmitter when it is switched on for the first time.

In this system, the matrix managers (unchanged from FIG. 21) trigger their associated receivers 9.25 ms after seeing a trigger signal from the clock generator, to allow the radio messages to be sent to the mobile transmitters.

Positioning PCs in the system run the standard nonlinear regression algorithm on the data they collect from their associated receivers. However, each positioning PC will send one message every timeslot to the area managers associated with zone managers which could have triggered a mobile transmitter in the space they were monitoring. This message will either be an event of the form (position, orientation,time), or an indication that no good position and orientation were calculated (because of insufficient data or non-convergence of the nonlinear regression calculation).

Area managers must be coordinated to resolve possible position ambiguities arising from the lack of addressing information in the ultrasonic signals. In this system, each area manager is associated with a cell, and is connected to area managers associated with the overlapping cells by means of a CORBA interface. Each area manager also holds a static mapping which can be used to determine the ultrasonic spaces in which the scheduling PC associated with an area manager may trigger a mobile transponder. In each timeslot, every area manager waits for a result from the positioning PC dealing with the ultrasonic spaces associated with that area manager. When a result has been received from all positioning PCs in that set, the area manager contacts the object manager over a CORBA interface to say that it is ready to perform the next stage in the coordination operation. When all area managers have indicated that they are ready to progress to the next stage, the object manager performs the following algorithm:

1. Set the value of variable, x, to be equal to the smallest Cell ID used in the system.
2. Using the CORBA interface, instruct the area manager associated with cell x to perform the following steps. For each good position/orientation event received from a positioning PC for the current timeslot, tentatively construct a set of Final Results, by combining those events with the corresponding (identifier, time) event received from the scheduling PC associated with that cell. If a final result has already been sent to the object manager, proceed to Step 3. Otherwise, for each position/orientation event, contact all area managers associated with overlapping cells to determine whether they received notification of that position/orientation. If no other area manager that received such a notification and has not sent a final result to the object manager can be found, then send the final result (of the form (identifier,position, orientation,time)) to the object manager, and stop performing this step of the algorithm—the object manager should return to Step 1. Otherwise, continue considering the other position/ orientation events.
3. If x is not equal to the highest Cell ID, set x to be equal to the smallest Cell ID greater than x, and repeat Step 2.

At this point, the object manager will have received final results corresponding to all position/orientation events that could be unambiguously assigned to particular transmissions events. All other events must then be thrown away, because we are unable to determine which mobile transmitters were present in which ultrasonic spaced. The object manage should therefore send a message to all area managers over the CORBA interfaces instructing them to discard the ambiguous events, and to prepare to receive events generated by the system in the next timeslot.

As a demonstration of this algorithm, consider the situation shown in FIG. 32, in which three radio cells (numbered 1–3) cover four rooms, A, B, C and D. The area managers associated with the cells 1–3 receive position/orientation events from the matrix managers associated with the rooms as follows:

Area manager 1 receives position/orientation events from rooms A and C.

Area manager 2 receives position/orientation events from rooms A, B, C and D.

Area manager 3 receives position/orientation events from rooms C and D.

Suppose that in one timeslot (ie at time t), the following mobile devices are addressed:

X, using a signal transmitted in radio cell 1.

Y, using a signal transmitted in radio cell 2.

Z, using a signal transmitted in radio cell 3 and ultrasonic signals are detected in rooms A, B and C at positions $p_a$, $p_b$ and $p_c$, and with orientations $o_a$, $o_b$ and $o_c$.

Pass 1

Construct final results:

Area manager 1: $(X,p_a,o_a,t)$, $(X,p_c,o_c,t)$

Area manager 2: $(Y,P_a,o_a,t)$, $(Y,p_b,o_b,t)$, $(Y,p_c,o_c,t)$, $(Y,p_d,o_d,t)$ At this point, area manager 2 sends the final result $(Y,p_b,o_b,t)$ to the object manager, because none of the area managers associated with overlapping cells received the position/orientation event $(p_b,o_b)$.

Pass 2

Construct final results:

Area manager 1: $(X\,p_a,o_a,t)$, $(X,p_c,o_c,t)$

At this point, area manager 1 sends the final result $(X,p_a,o_a,t)$ to the object manager, because none of the area managers associated with overlapping cells which have not sent a final result to the object manager received the position/orientation event $(p_a,o_a)$.

Pass 3

Construct final results:

Area manager 1: $(X,p_a,o_a,t)$, $(X,p_c,o_c,t)$

Area manager 2: $(Y,p_a,o_a,t)$, $(Y,p_b,o_b,t)$, $(Y,p_c,o_c,t)$

Area manager 3: $(Z,p_c,o_c,t)$

At this point, area manager 1 sends the final result $(X,p_a,o_a,t)$ to the object manager, because there are no area managers associated with overlapping cells which received the position/orientation event $(p_c,o_c)$ and which have not sent a final result to the object manager.

In this case, the algorithm is successful, matching positions to all of the triggered mobile devices. Suppose, however, that ultrasonic signals were detected in rooms A, C and D. Then, the algorithm would proceed as follows:

Pass 1

Construct final results:

Area manager 1: $(X,p_a o_{a,t)}$, $_{(X,pc},o_c,t)$

Area manager 2: $(Y,\,p_a,o_a,t)$, $(Y,p_c,o_c,t)$, $(Y,p_d,o_d,t)$

Area manager 3: $(Z,p_c,o_c,t)$, $(Z,p_d,o_d,t)$.

At this point the algorithm terminates without having matched a position to any of the triggered mobile devices, because no position/orientation event can be uniquely matched to an area manager. Obviously, this is an undesirable outcome, and an enhancement of the system would include scheduling PCs that could coordinate their scheduling decisions with other scheduling PCs associated with overlapping radio cells (again, coordination would take place over a CORBA interface). When selecting a set of mobile devices to be located simultaneously in a timeslot, the scheduling PCs would choose a set that, based on past location information, would not result in deadlock of the above algorithm (ie a set of mobile devices whose last known positions would allow a unique assignment of a position/orientation event to an area manager).

FIG. 33A shows a possible modification in which a space is covered with four cells, using the three FDM frequencies (FIG. 33B).

Fast TDM System with 20 ms Timeslots

It should be noted that a TDM system which uses a fast radio link (say 1 Mbps) acts in a very similar way to the FDM system described with reference to FIG. 28 and FIGS. 31A and 31B. Two or more addressing messages may be sent out consecutively in a very short space of time. Cells will be orthogonal, but the periods in which ultrasonic signals from mobile transmitters triggered by different scheduling PCs are in flight would be almost the same, as shown in FIG. 34.

Position ambiguities would arise in this system due to the lack of addressing information in the ultrasonic signals emitted by mobile transducers, but the algorithm described above can be adapted to resolve such ambiguities. Each positioning PC can calculate a result for each of the closely spaced trigger times. Once an area manager using that algorithm has decided which of the addressing messages had triggered a mobile transponder in a space, the corresponding result from the positioning PC managing that space can be used to form the final result for that area manager.

FTDM System with Staggered Triggering and 30 ms Timeslots

This system shares characteristics with the system described with reference to FIGS. 1 to 23, and the systems described with reference to FIGS. 27 to 33. Four TDM channels are used with three FDM channels (ie three frequencies, 418, 433 and 458 MHz) to create a total of 12 available colours in an FTDM scheme. FIG. 35 shows how the TDM and FDM channels are used to form 12 FTDM colours.

Again, an object manager is used to coordinate scheduling PCs, decide whether mobile transponders should have over from one scheduling PC to another, and to coordinate area managers whilst resolving ambiguity between results from positioning PCs. Area managers pass position and orientation information about mobile transmitters to the object manager, which then forwards that information on to client applications and users. The object manager also monitors this data, and if, based on a mobile transmitter's position and knowledge of the extent of each radio cell, it decides that a handover should be made, it sends the corresponding signals to the appropriate scheduling PCs over the CORBA interface. A handover will be initiated if a mobile transponder moves to the very edge of a cell, into an area which is closed to the centre of another cell. The object manager receives data on the success, or otherwise, of handovers directly from the scheduling PCs, enabling it to send the control messages required to complete or cancel active handovers (as described above). The object manager also holds a static mapping between Cell IDs and the colour (ie the TDM offset and radio frequency), used by each cell.

The object manager receives information from the scheduling PCs about registrations and resource reclamation, allowing WHISP information stored for individual mobile transponders to be forwarded to the appropriate scheduling PCs during handover or after registration. Client applications can also change the WHISP information stored in the object manager whilst the system is running, and such changes are automatically forwarded to the appropriate scheduling PC(s).

The enhanced clock generator shown in FIG. 29B is used in this system. This device not only sends an accurate 50 Hz clock pulse and global time value to zone manager and matrix manager, but also distributes a value indicating the current active TDM channel in the FTDM scheme. The clock generator contains a counter which increments modulo four (the number of TDM channels) every pulse. This register may be set by a PC connected to the clock generator, and the counter may be preset along with the global time value by the PC, so that the TDM channel value is consistent with the global time value.

Two staggered trigger times are available to a scheduling PC with which to locate mobile transponders in its timeslot. The scheduling algorithm used by the scheduling PC is designed primarily to help the area managers assist identifiers to ultrasonic events (by spreading potentially conflicting mobile transmitters between the two staggered trigger times), and secondly (when conflict between mobile transponders is unlikely) to use the staggered trigger times to increase the location rate of the system. Each scheduling PC holds a 3D description of all ultrasonic spaced to allow it to determine if two points are in the same space, and a mapping which, given an ultrasonic space, allows the scheduling PC to determine which radio cells cover that space. To select two mobile transponders to be addressed during the next timeslot, the scheduling PC uses the following algorithm:

1. Set variable a to zero.
2. If a is zero, use the existing scheduling algorithm (described in the document "Description of an Enhanced Ultrasonic Location System") to select the next two mobile transponders to be addressed. Set variable b to the address of the first, and variable c to the address of the second. If a is not zero, set variable b to be equal to the value of a, and use the existing scheduling algorithm to select the next mobile transponder to be located, placing its address in variable c.
3. If the last position information for the mobile transponder b suggests that it is in an ultrasonic space where it could only be triggered by this scheduling PC, set variable d to be equal to the value of b. Then, if the last position information for mobile transponder c suggests that it too, could only be triggered by this scheduling PC, set variable e to be equal to the value of c—otherwise set variable e to zero, and a to be equal to the value of c. Proceed to Step 4. If the last position information for the mobile transponder b suggests that it is in an ultrasonic space where it could be triggered by scheduling PCs other than this one, randomly choose one of variable d and e, setting the value of that variable to be equal to b, and the other to zero. Set a to be equal to the value of c.
4. Locate both mobile transponder d and mobile transponder e in the next timeslot, with d being triggered 10 ms before e.
5. Go to Step 2.

It is to be noted that e may be zero in this case, the second address is a dummy address which does not correspond to a real mobile transponder.

This scheduling algorithm has the property that the Location Quality of Service (LQoS) demand for each mobile transponder is at least satisfied, but may be exceeded by a factor of two. It should also be noted that the sleep times calculated by the algorithm for the two mobile transponders are divided by a factor of two, so as to ensure that they remain conservative estimates. If each scheduling PC was permitted to coordinate with the scheduling PCs associated with neighbouring cells, addresses for each timeslot could be chosen more intelligently so that, perhaps, potentially conflicting mobile transducers could actively be assigned to different stagger times.

The scheduling PC has an extra 2-bit register which holds the value corresponding to the frequency used in the associated radio cell, and an 8-bit register which holds the unique identifier of that cell—both are configured when the software process is initialised. No scheduling PC may have address 0. The format of the messages sent out by the scheduling PC is as shown in Table H, appended hereto.

The zone manager (FIG. 362) used in the system again has three FM radio transceivers (208A, 208B, 208C) operating at 418, 433 and 458 MHz, but only one is used; when the scheduling PC is initialised, it selects one of the zone manager's channels for use via a multiplexer/demultiplexer 342, based on the frequency value for that cell. An extra register 360 in the zone manager holds a TDM channel value, also loaded from the scheduling PC at configuration time. The zone manager is triggered on a clock pulse when the TDM channel value transmitted simultaneously by the clock generator matches the contents of this register. When triggered, the zone manager sends out the last message downloaded from the scheduling PC on the selected FDM channel, before listening for transmissions from mobile transducers on that channel.

The mobile transmitters (FIG. 36A) are altered as in FIG. 31A to have three FM radio transceivers 260A, 260B, 260C, operating at 418, 433 and 458 MHz, and a message decoder 262A, 262B, 262C for each of the three channels. A 2-bit register holds a value corresponding to the currently active frequency—the coding is as set forth in Table J appended hereto.

The contents of the active frequency register controls multiplexer 346 which passes the output signals from the message decoder associated with the current active frequency to other components of the mobile transponder (or blocks all such output if no frequency is active). Demultiplexer 348 also controlled by the contents of the active frequency register, sends the output from the message generator to the transmitter circuitry associated with the current active frequency (or blocks that output if no frequency is active). When the mobile transponder is switched on, the active frequency register 344 is initialised to zero.

Each time the mobile transponder receives a message from a scheduling PC (via the zone manager), the active message decoder checks the value of the Cell ID field in the incoming message with the value of the same field in the last message (stored by the active message decoder in the register, the current Cell ID 350, which contains zero on power-up). If the values differ, the registration controller is immediately informed that the mobile transponder should attempt to register with the zone manager.

The mobile transponder must also be made aware of the TDM aspect of the FTDM multiplexing scheme used. If the sleep counter is zero, the power-saving supervisory circuit 264 switches on the receiver circuitry on the channel specified by the active frequency register once every 120 ms. If the sleep counter is not zero, the power-saving supervisory circuit decrements the counter once every 120 ms, and only activates the receiver circuitry on the channel specified by the active frequency register once every 960 ms.

If the message decoder detects that the value of the handover frequency and/or handover Cell ID fields in the incoming message are not zero, and that the message is destined for that mobile transmitter, it attempts to hand over to another zone manager/scheduling PC. The handover frequency, handover, offset and handover Cell ID values are stored in register 352, 360, 354 respectively. The power-saving supervisory circuit wakes the receiver circuitry on the channel specified by the handover frequency register at a time after the start of that timeslot given by the look-up table set forth in appended Table K.

The receiver circuitry on the handover channel remains active for at least 4 ms if a valid preamble is detected by that channel's message decoder in that time, the incoming radio message is received. If that message decoder detects that it is a valid message, and the Cell ID field in the message matches that in the handover Cell ID register, then the mobile transponder hands over. The message decoder associated with the handover channel sets the value of the active frequency register to that of the handover frequency register 352, sets the current Cell ID register 350 to the value of the handover Cell ID register, clear the handover frequency, handover offset and handover Cell ID registers, and informs the registration controller 282 that it should attempt to register with the new scheduling PC. The power-saving supervisory circuit resets the sleep counter to 0, and deactivates the receive circuitry, waking the mobile transponder up again just before the start of the next timeslot on the new channel. If the Cell IDs do not match, or no valid preamble or message is detected, then the message decoder associated with the handover channel clears the handover frequency, handover offset and handover Cell ID registers, and the power-saving supervisory circuit deactivates the receive circuitry, waking the mobile transponder just before the start of the next timeslot. In order to prevent contention between the message decoders, the message decoders on channels other than the handover channel may not alter the contents of the handover frequency, handover offset, or handover Cell ID register whilst a handover attempt is taking place.

If the message decoder indicates that an error occurred on the radio link, or that no message was received when one was expected, the mobile transponder enters a "Searching" mode, and the power-saving supervisory circuit sets the active frequency register to zero before turning off all receiver circuitry and the fast 8 MHz clock for about 80 s. After that time, the active frequency register is set to 1, and the power-saving supervisory circuit activates the 418 MHz receiver circuitry and fast clock. If, after 120 ms, the mobile transponder is still "Searching", the active frequency register is incremented, the 418 MHz receiver circuitry 260A is disabled, and the 433 MHz receiver circuitry 260B is enabled. If, after a further 120 ms, the mobile transponder is still "Searching", the active frequency counter is again incremented, the 433 MHz receive circuitry 260B is disabled, and the 458 MHz receiver circuitry 260C is enabled. If, after a further 120 ms, no signal has been detected, the 458 MHz receiver circuitry and clock are shut down, and the 80 s cycle starts again. In this way the mobile transponder searches all of the possible frequency space and all of the possible TDM channels to try and detect signals from zone managers. The "Searching" mode is also the default state of the mobile transponder when it is switched on for the first time.

In this system, the matrix managers (unchanged from FIG. 21) trigger their associated Receivers 13.25 ms after seeing a trigger signal from the clock generator, to allow the radio messages to be sent to the mobile transponders. The receivers are unchanged from FIG. 22.

The positioning PCs used in the system are upgraded to calculate nonlinear regressions for both trigger times as hitherto described. Each positioning PC sends a message every timeslot to the area managers associated with zone managers which could have triggered a mobile transponder in the space they were monitoring. The message will be of the form (result1,result2, time), where result1 and result2 will either be a position/orientation pair or an indication that no good position and orientation were calculated (because of insufficient data or non-convergence of the nonlinear regression calculation).

The area managers are coordinated to resolve possible position ambiguities arising from the lack of addressing information in the ultrasonic signals. In this system, each area manager is associated with a cell, and is connected to area managers associated with overlapping cells which use the same TDM channel by means of a CORBA interface. Each area manager also holds a static mapping which can be used to determine the ultrasonic spaces in which the scheduling PC associated with an area manager may trigger a mobile transponder. In each timeslot, every area manager active in that timeslot waits for a result from the positioning PCs dealing with the ultrasonic spaces associated with that area manager—a result contains either a good position/orientation event or an error indication for each of the two staggered trigger times (STTs). When a result has been received from all positioning PCs in that set, the area manager contact the object manager over a CORBA interface to say that it is ready to perform the next stage in the coordination operation. When all active area managers have indicated that they are ready to progress to the next stage, the object manager performs the following algorithm:

1. Set the value of a variable, x, to be equal to the smallest Cell ID of a cell which was active in the last timeslot.
2. Using the CORBA interface, instruct the area manager associated with cell x to perform the following steps. For each good position/orientation/STT event received from a positioning PC for the current timeslot, tentatively construct a set of Intermediate results by combining those events with the corresponding (identifier1,identifier2, time) events received from the scheduling PC associated with that cell. To do this, select the appropriate identifier for the match based on the STT, and discard any position/orientation/STT events that are matched by a dummy identifier.
3. For each good position/orientation/STT event such as the corresponding intermediate result has not been matched to an STT, contact all area managers associated with overlapping cells which could be active in the same TDM channel to determine whether they received notification of that position/orientation/STT event. If no other area manager that received such a notification and that has not matched an intermediate result to that STT can be found, then match the intermediate result corresponding to the position/orientation/STT event to that STT, and instruct the object manager to return to Step 1. Otherwise, continue considering the other position/orientation/STT events.
4. If x is not equal to the highest Cell ID of a cell which was active in the last timeslot, set x to be equal to the smallest Cell ID, greater than x, of a cell active in that timeslot, and repeat Step 2.

The object manager then instructs each area manager to perform the following operations. Suppose an area manager deals with n ultrasonic spaces. A data set $s_{11}, s_{12}, s_{21}, s_{22}, \ldots, s_{n1}, s_{n2}$ is constructed where $s_{ij}=1$ if an intermediate result corresponding to an ultrasonic event in space i was matched to the STT j, and $s_{ij}=0$ otherwise.

If the scheduling PC associated with the area manager triggered a mobile transponder in the first STT only, it is checked that $s_{i1}$ is equal to 1 for one and only one value of i, and that there is no value of k such that $s_{k2}$ is equal to 1. If this is true, the intermediate result associated with the first STT and space i is forwarded to the object manager. If it is not, the area manager discards all its intermediate results for that timeslot, and informs that object manager that it will not supply any results.

If the scheduling PC associated with the area manager triggered a mobile transponder in the second STT only, it is checked that $s_{i2}$ is equal to 1 for one and only one value of i, and that there is no value of k such that $s_{k1}$ is equal to 1. If this is true, the intermediate result associated with the second STT and space i is forwarded to the object manager. If it is not true, the area manager discards all its intermediate results for that timeslot, and informs that object manager that it will not supply any results.

If the scheduling PC associated with the area manager triggered a mobile transponder in both STTs, it is first checked that two signals have been detected in separate ultrasonic spaces. For this to be true, the area manager must be able to find i and j, such that $s_{i1}=1$ or $s_{i2}=1$ and $s_{j1}=1$ or $s_{j2}=1$ and $i \neq j$, but it must be unable to find k such that $s_{k1}=1$ or $s_{k2}=1$ and $k \neq i \neq j$. If this is not true, the area manager must discard all its intermediate results for this timeslot, because signal cross-contamination could have occurred. Next it is checked that only one good set of ultrasonic signals has been identified from each trigger time within the timeslot. For this to be true, there must be only one i such that $s_{i1}$ is true, and only one j such that $s_{j2}$ is true. If it is found that this statement is true, the intermediate results associated with the first STT and space i, and the second STT and space j as forwarded to the object manager. If it is not true, the area manager discards all its intermediate results for that timeslot, and informs that object manager that it will not supply any results.

The object manager waits until it has received a reply from all area managers. At this point, the object manager will have received results corresponding to all position/orientation events that could be unambiguously assigned to particular transmission events. All other events will have been thrown away by area managers, because we are unable to determine which mobile transducer were present in which ultrasonic spaces. The object manager then sends a message to all area managers over the CORBA interfaces instructing them to prepare to receive events generated by the system in the next timeslot. As hitherto mentioned, the system can be enhanced by using scheduling PCs that coordinate with each other in order to selects sets of mobile devices to be located simultaneously, so that the above algorithm is less likely to end in deadlock.

What is claimed is:

1. A system which enables the position of each of a plurality of mobile labelled objects in a specified environment to be determined by determining the transit time of slowly propagating energy from a transmitter on each labelled object to a plurality of receivers positioned at fixed points within or around the specified environment, and computing therefrom the distances of the transmitter from the receiver, wherein the specified environment is spatially divided into overlapping cells each having a master transmitter for transmitting a burst of high speed propagating energy for detection by object mounted receivers associated with the object mounted transmitters within the compass of the cell (this transmitter/receiver combination hereafter being referred to as a transponder) and wherein each cell is allotted an identifying characteristic, the high speed energy transmissions by the different master transmitters are multiplexed in accordance with the identifying characteristics of the of the respective cells, and no two cells having the same identifying characteristic spatially overlap one another.

2. A system according to claim 1, wherein the slowly propagating energy is ultrasound energy and the high speed propagating energy is radio waves.

3. A system according to claim 1, having means incorporated in the multiplexing arrangement whereby the cells are invisible to each other, so that transmissions in one cell do not disrupt transmissions in neighbouring cells.

4. A system according to claim 3, wherein the invisibility of one cell to another is achieved by time-division multiplexing (TDM), frequency-division multiplexing (FDM), or code-division multiplexing (CDM) of the high speed energy transmissions.

5. A system according to claim 3, wherein each cell is in effect allocated a colour, which is an identifying characteristic distinguishing between different cells in the multiplexing arrangement, which uses (x) channels and each cell is allocated one of the (x) channels and one of (x) colours indicating which of the (x) channels it uses.

6. A system according to claim 5, wherein, when colours are assigned to cells, invisibility of any one cell relative to the other cells is ensured by ensuring that no two cells with the same colour overlap at any point in space.

7. A system according to claim 5, wherein a scheduling PC for each cell has a globally unique ID, transmitted as part of messages sent out by the transmitters in its associated cell, which allows mobile transponders to distinguish between cells with the same colour.

8. A system according to claim 5, wherein, when the multiplexing arrangement allows simultaneous transmission of addressing signals in overlapping cells (eg FDM, CDM), some or all colours use the same timeslots.

9. A system according to claim 5, wherein, when the multiplexing arrangement does not allow simultaneous transmission of the addressing signals in overlapping cells (eg TDM), timeslots are distributed between colours.

10. A system according to claim 5, wherein staggered triggering of mobile transponders within extended timeslots is employed to increase the aggregate location rate of the system.

11. A system according to claim 7, wherein, when a mobile transponder moves from one cell to another, the mobile transponder performs a "hand over", so that the control of that mobile transponder passes from one scheduling PC to another, and the mobile transponder begins to receive messages via another cell.

12. A system according to claim 11, wherein the transfer of control of a mobile transponder may be passive or active, and in an active handover, the mobile transponder, scheduling PC or other monitoring service decides that a transfer of control is appropriate, and a passive handover occurs when a mobile transponder determines that it has started to receive messages from a new scheduling PC.

13. A system according to claim 12, wherein if a decision to transfer control is established, the current scheduling PC sends a message to the mobile transponder indicating that a handover should take place, along with instructions on how to find the new cell and at the same time, a message is sent to the new (provisional) scheduling PC telling it to start addressing the mobile transponder until the provisional scheduling PC detects that the mobile transponder has picked up its addressing signals, whereupon the handover is complete and a message is sent to the old scheduling PC telling it to stop addressing the mobile transponder.

14. A system according to claim 12, wherein, in order to indicate to a new scheduling PC that it must start to address the mobile transponder, a mobile transponder registers its existence to a scheduling PC so that it will be included within the list of transponders to be addressed by the PC.

15. A system according to claim 14, wherein after an active handover has occurred, the mobile transponder performs a registration process when it locks onto a new cell, and a special transmit bit is set in addressing messages from the new scheduling PC that are destined for the mobile transponder that is performing the handover.

* * * * *